US006983061B2

(12) United States Patent
Ikegami et al.

(10) Patent No.: US 6,983,061 B2
(45) Date of Patent: Jan. 3, 2006

(54) PERSONAL AUTHENTICATION SYSTEM AND METHOD USING BIOMETRICS INFORMATION, AND REGISTERING APPARATUS, AUTHENTICATING APPARATUS AND PATTERN INFORMATION INPUT MEDIUM FOR THE SYSTEM

(75) Inventors: Jun Ikegami, Kawasaki (JP); Takashi Shinzaki, Kawasaki (JP); Yusaku Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 537 days.

(21) Appl. No.: 09/791,790

(22) Filed: Feb. 26, 2001

(65) Prior Publication Data

US 2001/0036297 A1 Nov. 1, 2001

(30) Foreign Application Priority Data

Apr. 27, 2000 (JP) .............................. 2000-127960

(51) Int. Cl.
*G06K 9/00* (2006.01)
(52) U.S. Cl. ........................ 382/115; 382/190; 713/186
(58) Field of Classification Search ........ 115/124–127, 115/125, 209, 190; 713/186, 200, 178, 120, 713/184; 382/115, 190
See application file for complete search history.

(56) References Cited

U.S. PATENT DOCUMENTS 4,993,068 A * 2/1991 Piosenka et al. ............ 713/186
5,892,838 A * 4/1999 Brady ......................... 382/115
6,091,836 A * 7/2000 Takano et al. .............. 382/118
6,219,639 B1 * 4/2001 Bakis et al. ................. 704/246
6,256,737 B1 * 7/2001 Bianco et al. .............. 713/186

OTHER PUBLICATIONS

Anil Jain et al. " On -line Fingerprint Verification ", IEEE Pattern analysis and machine intelligence, vol. 19, No. 4, Apr. 1997 . pp. 302-314.*

* cited by examiner

*Primary Examiner*—Sanjiv Shah
*Assistant Examiner*—Sheela Chawan
(74) *Attorney, Agent, or Firm*—Staas & Halsey LLP

(57) ABSTRACT

A system performing secondary verification using only existing apparatuses to accomplish a measure for relief in personal authentication without causing complexity or without increasing cost. The system has a registering apparatus for obtaining data for verification from information inputted using an inputting unit and registering the data. The registering apparatus has a first extracting unit for extracting biometrics characteristic data from the biometrics information obtained by the inputting unit, and registering the biometrics characteristic data as registry biometrics characteristic data for primary verification, and a second extracting unit for extracting data, which is different from the registry biometrics characteristic data, from information inputted using the inputting unit and registering the data as registry data for secondary verification. The system is used for personal authentication using biometrics information such as fingerprint, palm print, finger shape, palm shape, voice, retina, iris, face image, dynamic signature, blood vessel pattern, keystroke, or the like.

60 Claims, 27 Drawing Sheets

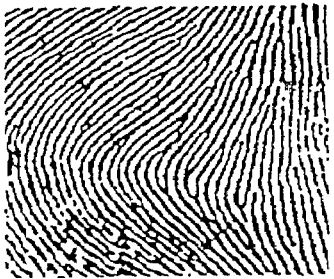
FIG. 11D PLAIN ARCH
FIG. 11C DOUBLE LOOP
FIG. 11B LEFT CENTRAL POCKET LOOP
FIG. 11A RIGHT CENTRAL POCKET LOOP
FIG. 11H TENTED ARCH
FIG. 11G RIGHT LOOP
FIG. 11F LEFT LOOP
FIG. 11E PLAIN WHORL

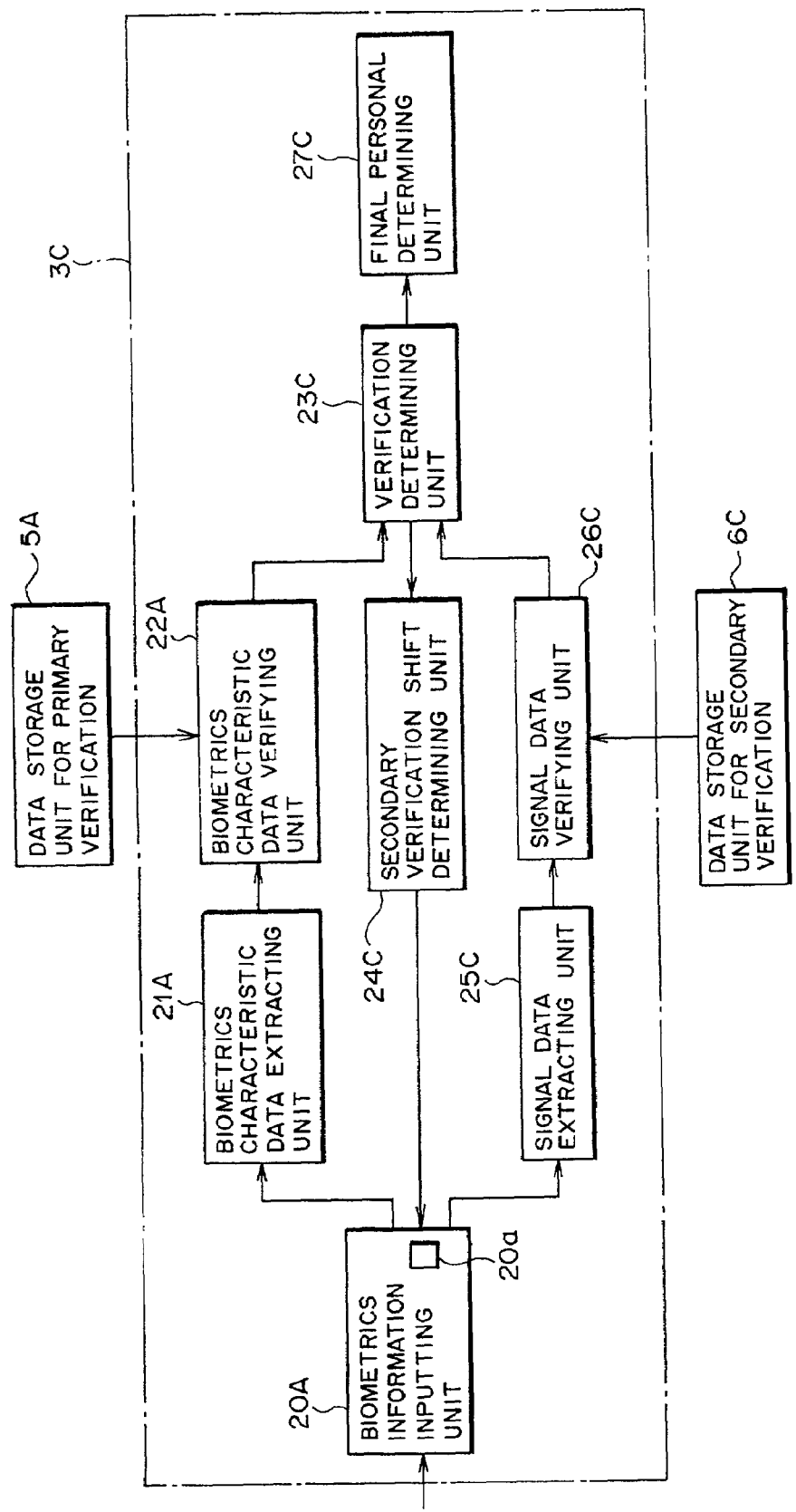

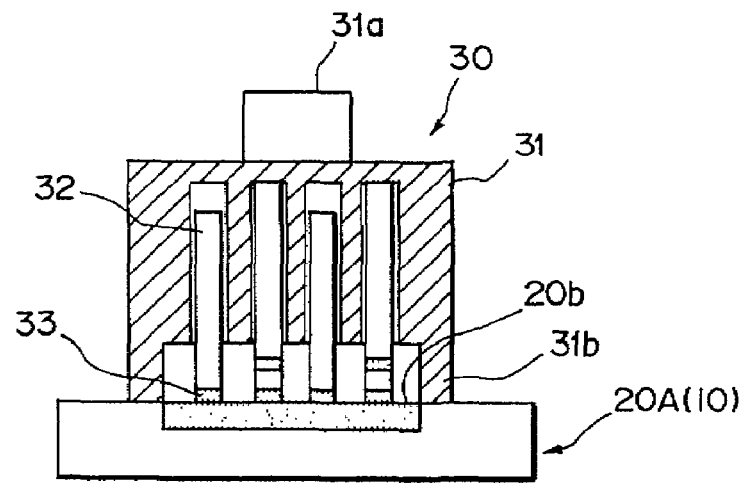
FIG. 22A
FIG. 22B
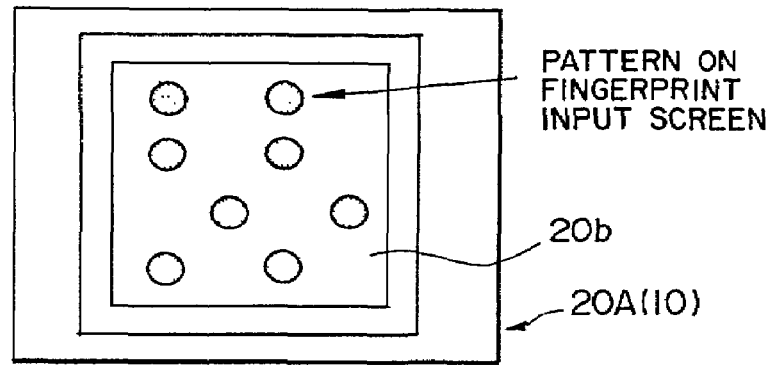
FIG. 23
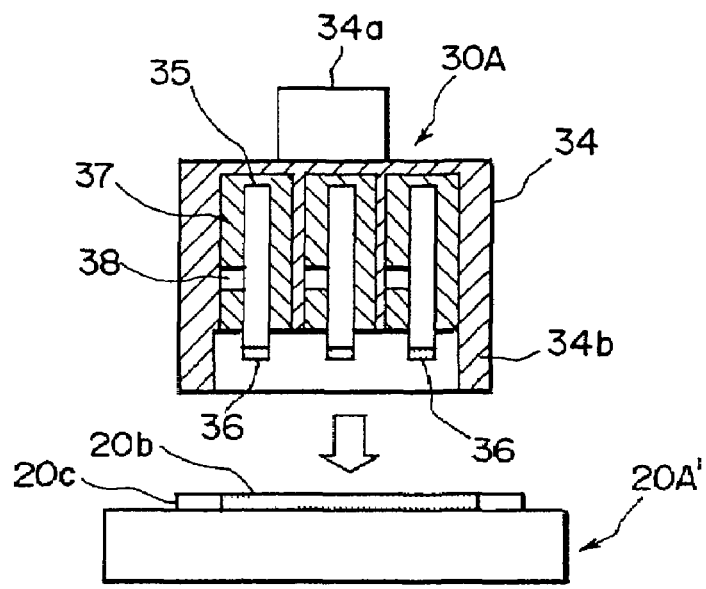

PATTERN ON
FINGERPRINT
INPUT SCREEN

PERSONAL AUTHENTICATION SYSTEM AND METHOD USING BIOMETRICS INFORMATION, AND REGISTERING APPARATUS, AUTHENTICATING APPARATUS AND PATTERN INFORMATION INPUT MEDIUM FOR THE SYSTEM

BACKGROUND OF THE INVENTION

1. Field of the Invention

The present invention relates to a system and a method for authenticating a person using biometrics information such as fingerprint, palm print, finger shape, palm shape, voice, retina, iris, face image, dynamic signature, blood vessel pattern, keystroke, or the like, and a registering apparatus, an authenticating apparatus, and a pattern information input medium for the system.

2. Description of the Related Art

In recent years, there is growing interest in security with wide introduction of computers into social systems. ID cards or passwords are heretofore used as a means for verifying a person when he or she enters into a computer room or uses a terminal. However, this leaves a lot of problems in respect to security.

As a more reliable means than passwords for verifying a person, a personal authenticating technique using biometrics information such as fingerprint, palm print, finger shape, palm shape, voice, retina, iris, face image, dynamic signature, blood vessel pattern, keystroke, or the like, attracts public attention. Verification of a person using biometrics information inherent in a person produces a very high reliability.

In a personal authentication system using such biometrics information, biometrics information on each person who should be authenticated in the system is obtained, characteristic data is extracted from the biometrics information, and the characteristics data is beforehand registered as registry characteristic data of each person to be authenticated. When the biometrics information is verified in order to authenticate a person, biometrics information on the person to be authenticated is obtained, characteristics data to be authenticated is extracted from the biometrics information, the above characteristic data to be authenticated is compared and matched with the registry characteristic data registered beforehand, and a rate of matching of these two sorts of characteristic data is calculated. When the rate of matching between the registry characteristic data and the characteristic data to be authenticated is not less than a predetermined value (or exceeds a predetermined value), the person to be authenticated is determined to be the registered person.

Next, personal authentication using fingerprint, which is one piece of biometrics information that can be used to verify a person, will be briefly described. Fingerprint is said to have two characteristics that are "no two persons have exactly the same fingerprint" and "the fingerprint of anyone individual remain unchanged through life". Therefore, fingerprint is considered to be a strong means for verifying a person. A lot of researches and developments relating to personal authentication systems using fingerprints are made in recent years.

Fingerprints are minute irregularities on fingertips of a person. Ranges of the minute irregularities are called ridges. The ridges form various patterns inherent to a person. When the ridge is followed, a bifurcation at which the ridge branches (bifurcation) or a dead-end (ending) appears. Distribution of bifurcations and endings differs in individuals, which is thus called minutiae of fingerprints. Matching of a state of distribution of the minutiae is used as a strong means to specify a person.

When personal authentication is performed using such a fingerprint as biometrics information, coordinates of an intersection of ridges of the fingerprint, coordinates of a center of the fingerprint, coordinates of a delta of the fingerprint, a direction of a ridge of the fingerprint, a distance between minutiae, the number of ridges between minutiae of the fingerprint, etc. are extracted along with a position (coordinates), a type, and a direction of the minutia described above.

In a personal authentication system using fingerprints, fingerprint characteristic data of a person is beforehand registered. Namely, a user (person) of the system inputs fingerprint image data into a predetermined apparatus, characteristic data is extracted from the fingerprint image data and registered as registry characteristic data.

When fingerprint image data of an authenticating object person is obtained by a fingerprint scanner at the time of verification, characteristic data to be authenticated is extracted from the fingerprint image data, and it is verified whether the characteristic data to be authenticated matches the registry characteristic data registered beforehand. When a rate of matching is not less than a predetermined value, it is determined that the person to be authenticated is the person registered in the personal authentication system.

Generally, a fingerprint pattern is obtained in a form of a fingerprint image, by photographing the image by a CCD camera while a finger is contacted with a special optical system, or by detecting only a ridged part on the skin by a capacitance sensor. However, when an image of an unclear fingerprint, that is, an blurred image of a fingerprint or an image of a fingerprint in which ridges are adhered by sweat, is obtained, it is impossible to verify whether a person to be authenticated is a registered person because a rate of matching becomes less than the predetermined value when the verification is performed.

In another case, it is likely that a rate of matching becomes less than the predetermined value due to unexpected factors in the personal authorization system using biometrics information. As the factors, there are dryness, roughness, etc. of the fingertips in winter time along with deformation due to injury in the case of personal authentication using a fingerprint, and deformation due to injury or disease in the case of person authorization using a face or an iris.

In the above-mentioned personal authorization technique using biometrics information, when a rate of matching becomes less than the predetermined value and the personal authentication thus results in failure due to any factor, the process is completed in consideration that the person is not the person himself/herself (registered person), or personal authentication is performed by inputting a password or the like as a measure for relief. When the latter means is used, a device for inputting a password such as a ten key pad, a keyboard or the like is beforehand provided to the apparatus for fingerprint verification, and the person to be authenticated inputs a password registered beforehand from the device.

When the authentication is failed because of an input error of the biometrics information or the like, re-verification is performed again by re-inputting the same biometrics information, which sometimes allows normal authentication. However, when it becomes impossible to exceed a predetermined rate of matching due to a factor such as injury or the like, a system without a measure for relief cannot authenticate the person to be authenticated as the person himself/herself (registered person).

When a measure for relief by inputting a password is employed, an advantage of personal authentication using biometrics information that can eliminate a trouble of keyboard inputting is lost, which leads to complexity or an increase in cost of the system.

When personal authentication is failed, as another idea, biometrics information which is different from the one that has been used when the authentication was failed, is obtained to authenticate the person (for, example, the authentication is performed using a face or an iris when the personal authentication using a fingerprint is failed). In order to realize this system, it is necessary to provide plural kinds of biometrics information inputting apparatus to each of the registering apparatus and the authenticating apparatus. Namely, a biometrics information inputting apparatus (for example, an apparatus that obtains a face or an iris as image data) of a different type from the biometrics information inputting apparatus used in the first verification (primary verification) is required, which also leads to complication or an increase in cost of the system.

In the personal authentication system using biometrics information, the user has to beforehand register registry characteristic data, as stated above. When a fingerprint is used as the biometrics information, the user inputs fingerprint image data in registration. However, it is not possible to register a person whose fingerprint is in unstable conditions due to dryness or roughness of the finger in winter time, or a person whose fingerprint cannot be primarily obtained due to injury or the like, which sometimes unables personal authentication. Therefore, a measure for relief in such case is further necessary.

When the measure for relief by inputting a password is employed to cope with it, it is necessary to provide a device such as a ten key pad, a keyboard or the like, as stated above, which leads to complexity or an increase in cost of the system. Alternatively, it is considered that registry characteristic data is extracted from biometrics information which is different from the biometrics information that failed to be registered, and is registered (for example, a face or an iris is used to be registered when registry using, for example, a fingerprint is impossible). In order to realize this system, it is necessary to provide plural kinds of biometrics information inputting apparatuses, which also leads to complexity or an increase in cost of the system.

SUMMARY OF THE INVENTION

In the light of the above problems, an object of the present invention is to provide a personal authentication system and method using biometrics information, and a registering apparatus, an authenticating apparatus and a pattern information input medium for the system, which allows secondary verification using only existing structural apparatuses when personal authentication becomes impossible in primary verification since a rate of matching between biometrics information (registry characteristic data), obtained in registration, and biometrics information (characteristic data to be authenticated), obtained in verification, is decreased by an unexpected factor, or when registration of biometrics information (registry characteristic data) becomes impossible in registration due to a state of a predetermined part of a body, thereby realizing a measure for relief in personal authentication without causing complexity or an increase in cost.

The present invention therefore provides a personal authentication system using biometrics information comprising a registering apparatus including a first biometrics information inputting unit for obtaining biometrics information of a person to be registered, the registering apparatus obtaining data for verification from information inputted using the first biometrics information inputting unit and registering the same, and an authenticating apparatus for determining whether a person to be authenticated is a person registered by the registering apparatus, on the basis of the data for verification registered by the registering apparatus, the registering apparatus including a first extracting unit for extracting biometrics characteristic data from the biometrics information obtained by the first biometrics information inputting unit, and registering the biometrics characteristic data as registry biometrics characteristic data for primary verification, and a second extracting unit for extracting data, which is different from the registry biometrics characteristic data for primary verification, from information inputted using the first biometrics information inputting unit, and registering the data as registry data for secondary verification.

The registering apparatus may comprise a state determining unit for determining a state of the registry biometrics characteristic data for primary verification extracted by the first extracting unit, and the second extracting unit may carry out extraction and registration according to a result of determination by the state determining unit.

The authenticating apparatus may comprise a second biometrics information inputting unit for obtaining biometrics information of the person to be authenticated, a third extracting unit for extracting biometrics characteristic data from biometrics information of the person to be authenticated obtained by the second biometrics information inputting unit, a primary verifying unit for verifying whether the biometrics characteristic data extracted by the third extracting unit matches the registry biometrics characteristic data for primary verification registered by the registering apparatus, a secondary verification shift determining unit for determining whether to carry out secondary verification, on the basis of a result of verification by the primary verifying unit, a fourth extracting unit for extracting data for secondary verification from information inputted using the second biometrics information inputting unit, when the secondary verification shift determining unit determines that the secondary verification is required to be carried out, a secondary verifying unit for verifying whether data extracted by the fourth extracting unit matches the registry data for secondary verification registered by the registering apparatus, and a personal determining unit for determining whether the person to be authenticated is a person registered by the registering apparatus, on the basis of a result of verification by the primary verifying unit or the secondary verifying unit.

The authenticating apparatus may further comprise an instruction unit for prompting the person to be authenticated to input data for secondary verification by using the second biometrics information inputting unit, when the secondary verification shift determining unit determines that secondary verification is required to be carried out. The authenticating apparatus may still further comprise a secondary verification shift setting unit for arbitrarily setting whether to carry out verification by the secondary verifying unit. The authenticating apparatus may still further comprise a personal information setting unit for setting in advance information on whether to carry out verification by the secondary verifying unit as personal information for each registered person.

The registry data for secondary verification may be biometrics characteristic data extracted from biometrics information, which is of the same type as biometrics information in primary verification and which is obtained from a part which is deferent from a part from which the biometrics information has been obtained in the primary verification. At this time, the biometrics information may be fingerprint image data, and the registry data for secondary verification may be biometrics characteristic data extracted from fingerprint image data of one or more fingers which are differed from a finger from which the registry characteristic data for primary verification has been obtained.

Alternatively, the registry data for secondary verification may be biometrics characteristic data of a different type from biometrics characteristic data in primary verification extracted from biometrics information, which is of the same type as biometrics information in primary verification and which is obtained from the same part or a different part. At this time, the biometrics information maybe fingerprint image data, and the registry data for secondary verification may be biometrics characteristic data of a different type from biometrics characteristic data in the primary verification, extracted from fingerprint image data of the same finger as a registered finger from which the registry biometrics characteristic data for primary verification has been obtained, or, one or more fingers which are different from the registered finger.

Still alternatively, the registry data for secondary verification may be non-biometrics characteristic data intentionally inputted by the person to be registered using the first biometrics information inputting unit. At this time, as the non-biometrics characteristic data, described in ① to ⑥ below may be used. In ② to ⑥, the biometrics information is image data of a predetermined part of a body. The image data is inputted through an image input screen of the first biometrics information inputting unit.

① Time series data having a pattern determined by the person to be registered.

② Input angle, of the predetermined part of the body on the image input screen, which is detected as image data by the first biometrics information inputting unit.

③ Contact position, of the predetermined part of the body on the image input screen, which is detected as image data by the first biometrics information inputting unit for registry.

④ Contact trace information, on the image input screen, which is detected as image data by the first biometrics information inputting unit.

⑤ Contact pattern, on the image input screen, which is detected as image data by the first biometrics information inputting unit. At this time, the contact pattern may be formed by a pattern information input medium, which is able to be possessed and carried by the person to be registered or a registered person, and the pattern information input medium may comprise one or more contact parts contacting with the image input screen of the first biometrics information inputting unit to form the contact pattern. Further, the pattern information input medium may form a pattern changing in time series as the contact pattern by the one or more contact parts.

⑥ When character data corresponding to each of a plurality of different contact patterns or a plurality of different contact points on the image input screen is set beforehand, the character data corresponding to the contact pattern or the contact point detected as image data by the first biometrics information inputting unit is used as the non-biometrics characteristic data. At this time, the non-biometrics characteristic data may be a character data string successively inputted in time series. The registering apparatus and the authenticating apparatus may comprise a keyboard unit attachably and detachably disposed to the biometrics information inputting unit to be able to form the contact pattern or the contact point by contacting with the image input screen according to a key operation, and a keyboard information extracting unit for converting the contact pattern or the contact point formed according to the key operation of the keyboard unit into corresponding character data, and outputting the same.

The present invention further provides a personal authentication method using biometrics information comprising the steps of a registering step of obtaining first biometrics information of a person to be registered using a first biometrics information inputting unit, registering biometrics characteristic data extracted from the first biometrics information as registry biometrics characteristic data for primary verification, inputting registry data for secondary verification, which is different from the registry biometrics characteristic data for primary verification, using the first biometrics information inputting unit, and registering the same, and an authenticating step of determining whether a person to be authenticated is a person registered in the registering step, on the basis of the registry biometrics characteristic data for primary verification or the registry data for secondary verification registered in the registering step.

At the authenticating step, second biometrics information of the person to be authenticated may be obtained via a second biometrics information inputting unit, it may be verified whether biometrics characteristic data extracted from the second biometrics information matches the registry biometrics characteristic data for primary verification registered beforehand, whether to carryout secondary verification may be determined on the basis of a result of the verification, data corresponding to the registry data for secondary verification may be inputted by the person to be authenticated using the second biometrics information inputting unit when the secondary verification is required to be carried out, it may be verified whether the data inputted by the second biometrics information inputting unit matches the registry data for secondary verification registered beforehand, and whether the person to be authenticated is a person registered in the registering step may be determined on the basis of a result of the verification.

The present invention still further provides a registering apparatus for a personal authentication system using biometrics information, the registering apparatus, in a system authenticating a person using biometrics information, having a first biometrics information inputting unit for obtaining biometrics information of a person to be registered to obtain data for verification from information inputted using the first biometrics information inputting unit, and registering the same, the registering apparatus comprising a first extracting unit and a secondary extracting unit similar to those described above. At this time, the registering apparatus may comprise a state determining unit, similar to the one described above, to perform extraction and registration by the second extracting unit according to a result of determination by the state determining unit.

The present invention still further provides an authenticating apparatus for a personal authentication system using biometrics information, the authenticating apparatus, in a system authenticating a person using biometrics information, determining whether a person to be authenticated is a registered person, on the basis of data for verification registered beforehand, the authenticating apparatus comprising a second biometrics information inputting unit, a third extracting unit, a primary verifying unit, a secondary verification shift determining unit, a fourth extracting unit, a secondary verifying unit, and a personal determining unit similar to those described above. At this time, the authenticating apparatus may comprise an instruction unit similar to that described above.

The present invention still further provides a pattern information input medium for a personal authentication system using biometrics information, the pattern information input medium used in a system having a biometrics information inputting unit for obtaining biometrics information as image data in order to authenticate a person by using the biometrics information, the pattern information input medium being mounted on the biometrics information inputting unit, the pattern information input medium comprising one or more contact parts for contacting with an image input screen of the biometrics information inputting unit to form a contact patter unique to a possessor to be detected by the biometrics information inputting unit instead of the biometrics information, the pattern information input medium being carried by the possessor. At this time, the one or more contact parts may form a pattern which changes in time series as the contact pattern.

According to this invention, when biometrics characteristic data to be referred to in normal verification (primary verification) is registered, registry data for secondary verification, which is different from that biometrics characteristic information and which is not limited to data of a body, is registered using the first biometrics information inputting unit. At this time, the same first biometrics information inputting unit is used in both registration of the registry biometrics characteristic data for primary verification and registration of the registry data for secondary verification. Using the registry biometrics characteristic data for primary verification or the registry data for secondary verification registered as described above, personal verification (personal authentication) of a person to be authenticated may be carried out.

When personal authentication becomes impossible in primary verification since a rate of matching between biometrics information, (registry characteristic data), obtained in registration, and biometrics information (characteristic data to be authenticated), obtained at the time of verification, is decreased due to an unexpected factor, secondary verification using registry data for secondary verification is possible with only existing structural apparatuses, that is, without newly adding an apparatus. In consequence, a user who cannot be authenticated in primary verification due to any factor after the registration can be relieved.

A state of registry biometrics character data for primary verification is determined in registration, and extraction and registration of registry data for secondary verification is carried out according to a result of the determination. It is thereby possible to recognize a person whose biometrics state is unstable in primary verification, or a person whose registry biometrics characteristic data for primary verification cannot be obtained from the beginning, and to beforehand register registry data for secondary verification of such persons as a measure for relief. As to a person whose biometrics state is unstable, probability of failure in authentication is high when the actual personal authentication is carried out using registry biometrics characteristic data for primary verification of the person. By registering registry data for secondary verification, it is possible to carry out secondary verification using the registry data for secondary verification in authentication even if authentication results in failure in the primary verification, so as to relieve users whose biometrics states are unstable, or whose registry biometrics characteristic data for primary verification cannot be obtained using only existing apparatuses, that is, without newly adding an apparatus.

In authentication, it is determined whether secondary verification is required to be carried out or not on the basis of a result of primary verification. When the secondary verification is necessary, a person to be authenticated inputs data corresponding to the registry data for secondary verification by using the second biometrics information inputting unit. The second biometrics information inputting unit is, of course, a device of the same type as the first biometrics information inputting unit (that is, a device obtaining biometrics information of the same type). These biometrics information inputting units may be provided as the same device to determine. It is determined whether a person to be authenticated is the person himself/herself (a registered person), on the basis of a result of secondary verification.

Therefore, even when authentication in primary verification results in failure, secondary verification using registry data for secondary verification is performed in authentication. It is therefore possible to relieve users whose authentication in primary verification becomes impossible due to any factor after registration, users whose biometrics state is unstable, or users whose registry biometrics characteristic data for primary verification cannot be obtained, with existing structural apparatuses.

When secondary verification is required to be carried out in the authenticating apparatus, the instruction unit prompts the person to be authenticated to input data for secondary verification by using the second biometrics information inputting unit. The person to be authenticated can smoothly shift to an operation to input the data for secondary verification according to the instruction.

In the authenticating apparatus, it is possible to arbitrarily set whether to carry out secondary verification or not by the secondary shift setting unit, and to set each of registered persons on which secondary verification is to be carried out by the personal information setting unit. Whereby, whether the procedure has to proceed from primary verification to secondary verification may be controlled arbitrarily or for each registered person.

Since biometrics characteristic data extracted from biometrics information on a part differing from that used in primary verification, more concretely, biometrics characteristic data extracted from fingerprint image data of a finger, which is different from a finger used in primary verification, is used as the registry data for secondary verification, data, which is necessary in the primary verification and the secondary verification, may be inputted by one biometrics information inputting unit.

At this time, the primary verification and the secondary verification are carried out using biometrics characteristic data of the same type, it is thus unnecessary to prepare extraction algorithm and verification algorithm for each of the primary verification and the secondary verification. This allows the first extracting unit and the second extracting unit to be used commonly and integrated in the registering apparatus, further not only the primary verifying unit and the secondary verifying unit but also the primary verifying unit and the secondary verifying unit to be commonly used and integrated in the authenticating apparatus.

Biometrics characteristic data of a different type from that used in the primary verification, extracted from biometrics information of the same type of that used in the primary verification, more concretely, biometrics characteristic data of a different type from that used in primary verification, extracted from fingerprint image data of the same finger or a different finger in primary verification, is used as the registry data for secondary verification, it is thereby possible to input data, which is necessary in the primary verification and the secondary verification, by one biometrics information inputting unit.

By employing non-biometrics information as the registry data for secondary verification inputted by the second biometrics information inputting unit, it is possible to input data, which is necessary in the primary verification and the secondary verification, through one biometrics information inputting unit. Namely, the biometrics information inputting unit may be served as both a device for inputting biometrics characteristic data for primary verification, and a device for inputting non-biometrics characteristic data (various data having intentional patterns).

When the non-biometrics characteristic data is time series data having a pattern determined by a person to be registered, the person inputs the time series data by tapping the first biometrics information inputting unit when registering data, and the time series data is extracted by the second extracting unit from information obtained by the first biometrics information inputting unit and registered as the registry data for secondary verification. When a person to be authenticated inputs time series data by tapping the second biometrics information inputting unit in the occasion of authentication, the time series data is extracted by the fourth extracting unit from information obtained by the second biometrics information inputting unit as data for secondary verification.

When the non-biometrics characteristic data is an input angle of a part of a body, the registrant beforehand determines a unique input angle (for example, an angle to a reference direction at which a finger is arranged) of the part of the body on the image input screen. In registration, when the person to be registered arranges the part of the body at a unique input angle on the image input screen of the first biometrics information inputting unit, image data of the part of the body is obtained by the first biometrics information inputting unit, an input angle is extracted from the image data by the secondary extracting unit and registered as the registry data for secondary verification. In secondary verification, the person to be authenticated arranges the part of the body at the unique input angle on the image input screen of the second biometrics information inputting unit, image data of the part of the body is obtained by the second biometrics information inputting unit, and the input angle of the part of the body is extracted from the image data as data for secondary verification by the fourth extracting unit.

When the non-biometrics characteristic data is a contact position, the person to be registered beforehand determines a unique contact position of a part of the body on the image input screen. In registration, when the person to be registered touches with the part of the body at the unique position on the image input screen of the first biometrics information inputting unit, image data of the part of the body is obtained by the first biometrics information inputting unit, and the contact position is extracted from the image data by the second extracting unit and registered as the registry data for secondary verification. In secondary verification, when the person to be authenticated touches with the part of the body at the unique contact position on the image input screen of the second biometrics information inputting unit, image data of the part of the body is obtained by the second biometrics information inputting unit, and the contact position of the part of the body is extracted from the image data as data for secondary verification by the fourth extracting unit.

When the non-biometrics characteristic data is contact trace information, the person to be registered beforehand determines a unique pattern (for example, a signature) to be drawn on the image input screen. In registration, when the person to be registered draws the unique pattern with his/her finger, a pen-like device or the like on the image input screen of the first biometrics information inputting unit while making it contact therewith, the pattern is obtained as image data by the first biometrics information inputting unit, and contact trace information is extracted from the image data by the second extracting unit and registered as the registry data for secondary verification. In secondary verification, when the person to be authenticated draws a unique pattern with his/her finger, a pen-like device or the like on the image input screen of the second biometrics information inputting unit while making it contact therewith, the pattern is obtained as image data by the second biometrics information inputting unit, and contact trace information is extracted from the image data as data for secondary verification by the fourth extracting unit.

When the non-biometrics characteristic data is a contact pattern on the image input screen of the biometrics information inputting unit, the person to be registered beforehand determines a unique contact pattern on the image input screen. In registration, the person to be registered forms the unique contact pattern on the image input screen of the first biometrics information inputting unit, the contact pattern is obtained as image data by the first biometrics information inputting unit, and the contact pattern is extracted from the image data by the second extracting unit and registered as the registry data for secondary verification. In secondary verification, when the person to be authenticated forms the unique contact pattern on the image input screen of the second biometrics information inputting unit, the contact pattern is obtained as image data by the second biometrics information inputting unit, and the contact pattern is extracted from the image data as data for secondary verification by the fourth extracting unit.

By using a pattern information input medium possessed and carried by the user (possessor, person to be registered, or registered person) to input a contact pattern, it is possible to certainly form a contact pattern unique to the user on the image input screen of the biometrics information inputting unit under stable conditions, at any time.

When the non-biometrics information is character data corresponding to a contact pattern or a position of a contact point detected as image data by the biometrics information inputting unit, the person to be registered beforehand determines unique character data or a unique character data string equivalent to a personal identification number, a password or the like. In registration, when the person to be registered forms one or more contact patterns corresponding to the unique character data or the unique character string on the image input screen of the first biometrics information inputting unit, or forms one or more contact points at one or more positions corresponding to the character data or the character data string, the contact patterns or the contact points are obtained as image data by the first biometrics information inputting unit, and the character data or the character data string is extracted from the image data by the second extracting unit and registered as the registry data for secondary verification. In secondary verification, when the person to be authenticated forms one or more contact patterns corresponding to unique character data or a unique character data string, or forms one or more contact points at one or more positions corresponding to the character data or the character data string, the contact patterns or the contact points are obtained as image data by the second biometrics information inputting unit, the character data or the character data string is extracted from the image data as data for secondary verification by the fourth extracting unit. As described above, the biometrics information inputting unit may function as a keyboard or a ten key pad.

At this time, the keyboard unit is disposed attachably to and detachably from the biometrics information inputting unit in order to form the contact patterns or the contact points corresponding to character data or a character data string determined by the user. An input from the keyboard unit is converted into character data by the keyboard information extracting unit, so that the biometrics information inputting unit may function as a keyboard or a ten key pad. The user can readily input character data or a character data string from the biometrics information inputting unit using the keyboard unit. A function of the keyboard information extracting unit is practically realized as software by the second extracting unit or the fourth extracting unit. What is added as hardware is only the keyboard unit to be mounted on the image input screen.

The personal authentication system and method, and the registering apparatus, the authenticating apparatus and the pattern information input medium for the system of this invention provide the following effects and advantages.

(1) By registering the registry data for secondary verification (personal verification information), secondary verification is performed by using the registry data for secondary verification even when primary verification results in failure in authentication. Therefore, by using only existing apparatuses, that is, without newly adding an apparatus, it is possible to relieve users whose authentication becomes impossible due to any factor after registration, users whose biometrics state is unstable, or users whose registry biometrics characteristic data for primary verification cannot be obtained. This can realize a measure for relief in authentication without causing complexity or an increase in cost.

(2) When secondary verification is required to be carried out, the person to be authenticated is instructed to input data for secondary verification by using the second biometrics information inputting unit. Accordingly, the person to be authenticated can smoothly and certainly proceed to an operation to input the data for secondary verification according to the instruction.

(3) Whether the procedure is to be proceeded from the primary verification to the secondary verification is set arbitrarily or for each registered person. It is therefore possible to control execution/non-execution of the secondary verification according to system using environment or at system manager's or registered person's request.

(4) Since the primary verification and the secondary verification are carried out by using biometrics characteristic data of the same sort, data of the user necessary in the primary verification and the secondary verification can be inputted from one biometrics information inputting unit. Further, it is unnecessary to prepare extraction algorithm or verification algorithm for each of the primary verification and the secondary verification. Therefore, both the primary verification and the secondary verification can be carried out by using existing hardware and software as they are.

(5) When secondary verification is performed, by using biometrics characteristic data of a different type from the one that is used in primary verification, extracted from biometrics information of the same type as that used in the primary verification, data, which is necessary in the primary verification and the secondary verification, can be inputted from one biometrics information inputting unit. Therefore, both the primary verification and the secondary verification can be carried out without newly adding any apparatus.

(6) By employing, as the registry data for secondary verification, non-biometrics characteristic data inputted by using the first biometrics information inputting unit, the biometrics information inputting unit can be used as both a device for inputting biometrics characteristic data for primary verification and a device for inputting non-biometrics characteristic data (various data having intentional patterns). It is therefore possible to input data, which is necessary in the primary verification and the secondary verification, through one biometrics information inputting unit, thereby allowing both the primary verification and the secondary verification to be carried out without newly adding any apparatus.

(7) The pattern information input medium, which is carried by a possessor, can certainly form a contact pattern unique to the possessor on the image input screen of the biometrics information inputting unit under constant conditions at any time. The pattern information input medium thus fulfils the similar function to a general seal in association with the biometrics information inputting unit. So long as a contact pattern unique to a possessor is beforehand registered as registry data for secondary verification, the possessor can input data for secondary verification in the personal authentication system by mounting it on the image input screen of the pattern information input medium in a way similar to when impressing a general seal on a paper. The personal authentication system can thereby realize a measure for relief in personal authentication using only existing structural apparatuses without causing complexity or an increase in cost.

(8) Character data or a character data string can be inputted via the biometrics information inputting unit. The biometrics information inputting unit can therefore function as a keyboard or a ten key pad without providing a keyboard or a ten key pad. So long as character data or a character data string equivalent to a personal identification number of a password is registered beforehand, the person to be authenticated can input character data or a character data string for secondary verification from the image input screen in the similar way to when inputting a personal identification number or a password from a keyboard or a ten key pad. The personal authentication system can thereby realize a measure for relief in personal authentication using only existing structural apparatuses without causing complexity or an increase in cost.

BRIEF DESCRIPTION OF THE DRAWINGS

FIGS. 11A through 11H are diagrams showing concrete examples of fingerprints in order to explain types of patterns of fingerprints;

FIG. 12 is a block diagram showing a third example of the concrete structure of the authenticating apparatus according to the embodiment;

FIG. 21A is a vertical sectional view showing an operational state of the electronic seal; FIG. 21B is a plan view showing an example of a contact pattern on a fingerprint input screen;

FIGS. 22A and 22B illustrate an operation of the electronic seal shown in FIG. 20; FIG. 22A is a vertical sectional view showing an operational state of the electronic seal; FIG. 22B is a plan view showing another example of the contact pattern on the fingerprint input screen;

FIG. 23 is a vertical sectional view showing a structure of another example of the electronic seal (pattern information input medium) used in the embodiment;

FIG. 24A is a vertical sectional view showing an operational state of the electronic seal; FIG. 24B is a plan view showing an example of the contact pattern on the fingerprint input screen;

FIG. 27A is a vertical sectional view of the same; FIG. 27B is a plan view of the same;

FIG. 28A is a vertical sectional view showing an operational state of the simplified keyboard; FIG. 28B is a plan view showing an example of an input pattern on a fingerprint input screen;

FIG. 29A is a vertical sectional view of the same; FIG. 29B is a plan view of the same; FIG. 30A is a vertical sectional view showing an operational state of the simplified keyboard; FIG. 30B is a plan view showing an example of an input pattern on the fingerprint input screen.

DESCRIPTION OF THE PREFERRED EMBODIMENTS

Hereinafter, description will be made of an embodiment of this invention with reference to the drawings.

Figure 1:
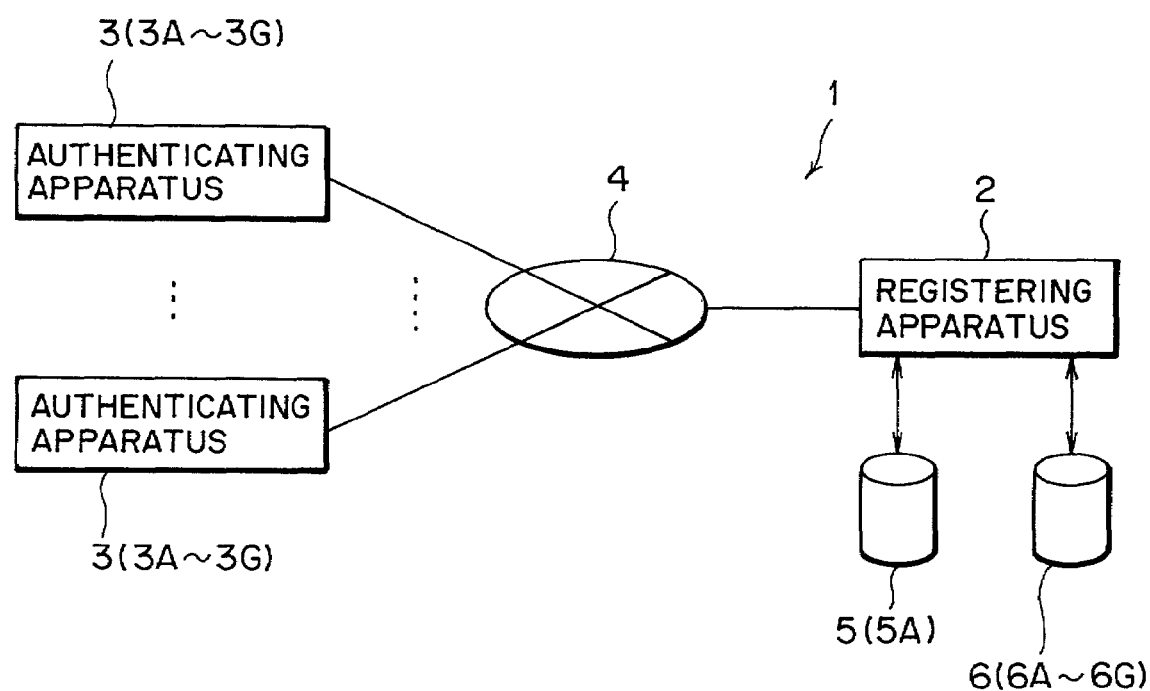
FIG. 1 is a block diagram showing a structure of a personal authentication system using biometrics information according to an embodiment of this invention.

FIG. 1 is a block diagram showing a structure of a personal authentication system using biometrics information according to an embodiment of this invention. As shown in FIG. 1, the personal authentication system 1 according to this embodiment comprises a registering apparatus 2, an authenticating apparatus 3 (3A to 3G), a communication network 4, a data storage unit for primary verification 5 (5A), and a data storage unit for secondary verification 6 (6A to 6G) in order to authenticate a person using biometrics information (for example, fingerprint, palm print, finger shape, palm shape, voice, retina, iris, face image, dynamic signature, blood vessel pattern, keystroke, or the like).

The registering apparatus 2 comprises an information inputting unit 10 (refer to FIG. 2) to obtain biometrics information of a person (user) to be registered. The registering apparatus 2 obtains data for verification from information inputted using the information inputting unit 10, and registers the data in the data storage unit 5 (5A) for primary verification or the data storage unit 6 (6A to 6G) for secondary verification, which is configured as will be described later with reference to FIG. 2.

The authenticating apparatus 3 (3A to 3G) determines whether a person (user) to be authenticated is the person himself/herself (registered person) by using the data for verification which has been beforehand registered by the person to be authenticated into the data storage unit 5 (5A) or the data storage unit 6 (6A to 6G) of the registering apparatus 2. The authenticating apparatus 3 (3A to 3G) is configured as will be described later with reference to FIG. 3.

The registering apparatus 2 and the plural authenticating apparatuses 3 (3A to 3G) are communicably connected over the communication network 4 such as Internet, an intranet or the like. Each of the authenticating apparatus 3 (3A to 3G) has an access to the data storage unit 5 (5A) or 6 (6A to 6G) under the registering apparatus 2 over the communication network 4 to refer to data for verification registered in the data storage unit 5 (5A) or 6 (6A to 6G).

Figure 2:
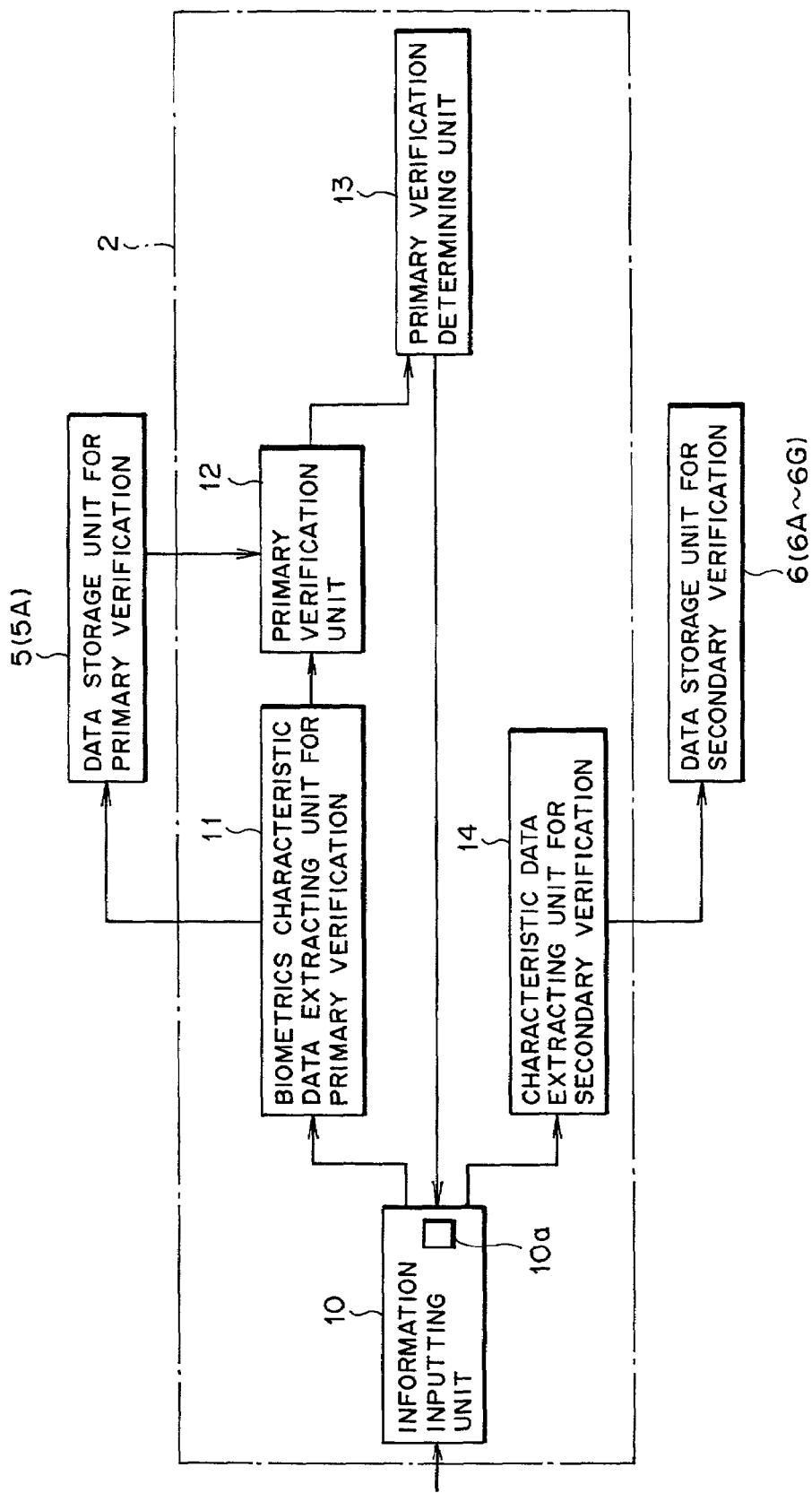
FIG. 2 is a block diagram showing a structure of a registering apparatus for the personal authentication system using biometrics information according to the embodiment of this invention.

Incidentally, the registering apparatus 2 directly registers data for verification in the data storage unit 5 (5A) or 6 (6A to 6G), as shown in FIGS. 1 and 2. The registering apparatus 2 may alternatively register data for verification in a data storage unit connected over the communication network. The authenticating apparatus 3 (3A to 3G) is connected to the data storage unit 5 (5A) or 6 (6A to 6G) over the communication network 4 in the example shown in FIG. 1. Alternatively, the authenticating apparatus 3 (3A to 3G) may be directly connected to the data storage unit 5 (5A) or 6 (6A to 6G) as shown in FIGS. 3, 6, 9, 12, 14, 16, 18 and 25.

FIG. 2 is a block diagram showing a structure of the registering apparatus 2 in the personal authentication system 1 according to this embodiment. As shown in FIG. 2, the registering apparatus 2 comprises the information inputting unit 10, a biometrics characteristic data extracting unit 11 for primary verification, a primary verifying unit 12, a primary verification determining unit 13, and a characteristic data extracting unit 14 for secondary verification.

The information inputting unit (biometrics information inputting unit for registration, first biometrics information inputting unit) 10 obtains biometrics information of a person (user) to be registered. In concrete, the information inputting unit 10 is a fingerprint scanner or the like that has been already used in general. As kinds of biometrics information obtained by the information inputting unit 10, there are, for example, image data such as fingerprint, palm print, finger shape, palm shape, retina, iris, face image, blood vessel pattern and the like, and time series data such as dynamic signature, voice, key stroke and the like, any one of which is obtained by the information inputting unit 10.

The information inputting unit 10 according to this embodiment is used, not only to obtain biometrics information of a person to be registered as data for primary verification, but also to input data for secondary verification which is different from the data for primary verification. Further, the information inputting unit 10 is provided with an instruction unit 10a, which will be described later.

The biometrics characteristic data extracting unit for primary verification (first extracting unit) 11 extracts and generates biometrics characteristic data based on biometrics information of the person (user) to be registered, obtained by the information inputting unit 10, and registers the biometrics characteristic data as registry biometrics characteristic data for primary verification into the data storage unit 5 (5A) for primary verification.

The primary verifying unit 12 and the primary verification determining unit 13 function as a state determining unit for determining a state of the registry biometrics characteristic data for primary verification extracted by the extracting unit 11. According to a result of the determination, it is determined whether the characteristic data extracting unit 14 for secondary verification 14 carries out extraction and registration.

The instruction unit 10a in the information inputting unit 10 prompts the person to be registered to input data for secondary verification through the information inputting unit 10 when it is necessary to register data for secondary verification. As the instruction unit 10a, a light emitting element such as an LED or the like, a speaker generating buzz or the like, or an indicator such as an LCD or the like is used.

The primary verifying unit 12 in the registering apparatus 2 fulfils the similar function to a primary verifying unit 22 (to be described later) of the authenticating apparatus 3 (3A to 3G), which performs the similar primary verification to that performed in personal authentication.

Namely, in order to determine whether registered registry biometrics characteristic data for primary verification can produce a result of verification sufficient to authenticate a person in the actual verification, the registering apparatus 2 makes the person to be registered input the same biometrics information once more, and performs examination and verification, which will be described later. In this occasion, the instruction unit 10a described above may be used to prompt the person to be registered to input the same biometrics information once more.

At this time, the biometrics characteristic data extracting unit 11 for primary verification operates so as to extract and generate biometrics characteristics data for examination and verification once more, based on the re-inputted biometrics information. The primary verifying unit 12 compares and matches the biometrics characteristics data, obtained again by the extracting unit 11, with biometrics characteristics data registered in the data storage unit 5 in the last examination and verification. Namely, the primary verifying unit 12 performs examination and verification of registry biometrics characteristic data for primary verification.

The primary verification determining unit 13 receives a result of the verification from the primary verifying unit 12 to determine whether a rate of matching is equal to or greater than a predetermined threshold value p or not, thereby determining whether the registry biometrics characteristic data for primary verification can produce a result of verification sufficient to authenticate the person in actual verification, that is, whether the characteristic data extracting unit 14 for secondary verification carries out extraction and registration.

When the rate of matching is equal to or greater than the threshold value p, registration of data for secondary verification is not performed. When the rate of matching is less than the threshold value p, it is determined that the registry biometrics characteristic data for primary verification cannot produce a result of verification sufficient to authenticate the person in actual verification. The primary verification determining unit 13 thus makes the instruction unit 10a operate to prompt the person to input data for secondary verification through the information inputting unit 10. If the threshold value p is set to 101% at this time, it becomes possible that the procedure always proceeds to an information inputting process for secondary verification, that is, the information inputting process for secondary verification is always performed on all registered persons.

The characteristic data extracting unit (second extracting unit) 14 for secondary verification extracts and generates a single kind or plural kinds of data, which is different from the registry biometrics characteristic data for primary verification, based on information inputted by using the information inputting unit 10 according to a result of the verification by the primary verification determining unit 13 (instructing operation by the instruction unit 10a), and registers the data as registry data for secondary verification in the data storage unit 6 (6A to 6G) for secondary verification. The registry data for secondary verification is roughly classified into biometrics characteristic data extracted from the biometrics information on a person to be registered and non-biometrics characteristic data extracted from information intentionally inputted by the person to be registered using the information inputting unit 10.

When the registry data for secondary verification is biometrics characteristic data, the biometrics characteristic data is extracted from biometrics information which is different from biometrics information obtained for primary verification. The registry data for secondary verification is, in concrete, described in items (i) and (ii) below.

(i) Biometrics characteristic data extracted from biometrics information of the same type as biometrics information, which is obtained in primary verification, but obtained from one or more parts which are different from a part from which the biometrics information has been obtained in the primary verification, is used as registry data for secondary verification. More concretely, when the biometrics information is fingerprint image data, biometrics characteristic data extracted from fingerprint image data of one or more fingers which are different from a finger, from which the registry biometrics characteristic data for primary verification has been obtained, is used as registry data for secondary verification.

(ii) Biometrics characteristic data of a different type from biometrics characteristic data obtained in primary verification extracted from biometrics information, which is obtained from the same part or a different part but of the same type as biometrics information obtained in the primary verification, is used as registry data for secondary verification. When the biometrics information is fingerprint image data, biometrics characteristic data (for example, fingerprint pattern) of a different type from the biometrics characteristic data (for example, minutiae) obtained in primary verification, extracted from fingerprint image data of the same finger as a registered finger from which the registry biometrics characteristic data for primary verification has been obtained, or, one or more fingers which are different from the registered finger, is used as registry data for secondary verification.

When registry data for secondary verification is non-biometrics characteristic data, the non-biometrics characteristic data is as described in items ① to ⑥ below.

① Time series data having a pattern determined by a person to be registered is used as non-biometrics characteristic data. When the information inputting unit 10 obtains fingerprint image data as biometrics information, for example, the person taps an image input screen of the information inputting unit 10 with his/her finger according to a unique pattern determined beforehand to input time series information (Morse code or the like). The extracting unit 14 extracts time series data in a predetermined pattern as non-biometrics characteristic data from image data obtained in time series at that time.

② An input angle of a predetermined part of a body on the image input screen, detected as image data by the information inputting unit 10, is used as non-biometrics characteristic data. When the information inputting unit 10 obtains fingerprint image data as biometrics information, for example, the person touches with his/her finger and arranges the finger at a predetermined unique input angle on the image input screen of the information inputting unit 10. The extracting unit 14 then extracts the input angle to a reference direction as non-biometrics characteristic data from image data obtained in such state.

③ A contact position of a predetermined part of a body on the image input screen, detected as image data by the information inputting unit 10, is used as non-biometrics characteristic data. When the information inputting unit 10 obtains fingerprint image data as biometrics information, for example, the person touches with his/her finger and arranges the finger at a predetermined unique position on the image input screen of the information inputting unit 10. The extracting unit 14 then extracts a contact position of the finger as non-biometrics characteristic data from image data obtained in such state.

④ Information on a contact trace on the image input screen, detected as image data by the information inputting unit 10, is used as non-biometrics characteristic data. When the information inputting unit 10 obtains fingerprint image data as biometrics information, for example, the person draws a unique pattern on the image input screen of the information inputting unit 10 while touching the image input screen with his/her finger, a pen-like device or the like to enter it. The extracting unit 14 then extracts contact trace information as non-biometrics characteristic data from image data obtained at that time.

⑤ A contact pattern on the image input screen, detected as image data by the information inputting unit 10, is used as non-biometrics characteristic data. When the information inputting unit 10 obtains fingerprint image data as biometrics information, for example, the person forms a unique contact pattern on the image input screen of the information inputting unit 10. The extracting unit 14 then extracts a contact pattern as non-biometrics characteristic data from image data obtained in such state. At this time, it is alternatively possible to form a contact pattern on the image input screen with an electronic seal (pattern information input medium) to be described later with reference to FIGS. 20 through 24. Such electronic seal is possessed and carried by a user (person to be registered, registered person, person to be authenticated). When registration is made using an electronic seal, the same electronic seal is used when secondary verification is actually performed, as a matter of course.

⑥ When character data, corresponding to each of plural different contact patterns or each of positions of plural different contact points on the image input screen of the information inputting unit 10, is beforehand set, the character data corresponding to a contact pattern or a position of a contact point detected as image data by the information inputting unit 10 is used as non-biometrics characteristic data. When the information inputting unit 10 obtains fingerprint image data as biometrics information, for example, the person forms one or more contact patterns corresponding to unique character data or a character data string, or forms one or more contact points at one or more positions corresponding to the character data or the character data string, equivalent to a personal identification number, a password or the like, on the image input screen of the information inputting unit 10. The extracting unit 14 then extracts character data or a character data string corresponding to the contact patterns or the contact points as non-biometrics characteristic data from image data obtained at that time. At this time, a keyboard unit to be described later with reference to FIGS. 27 through 30 may be used to perform a contacting/inputting operation on the image input screen.

The registering apparatus 2 is realized by connecting the information inputting unit 10 such as a fingerprint scanner (fingerprint unit) or the like to a computer configured with, for example, a CPU, an ROM, an RAM, a display and the like inter-connected. In this case, functions of the biometrics characteristic data extracting unit 11 for primary verification, the primary verifying unit 12, the primary verification determining unit 13 and the characteristic data extracting unit 14 for secondary verification are realized with a CPU. Therefore, the registering apparatus 2 can be realized by using an existing registering apparatus as it is without modifying at all a structure of hardware of the existing registering apparatus.

Figure 3:
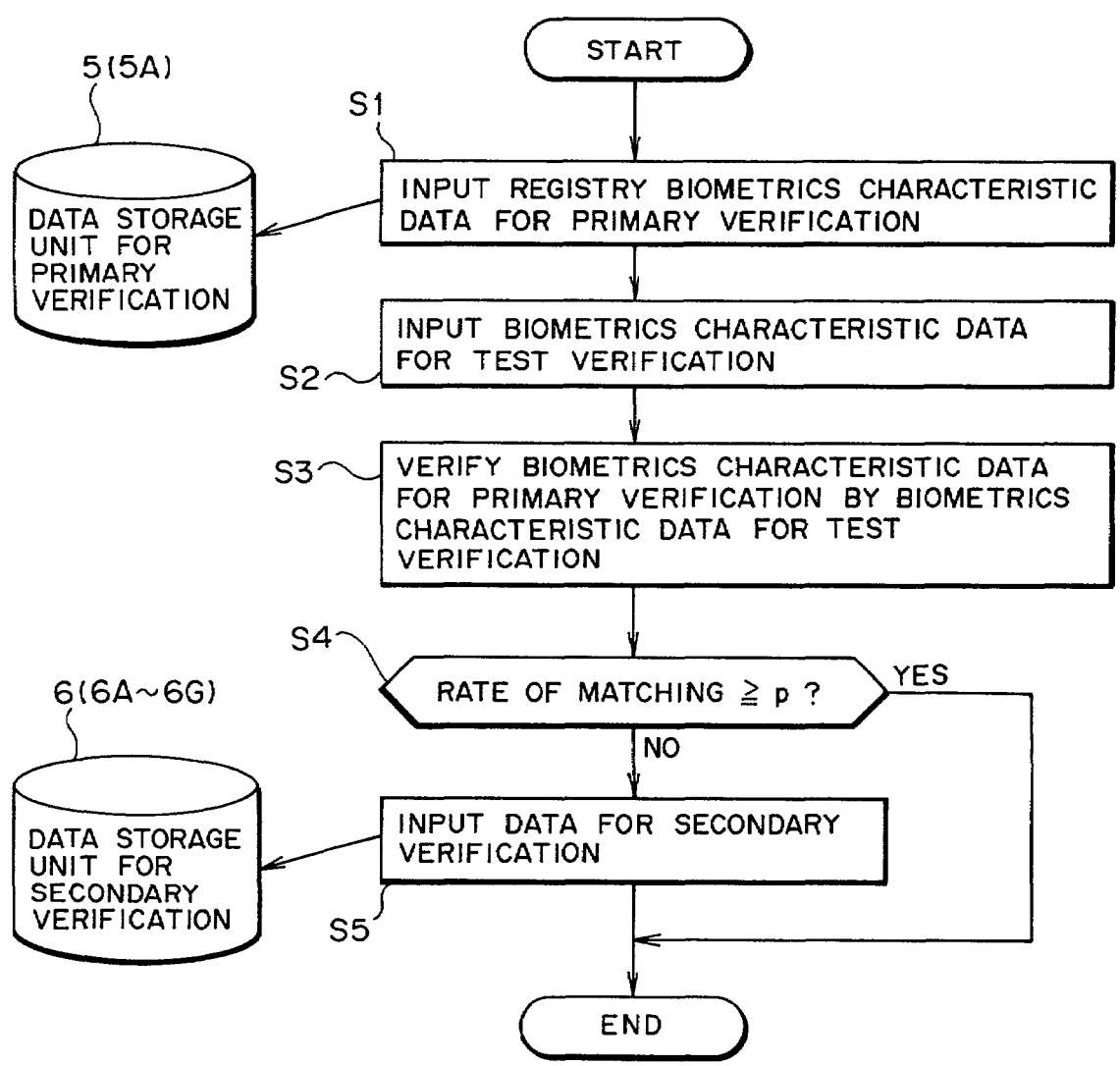
FIG. 3 is a flowchart for illustrating a procedure for registration by the registering apparatus according to the embodiment.

Next, a procedure for registry by the registering apparatus 2 in the above structure according to this embodiment will be described with reference to a flowchart (steps S1 to S5) shown in FIG. 3.

The person (user) to be registered inputs biometrics information from the information inputting unit 10 as same as before. The biometrics characteristic data extracting unit 11 extracts and generates biometrics characteristic data based on the biometrics information obtained by the information inputting unit 10. The biometrics characteristic data is registered as registry biometrics characteristic data for primary verification in the data storage unit 5 (step S1).

After that, the person to be registered inputs the same biometrics information once more through the same information inputting unit 10. The biometrics characteristic data extracting unit 11 extracts and generates biometrics characteristic data for examination and verification based on the biometrics information which is inputted once more (step S2). The primary verifying unit 12 compares and matches the biometrics characteristic data for examination and verification with the registry biometrics characteristic data for primary verification obtained at step S1 (step S3).

The primary verification determining unit 13 determines whether a result of the verification, that is, a rate of matching, obtained in the primary verification unit 12, is equal to or greater than a predetermined threshold value p (step S4). Whereby, it is determined whether the registry biometrics characteristic data for primary verification can produce a result of verification sufficient to authenticate the person when verification is actually performed. When the rate of matching is equal to or greater than the predetermined value p (YES route at step S4), the process is terminated without registering data for secondary verification.

When the rate of matching is less than the threshold value p (NO route at step S4), it is determined that the registry biometrics characteristic data for primary verification cannot produce a result sufficient to authenticate the person when verification is actually performed. The instruction unit 10a thus operates to prompt the person to be registered to input data for secondary verification through the information inputting unit 10.

When the person to be registered inputs information for secondary verification trough the same information inputting unit 10 as the one through which the biometrics information for primary verification has been inputted in response to the instruction from the instruction unit 10a, the characteristic data extracting unit 14 extracts and generates characteristic data from the information for secondary verification. The characteristic data is registered as registry data for secondary verification in the data storage unit 6 (step S5), and the process is terminated.

At this time, if the threshold value p for determination at the step S4 is set to 101%, the procedure always proceeds to the information inputting process for secondary verification, it is thereby possible to register registry data for secondary verification of all registered persons.

Figure 4:
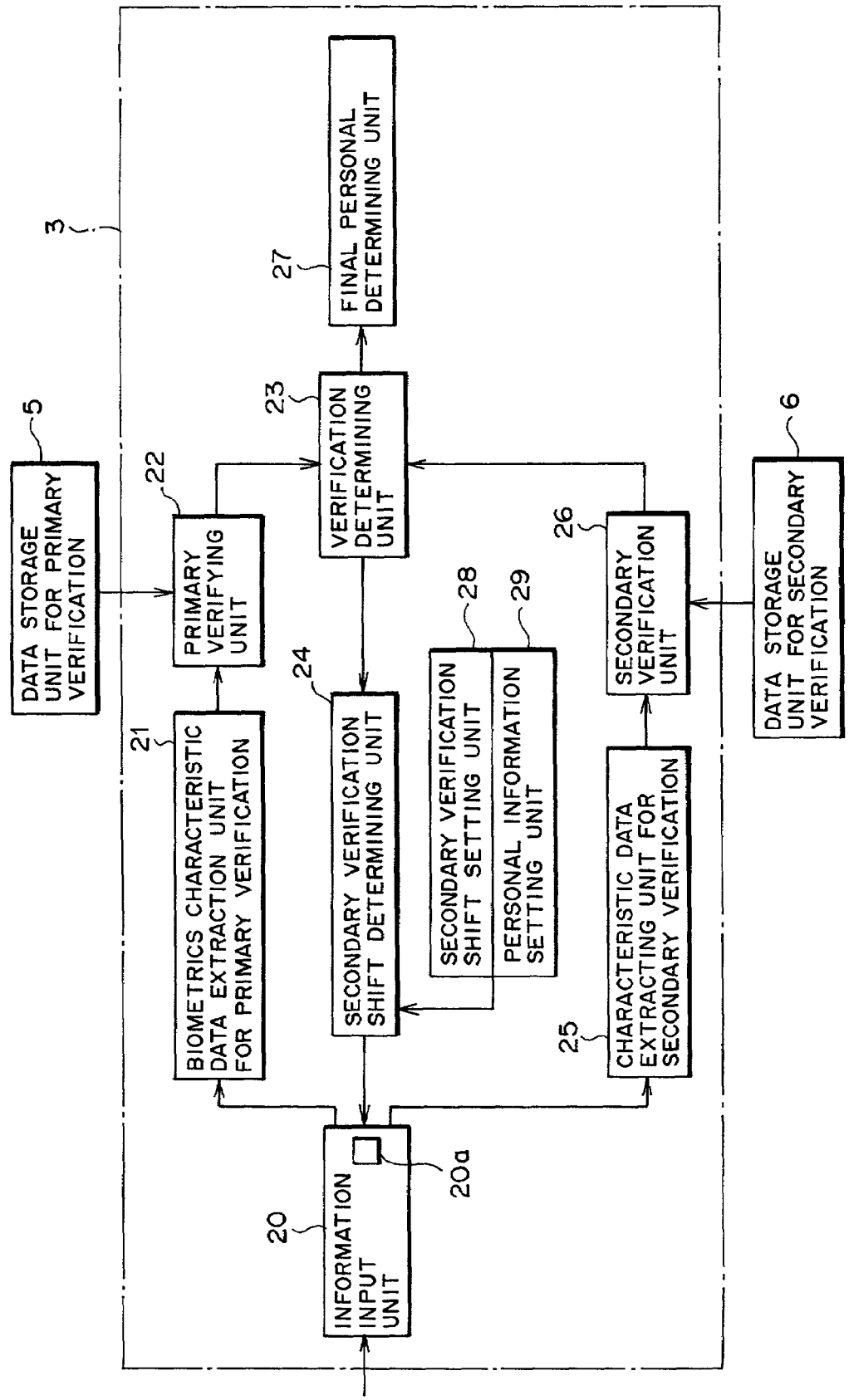
FIG. 4 is a block diagram showing a basic structure of an authenticating apparatus for the personal authentication system using biometrics information according to the embodiment of this invention.

FIG. 4 is a block diagram showing a basic structure of the authenticating apparatus 3 in the personal authentication system 1 according to this embodiment. As shown in FIG. 4, the authenticating apparatus 3 comprises an information inputting unit 20, a biometrics characteristic data extracting unit 21 for primary verification, a primary verifying unit 22, a verification determining unit 23, a secondary verification shift determining unit 24, a characteristic data extracting unit 25 for secondary verification, a secondary verifying unit 26, a final personal determining unit 27, a secondary verification shift setting unit 28, and a personal information setting unit 29.

The information inputting unit (biometrics information inputting unit for authentication, second biometrics information inputting unit) 20 obtains biometrics information of a person (user) to be authenticated. The biometrics information obtained by the information inputting unit 20 is of the same type as data stored in the data storage unit 5. The information inputting unit 20 is thus a device of the same type (namely, a device obtaining the same type of biometrics information) as the information inputting unit 10 for registry.

The information inputting unit 20 is used to not only obtain biometrics information of the person to be authenticated as data for primary verification but also input data for secondary verification which is different from the data for primary verification, similarly to the information inputting unit 10. The information inputting unit 20 is equipped with an instruction unit 20a to be described later.

The biometrics characteristic data extracting unit (third extracting unit) 21 for primary verification extracts biometrics characteristic data to be authenticated from biometrics information of the person (user), obtained by the information inputting unit 20.

The primary verifying unit 22 compares and matches the biometrics characteristic data extracted by the extracting unit 21 with the registry biometrics characteristic data for primary verification of the person registered beforehand in the data storage unit 5.

When receiving a result of verification from the primary verifying unit 22, the verification determining unit (personal determining unit) 23 determines whether a rate of matching obtained in the primary verification is equal to or more than a primary verification acceptable threshold value n or not. The verification determining unit 23 also determines whether a rate of matching obtained in secondary verification is equal to or more than a secondary verification acceptable threshold value m or not when a result of verification from the secondary verifying unit 26, which will be described later, is received.

When the verification determining unit 23 determines that the rate of matching in the primary verification is less than the primary verification acceptable threshold value n, the secondary verification shift determining unit 24 determines whether the rate of matching in the primary verification is equal to or more than a secondary verification shift threshold value s (s<n) or not. Additionally, the secondary verification shift determining unit 24 also refers to a state of setting by the secondary verification shift setting unit 28 and the personal information setting unit 29 (state of definition of whether secondary verification is to be performed) or not, and determines whether secondary verification is necessary, that is, whether the procedure shifts to secondary verification or not, on the basis of the state of setting and a result of determination on the rate of matching.

The secondary verification shift setting unit 28 is served to voluntarily set and define whether verification by the secondary verifying unit 25 is to be performed or not. The personal information setting unit 29 beforehand sets and defines information on whether verification by the secondary verifying unit 25 is to be performed or not for each user (registered person) as personal information. The personal information is stored together with the registry biometrics characteristic data for primary verification in, for example, the data storage unit 5.

When determining that the rate of matching of the primary verification is equal to or more than the secondary verification shift threshold value s (s<n) and recognizing that the secondary verification shift setting unit 28 and the person information setting unit 29 recognize that shift to the secondary verification is allowed, the secondary verification shift determining unit 24 makes the instruction unit 20a operate to prompt the person to be authenticated to input data for secondary verification through the information inputting unit 20. Incidentally, as the instruction unit 20a, a light emitting element such as an LED or the like, a speaker generating buzz or the like, or an indicator such as an LCD or the like, for example, is used similarly to the instruction unit 10a.

The characteristic data extracting unit (fourth extracting unit) 25 for secondary verification extracts data for secondary verification from information inputted using the information inputting unit 20 according to a result of determination by the secondary verification shift determining unit 24 (instructing operation by the instruction unit 20). The data to be authenticated which is extracted at this time is, of course, of the same type as the registry data for secondary verification registered in the data storage unit 6 for secondary verification in the above-described registering apparatus 2 at the time of registration.

The secondary verifying unit 26 compares and matches the data extracted by the extracting unit 25 with the registry data for secondary verification of the person to be authenticated. The registry data is registered beforehand in the data storage unit 6.

The final personal determining unit (personal determining unit) 27 cooperates with the above-described verification determining unit 23 to function as a personal determining unit that determines whether the person to be authenticated is the person himself/herself (registered person) or not, on the basis of results of verification by the primary verifying unit 22 and the secondary verifying unit 26. When the verification determining unit 23 determines that a rate of matching in primary verification is equal to or more than the threshold value n or that a rate of matching in secondary verification is equal to or more than the threshold value m, the final personal determining unit 27 determines and authenticates that the person to be authenticated is the person himself/herself (registered person). When the verification determining unit 23 determines that a rate of matching in secondary verification is less than the threshold value m, or when the secondary verification shift determining unit 24 determines that shift to secondary verification is unnecessary, the final personal determining unit 27 neither determines nor authenticates that the person to be authenticated is the person himself/herself (registered person), as a matter of course.

Meanwhile, when plurality of registry data for secondary verification are registered (for example, when biometrics characteristic data extracted from fingerprint image data of plural fingers is registered), the person to be authenticated operates to input biometrics information plural times correspondingly to that. The extracting unit 25 extracts plurality of data to be authenticated from the biometrics information. In such case, the final personal determining unit 27 determines and authenticates that the person to be authenticated is the person himself/herself (registered person) when rates of verification that are results of secondary verification of all authenticating object data are equal to or more than the threshold value m.

The authenticating apparatus 3 is actually realized by connecting the information inputting unit 20, such as a fingerprint scanner (fingerprint unit) or the like, to a computer configured with, for example, a CPU, an ROM, an RAM, a display and the like inter-connected by bus lines. In this case, functions as the biometrics characteristic data extracting unit 21 for primary verification, the primary verifying unit 22, the verification determining unit 23, the secondary verification shift determining unit 24, the characteristic data extracting unit 25 for secondary verification, the secondary verifying unit 26, and the final personal determining unit 27, are realized with a CPU. Therefore, the authenticating apparatus 3 according to this embodiment can be realized by using an existing authenticating apparatus as it is without necessity for modifying the hardware structure of the existing registering apparatus at all. Incidentally, each of the authenticating apparatuses 3A to 3G to be described later are structured in a similar way to the authenticating apparatus 3.

Further, it is possible to provide an apparatus having functions of both the registering apparatus 2 and the authenticating apparatus 3 described above. Such apparatus is realized by connecting an information inputting unit such as a fingerprint scanner (fingerprint unit) or the like to a computer configured with, for example, a CPU, an ROM, an RAM, a display and the like, as described above. In such case, one information inputting unit may be served as both the information inputting units 10 and 20. Additionally, the data extracting units 11 and 21, the data extracting units 14 and 25, the primary verifying units 12 and 22, and the verification determining units 13 and 23 may be realized with the same software, respectively.

Figure 5:
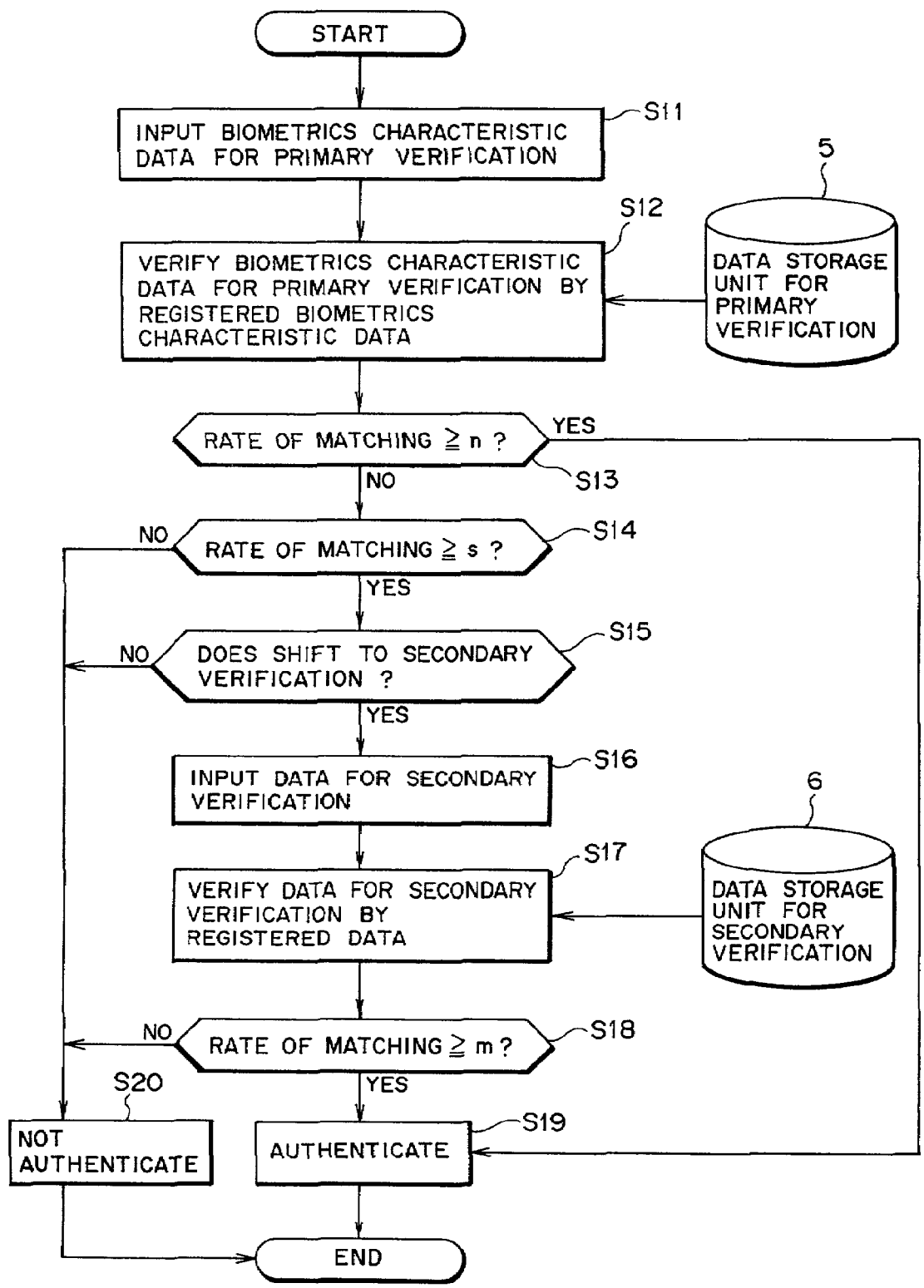
FIG. 5 is a flowchart for illustrating a procedure for authentication by the authenticating apparatus according to the embodiment.

Next, a procedure for authentication by the authenticating apparatus 3 in the above structure according to this embodiment will be described with reference to a flowchart (steps S11 to S20) shown in FIG. 5.

A person (user) to be authenticated inputs biometrics information via the information inputting unit 20 as same as before. The biometrics characteristic data extracting unit 21 extracts biometrics characteristic data from the biometrics information obtained by the information inputting unit 20 (step S11).

The primary verifying unit 22 compares and matches the biometrics characteristic data extracted by the extracting unit 21 with registry biometrics characteristic data for primary verification of the person to be authenticated (step S12). The registry biometrics characteristic data is registered beforehand in the data storage unit 5. The verification determining unit 23 determines whether a rate of matching obtained in primary verification is equal to or more than the primary verification acceptable threshold value n or not (step S13).

When the verification determining unit 23 determines that the rate of matching in the primary verification equal to or more than the threshold value n (YES route at step S13), the final personal determining unit 27 determines and authenticates that the person to be authenticated is the person himself/herself (registered person) since a rate of matching sufficient to determine that the person to be authenticated is the person himself/herself (registered person) is obtained in the primary verification (step S19), and the process is terminated.

When the verification determining unit 23 determines that the rate of matching in the primary verification is less than the threshold value n (NO route at step S13), that is, when a rate of matching sufficient to determine that the person to be authenticated is the person himself/herself (registered person) cannot be obtained in the primary verification, the secondary verification shift determining unit 24 determines whether the rate of matching in the primary verification is equal to or more than the secondary verification shift threshold value s (s<n) or not (step S14).

When the secondary verification shift determining unit 24 determines that the rate of matching in the primary verification equal to or more than the threshold value s (YES route at step S14), the secondary verification shift determining unit 24 uninterruptedly refers to a state of setting (state of defining of whether secondary verification is to be performed or not) by the secondary verification shift setting unit 28 and the personal information setting unit 29 to determine on the basis of the state of setting whether shift to the secondary verification is allowed or not (step S15).

When the secondary verification shift determining unit 24 recognizes that shift to secondary verification is set to be allowed (YES route at step S15), the instruction unit 20a operates to prompt the person to be authenticated to input data for secondary verification via the information inputting unit 20.

When the person to be authenticated inputs information for secondary verification via the same information inputting unit 20 as that used when the biometrics information that is an object of authentication has been inputted in response to the instruction from the instruction unit 20a, the characteristic data extracting unit for secondary verification 25 extracts authenticating object data corresponding to the registry data for secondary verification from the information for secondary verification (step S16).

The secondary verifying unit 26 performs secondary verification (relief verification) to compare and match the data extracted by the extracting unit 25 with registry data for secondary verification of the person to be authenticated (step S17). The registry data is registered beforehand in the data storage unit 6. The verification determining unit 23 determines whether a rate of matching obtained in the secondary verification is equal to or more than the secondary verification acceptable threshold value m or not (step S18).

When the verification determining unit 23 determines that the rate of matching in the secondary verification is equal to or more than the threshold value m (YES route at step S18), the final personal determining unit 27 determines and authenticates that the person to be authenticated is the person himself/herself (registered person) since a rate of matching sufficient to determine that the person to be authenticated is the person himself/herself (registered person) is obtained in the secondary verification (step S19), and the process is terminated.

On the other hand, when the verification determining unit 23 determines that the rate of matching in the secondary verification is less than the threshold value m (NO route at step S18), that is, when a rate of matching sufficient to determine that the person to be authenticated is the person himself/herself (registered person) cannot be obtained even in the secondary verification, the final personal determining unit 27 determines not to authenticate (does not authenticate that the person to be authenticated is the person himself/herself (registered person)) (step S20), and the process is terminated.

When the secondary verification shift determining unit 24 determines that the rate of matching in the primary verification is less than the secondary verification shift threshold value s (NO route at step S14), or when shift to secondary verification is set to be unallowable (NO route at step S15), the final personal determining unit 27 determines not to authenticate (step S20), and the process is terminated.

Therefore, in the personal authentication system 1 according to this embodiment, when a rate of matching in primary verification falls within a predetermined range (range from equal to or more than s to less than n in this embodiment) and shift to secondary verification is allowed even though primary verification results in rejection of authentication, information for carrying out secondary verification is inputted from the information inputting unit 20, and the secondary verification (relief verification) is carried out. At this time, it is possible to authenticate a person in the secondary verification by setting the secondary verification shift threshold value s to 0% and defining that the secondary verification is always performed when the primary verification is failed, even if personal authentication becomes impossible in the primary verification due to a factor such as injury or the like.

According to the personal authentication system 1 (the registering apparatus 2 and the authenticating apparatus 3) of this embodiment of this invention, when biometrics characteristic data that is referred to, when normal authentication (primary verification) is performed is registered, registry data for secondary verification (personal identification information), which is different from the biometrics characteristic data and is not limited to data relating to biometrics, is registered using the information inputting unit 10. Both when the registry biometrics characteristic data for primary verification is registered, and when registry data for secondary verification is registered, the same information inputting unit 10 is used.

By registering registry data for secondary verification, secondary verification (relief verification) using the registry data for secondary verification is carried out even when authentication in primary verification results in failure in authentication. It is thereby possible to relieve users who cannot receive authentication in primary verification due to any factor after registration, users whose states of biometrics are unstable, and users whose registry biometrics characteristic data for primary verification cannot be obtained, without newly adding an apparatus. This allows a measure for relief in personal authentication without causing complexity or an increase in cost.

Upon registration, the primary verifying unit 12 and the primary verification determining unit 13 determine a state of biometrics characteristic data for primary verification, and extraction and registration for secondary verification are carried out according to a result of the determination. Accordingly, it is possible to recognize a person whose state of biometrics to be obtained in primary verification is unstable or a person whose registry biometrics characteristic data for primary verification cannot be obtained from the beginning according to the determination, and as a measure for relief, it is possible to register in advance registry data for secondary verification of only such persons.

When secondary verification is required in the authenticating apparatus 3, the instruction unit 3 prompts a person to be authenticated to input data for secondary verification through the information inputting unit 20. The person to be authenticated can smoothly and certainly shift to an operation for inputting the data for secondary verification according to the instruction.

In the authenticating apparatus 3, it is possible to voluntarily set by the secondary verification shift setting unit 28 whether secondary verification is to be carried out or not. In addition, it is possible to individually set a registered person who should be secondary-matched, which makes it possible to voluntarily set or set for each registered person whether the procedure should shift from primary verification to secondary verification. Accordingly, it is possible to control execution/non-execution of secondary verification according to an environment in which the system is used, or meeting a demand by the system manager or each registered person.

Next, an example of a concrete structure of the authenticating apparatus used in the personal authentication system 1 of this embodiment will be described with reference to FIGS. 6 through 30.

Each of the authenticating systems 3A to 3G to be described in the following examples is to realize a measure for relief (relief verification) when authentication by fingerprints results in failure in a system in which a fingerprint is obtained as biometrics information to authenticate a person. This invention is not limited to only fingerprint authentication, but also applicable to a system in which palm print, finger shape, palm shape, voice (voice print), retina, iris, face image, dynamic signature, blood vessel pattern, keystroke or the like, for example, is obtained to carry out biometrics authentication. Even in a personal authentication system using biometrics information other than fingerprints, this invention can accomplish a measure for relief when personal authentication becomes impossible due to an unexpected factor.

Figure 6:
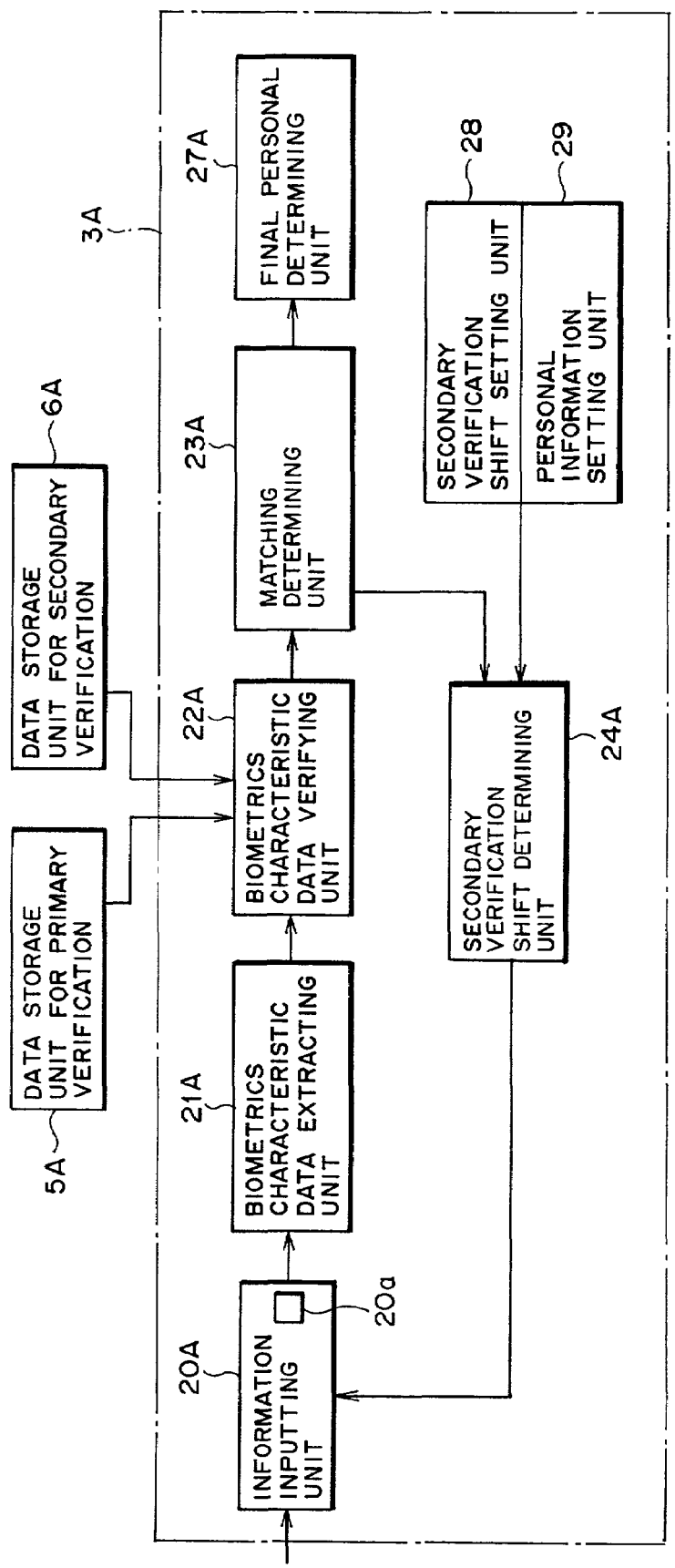
FIG. 6 is a block diagram showing a first example of a concrete structure of the authenticating apparatus according to the embodiment.
Figure 7:
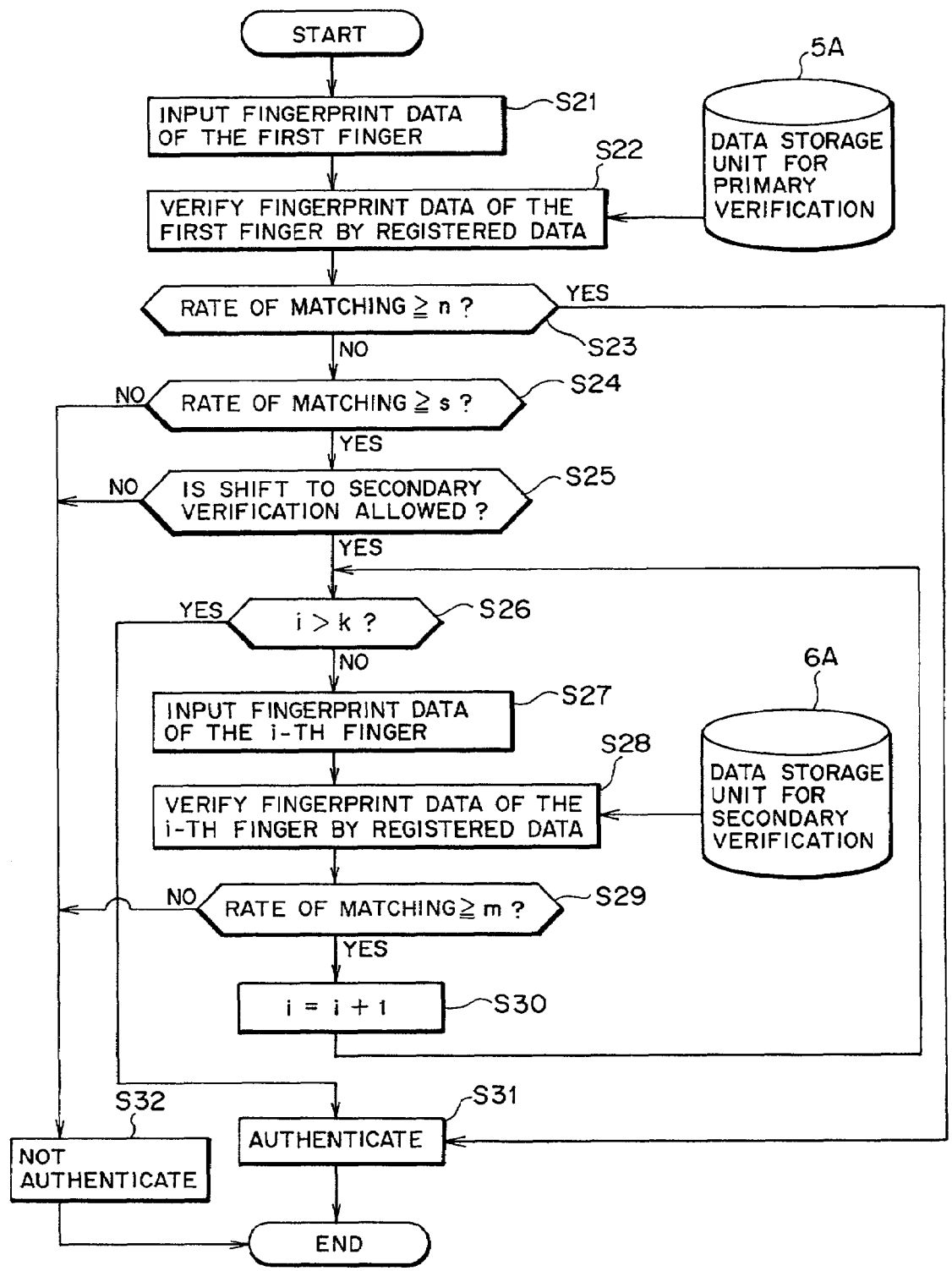
FIG. 7 is a flowchart for illustrating a procedure for authentication by the authenticating apparatus shown in FIG. 6.
Figure 8:
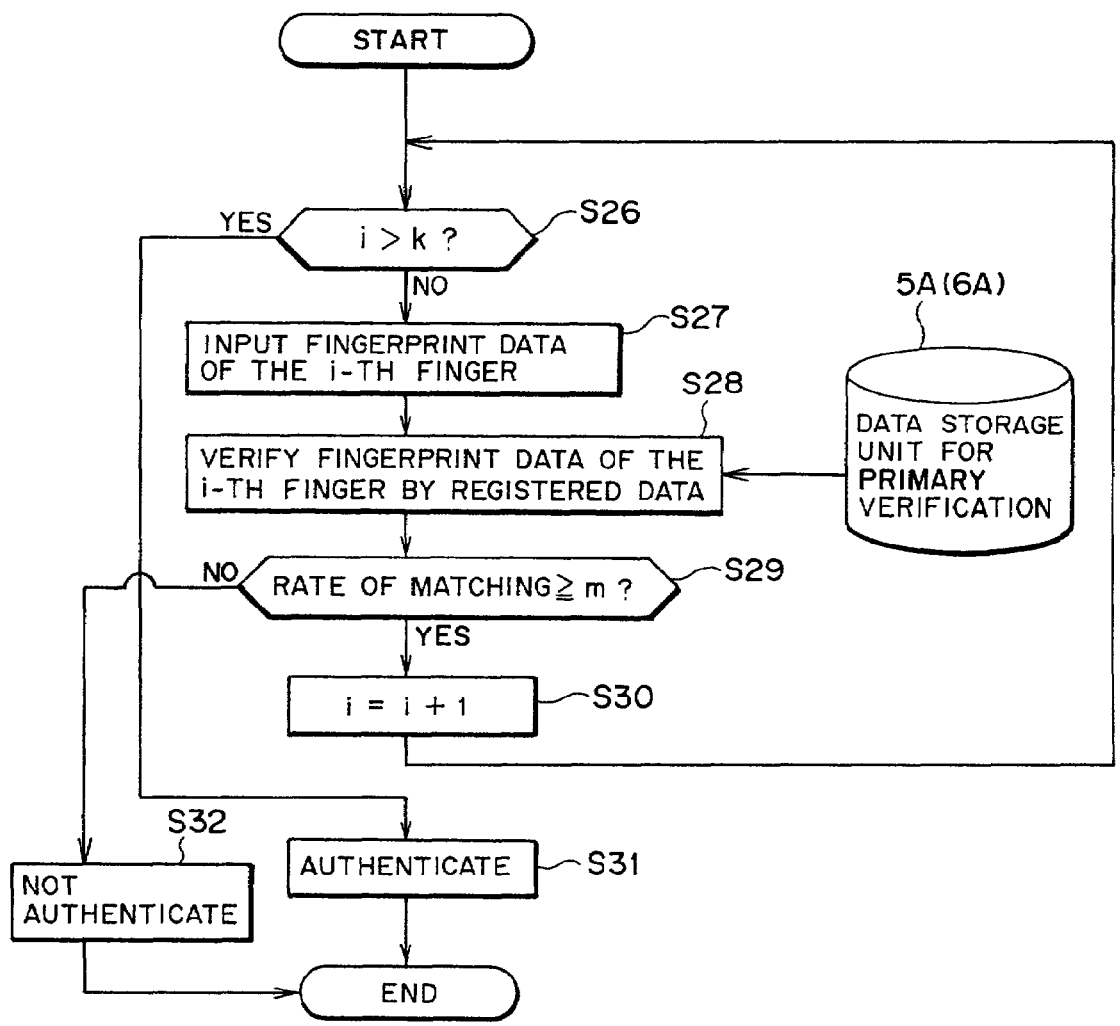
FIG. 8 is a flowchart for illustrating a modified example of the procedure for authentication by the authenticating apparatus shown in FIG. 6.

FIGS. 6 to 8 illustrate a first example of the concrete structure of the authenticating apparatus according to this embodiment. FIG. 6 is a block diagram showing a structure of the authenticating apparatus 3A. FIG. 7 is a flowchart for illustrating a procedure for authentication by the authenticating apparatus 3A. FIG. 8 is a flowchart for illustrating a modified example of the procedure for authentication by the authenticating apparatus 3A. In FIG. 6, the same reference characters as those described hereinbefore designate like or corresponding parts, detailed descriptions of which are thus omitted.

The authenticating apparatus 3A shown in FIG. 6 obtains fingerprint image data from one or more fingers other than a finger from which registry biometrics characteristics data for primary verification has been obtained, when personal authentication, using fingerprint, results in failure (when primary verification is failed) in the personal authentication system 1, performs secondary verification by using biometrics characteristic data (authenticating object data) extracted from the fingerprint image data, and authenticates the person when rates of verification of all the fingers are equal to or more than the secondary verification acceptable threshold value m even if the rate of matching decreases due to roughness or dryness of the fingertips in winter time, thereby accomplishing a measure for relief.

When the authenticating apparatus 3A is employed, in the registering apparatus 2 of the personal authentication system 1, the information inputting unit 10 obtains fingerprint image data of a person (user) to be registered, the biometrics characteristic data extracting unit for primary verification 11 extracts and generates biometrics characteristic data from the fingerprint image data, and the data storage unit for primary verification 5A stores the biometrics characteristic data as registry biometrics characteristic data for primary verification. The information inputting unit 10 also obtains fingerprint image data of one or more fingers (the number of fingers is described as k in this embodiment) other than the finger from which the registry biometrics characteristic data for primary verification has been obtained, the characteristic data extracting unit for secondary verification 14 extracts biometrics characteristic data from the fingerprint image data, and the data storage unit for secondary verification 6A registers the biometrics characteristic data as registry data for secondary verification. Incidentally, procedures for registering data in the data storage unit for primary verification 5A and the data storage unit for secondary verification 6A are as have been described above with reference to FIG. 3. In this case, the information inputting unit 10 is naturally configured with a fingerprint scanner (optical fingerprint unit, capacitance fingerprint unit).

At this time, the biometrics character data extracting unit for primary verification 11 and the characteristic data extracting unit for secondary verification 14 both extract biometrics characteristic data of the same type from fingerprint image data, which can be thus commonly used and integrated.

Biometrics characteristic data extracted by the biometrics characteristic data extracting unit for primary verification 11, the characteristic data extracting unit for secondary verification 14, or a biometrics characteristic data extracting unit 21A to be described later is, for example, coordinates of a bifurcation (minutia) of a fingerprint ridge, coordinates of an ending (minutia), coordinates of a crossing, coordinates of a core of a fingerprint, coordinates of a delta of a fingerprint, a direction of a ridge of a fingerprint, a distance between minutiae, the number of ridges between minutiae of a fingerprint, or the like.

The authenticating apparatus 3A comprises, as shown in FIG. 6, an information inputting unit 20A, a biometrics characteristic data extracting unit 21A, a biometrics characteristic data verifying unit 22A, a verification determining unit 23A, a secondary verification shift determining unit 24A, and a final personal determining unit 27A.

The information inputting unit (biometrics information inputting unit for authentication) 20A corresponds to the information inputting unit 20 shown in FIG. 4, which is configured with, for example, an optical fingerprint unit in order to obtain fingerprint image data as biometrics information of a person (user) to be authenticated.

The biometrics characteristic data extracting unit (third extracting unit, fourth extracting unit) 21A fulfils the similar function to the extracting units 21 and 25 shown in FIG. 4, which extracts, for example, minutia data as data to be authenticated from fingerprint image data of the person (user) to be authenticated. The fingerprint image data is obtained by the information inputting unit 20A in primary verification or secondary verification.

The biometrics characteristic data verifying unit (primary verifying unit, secondary verifying unit) 22A fulfils the similar function to the verifying units 22 and 26 shown in FIG. 4. In the primary verification, the biometrics characteristic data verifying unit 22A compares and matches the biometrics characteristic data (minutia data of fingerprint, here) extracted by-the extracting unit 21A with registry biometrics characteristics data for primary verification of the person to be authenticated. The registry biometrics characteristic data is registered beforehand in the data storage unit 5A. In secondary verification, the biometrics characteristic data verifying unit 22A compares and matches the data extracted by the extracting unit 21A with registry data for secondary verification of the person to be authenticated. The registry data is registered beforehand in the data storage unit 6A.

The verification determining unit (personal determining unit) 23A fulfils the similar function to the verification determining unit 23 shown in FIG. 4. When receiving a result of primary verification from the verifying unit 22A, the verification determining unit 23A determines whether a rate of matching obtained in the primary verification is equal to or more than the primary verification acceptable threshold value n or not. When receiving a result of secondary verification from the verifying unit 22A, the verification determining unit 23A determines whether a rate of matching obtained in the secondary verification is equal to or more than the secondary verification acceptable threshold value m or not.

The secondary verification shift determining unit 24A corresponds to the secondary verification shift determining unit 24 shown in FIG. 4. When the verification determining unit 23A determines that a rate of matching in the primary verification is less than the primary verification acceptable threshold value n, the secondary verification shift determining unit 24A determines whether the rate of matching in the primary verification is equal to or more than the secondary verification shift threshold value s (s<n) or not, refers to a state of setting by the secondary verification shift setting unit 28 and the personal information setting unit (state of defining of whether secondary verification is to be carried out or not), and determines whether secondary verification is necessary, that is, whether the procedure is to be proceeded to secondary verification or not, on the basis of the state of setting and a result of determination on the rate of matching.

The final personal determining unit (personal determining unit) 27A corresponds to the final personal determining unit 27 shown in FIG. 4. In cooperation with the verification determining unit 23A described above, the final personal determining unit 27A functions as a personal determining unit determining whether the person to be authenticated is the person himself/herself (registered person) or not, on the basis of a result of verification by the biometrics characteristic data verifying unit 22A, which fulfils the similar function (determining and authenticating a person) to the final personal determining unit 27 shown in FIG. 4, according to a result of determination by the verification determining unit 23A.

Here, biometrics characteristic data for primary verification and registry data for secondary verification are separately stored and managed in the data storage unit for primary verification 5A and the data storage unit for secondary verification 6A, respectively. When the authenticating apparatus 3A described above is employed, the biometrics characteristic data for primary verification and the registry data for secondary verification may be together stored in one biometrics characteristic data storage unit since the biometrics characteristic data for primary verification and the registry data for secondary verification are data of the same type extracted from the same type of biometrics information (fingerprint image data).

Next, a procedure for authentication by the authenticating apparatus 3A in the above structure will be described with reference to a flowchart (steps S21 to S32) shown in FIG. 7.

First, a person to be authenticated inputs fingerprint image data of the first finger from the information inputting unit 20A in the same manner as before. The biometrics characteristic data extracting unit 21A extracts biometrics characteristic data of the first finger from the fingerprint image data obtained by the information inputting unit 20A (step S21).

The biometrics characteristic data verifying unit 22A performs primary verification to compare and match the biometrics characteristic data extracted by the extracting unit 21A with registry biometrics characteristic data for primary verification of the person to be authenticated (step S22). The registry biometrics characteristic data is registered beforehand in the data storage unit 5A. The verification determining unit 23A determines whether a rate of matching obtained in the primary verification is equal to or more than the primary verification acceptable threshold value nor not (step S23), When the verification determining unit 23A determines that the rate of matching in the primary verification is equal to or more than the threshold value n (YES route at step S23), the final personal determining unit 27A determines and authenticates that the person to be authenticated is the person himself/herself (registered person), since a rate of matching sufficient to determine that the person to be authenticated is the person himself/herself (registered person) is obtained in the primary verification (step S31), and the process is terminated.

When the verification determining unit 23A determines that the rate of matching in the primary verification is less than the threshold value n (NO route at step S23), that is, when a rate of matching, sufficient to determine that the person to be authenticated is the person himself/herself, is not obtained in the primary verification, the secondary verification shift determining unit 24A determines whether the rate of matching in the primary verification is equal to or more than the secondary verification shift threshold value s (s<n) or not (step S24).

When the secondary verification shift determining unit 24A determines that the rate of matching in the primary verification is equal to or more than the secondary verification shift threshold value s (YES route at step S24), the secondary verification shift determining unit 24A uninterruptedly refers to a state of setting by the secondary verification shift setting unit 28 and the personal information setting unit 29, and determines on the basis of the state of setting of whether shift to the secondary verification is allowed or not (step S25).

When the secondary verification shift determining unit 24A recognizes that shift to secondary verification is set to be allowed (YES route at step S25), the instruction unit 20a operates to prompt the person to be authenticated to input data for secondary verification from the information inputting unit 20A.

Responding to this, the person to be authenticated successively inputs fingerprint image data of k fingers as information for secondary verification from the information inputting unit 20A. The authenticating apparatus 3A extracts biometrics characteristic data as data to be authenticated from the fingerprint image data of each of the fingers, and carries out secondary verification (relief verification) (steps S26 to S30).

Namely, the authenticating apparatus 3A first defines a variable i whose initial value is 1, and determines whether the variable i is greater than the number of times relief verification data is inputted k (step S26) When the variable i is not greater than k (NO route at step S26), fingerprint image data of the i-th finger is inputted. The biometrics characteristic data extracting unit 21A extracts biometrics characteristic data of the i-th finger from the fingerprint image data obtained by the information inputting unit 20A (step S27).

The biometrics characteristic data verifying unit 22A compares and matches the biometrics characteristic data extracted by the extracting unit 21A with registry data for secondary verification of the i-th finger of the person to be authenticated (step S28). The registry data is registered beforehand in the data storage unit 6A. The verification determining unit 23A determines whether a rate of matching obtained in the secondary verification is equal to or more than the secondary verification acceptable threshold value m or not (step S29).

When the verification determining unit 23A determines that the rate of matching in the secondary verification is equal to or more than the threshold value m (YES route at step S29), the variable i is incremented by one (step S30), and the procedure goes back to step S26. Until verification of the k-th finger is completed, the process from step S26 to step S30 is repetitively carried out.

Here, the secondary verification acceptable threshold value m is such set as to be less than the primary verification acceptable threshold value m. Conditions under which the rate of matching is accepted in the secondary verification is that rates of verification of characteristic data of all of k fingers are equal to or more than the threshold value m.

When rates of verification of characteristic data of all the k fingers are equal to or more than the threshold value m (YES route at step S26), the final personal determining unit 27A determines and authenticates that the person to be authenticated is the person himself/herself or registered person (step S31), and the process is terminated.

On the other hand, when the verification determining unit 23A determines that a rate of matching of a certain finger in the secondary verification is less than the threshold value m while the plural fingers are successively secondary matched (NO route at step S29), that is, when even one finger whose rate of matching in the secondary verification is less than the threshold value m exists, the final personal determining unit 27A determines at that moment not to authenticate (step S32), and the process is terminated.

When the secondary verification shift determining unit 24A determines that the rate of matching in the primary verification is less than the secondary verification shift threshold value s (NO route at step S24), or when shift to secondary verification is set to be unallowable (NO route at step S25), the final personal determining unit 27A determines not to authenticate (step S32), and the process is terminated.

The authenticating apparatus 3A compares and matches minutia data of the first finger with minutia data (registry biometrics characteristic data for primary verification) registered beforehand, as stated above. When a rate of the verification exceeds the primary verification acceptable threshold value n, the authenticating apparatus 3A authenticates that the person is the person himself/herself (the person is registered), and completes the process. If the rate of the verification does not exceed the primary verification acceptable threshold value n, the authenticating apparatus 3A proceeds to the relief authenticating process only when the rate of the verification exceeds the threshold value, according to which it is determined whether the relief authentication is carried out not. By setting the threshold value, according to which it is determined whether relief authentication is carried out, to zero, it is possible for the procedure to shift to the relief authenticating process (secondary process) even when the rate of matching is 0% due to injury or the like.

In the relief authentication (secondary verification), fingerprint biometrics information is inputted k times, which is a predefined number of times relief information is inputted and can be arbitrarily changed, and the fingerprint biometrics information is matched with minutia data registered beforehand. The secondary verification acceptable threshold value m is set to be less than the primary verification acceptable threshold value n. When fingerprints of all fingers fall within a range of the secondary verification acceptable threshold value m, a person to be authenticated object person is authenticated, and a series of the authenticating process is terminated.

In FIG. 7, verification is carried out each time fingerprint information for secondary verification is inputted, and "not authenticate" is determined when a finger that does not reach the rate of the secondary verification is found during the verification. However, it is alternatively possible that the final personal determining unit 27A collectively determines to authenticate the person when, for example, nine fingers out of ten fingers reach the secondary verification acceptable threshold value m.

In relation to the authenticating apparatus 3A, a relief authentication in view of secondary verification has been described. When verification data used in secondary verification is of the same type as biometrics characteristic data in primary verification as this example, it is alternatively possible to always match plural types of biometrics characteristic data irrespective of success/failure of the primary verification.

A procedure (flowchart) for authentication in such case is shown in FIG. 8. As clearly shown when comparing FIG. 7 with FIG. 8, the primary verification process (steps S21 to S23) and the process of determining shift to the secondary verification (steps S24 and S25), which are performed in the authenticating procedure shown in FIG. 7, are omitted in the authenticating procedure shown in FIG. 8.

In the authenticating apparatus 3A and the personal authentication system with the authenticating apparatus 3A, minutia data extracted from fingerprint image data of fingers other than a finger used in primary verification is used as registry data for secondary verification, whereby data of a user necessary in the primary verification and secondary verification can be inputted from one information inputting unit 10 or 20A.

Primary verification and secondary verification are carried out using biometrics characteristic data of the same type, so that it is unnecessary to prepare an extraction algorithm or a verification algorithm for each of the primary verification and the secondary verification.

Namely, the extracting unit 11 and the extracting unit 14 can be commonly used and integrated in the registering apparatus 2. In addition, the authenticating apparatus 2 does not need to have the biometrics characteristic data extracting unit (the third extracting unit and the fourth extracting unit), or the biometrics characteristic data verifying unit (the primary verifying unit and the secondary verifying unit) for each of primary verification and secondary verification. In consequence, it is possible to carry out both primary verification and secondary verification (relief verification) using existing hardware and software as they are.

Figure 9:
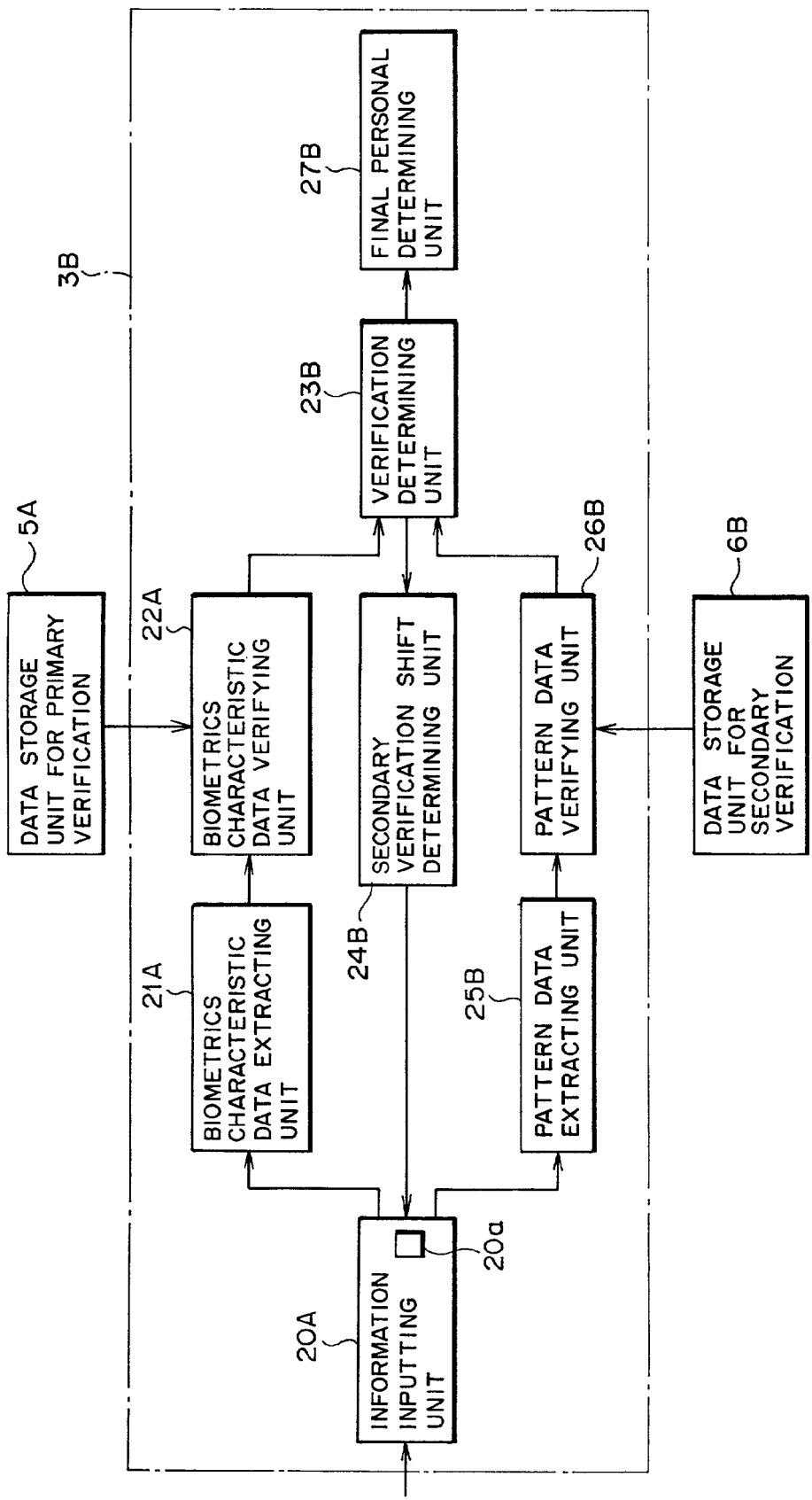
FIG. 9 is a block diagram showing a second example of the concrete structure of the authenticating apparatus according to the embodiment.
Figure 10:
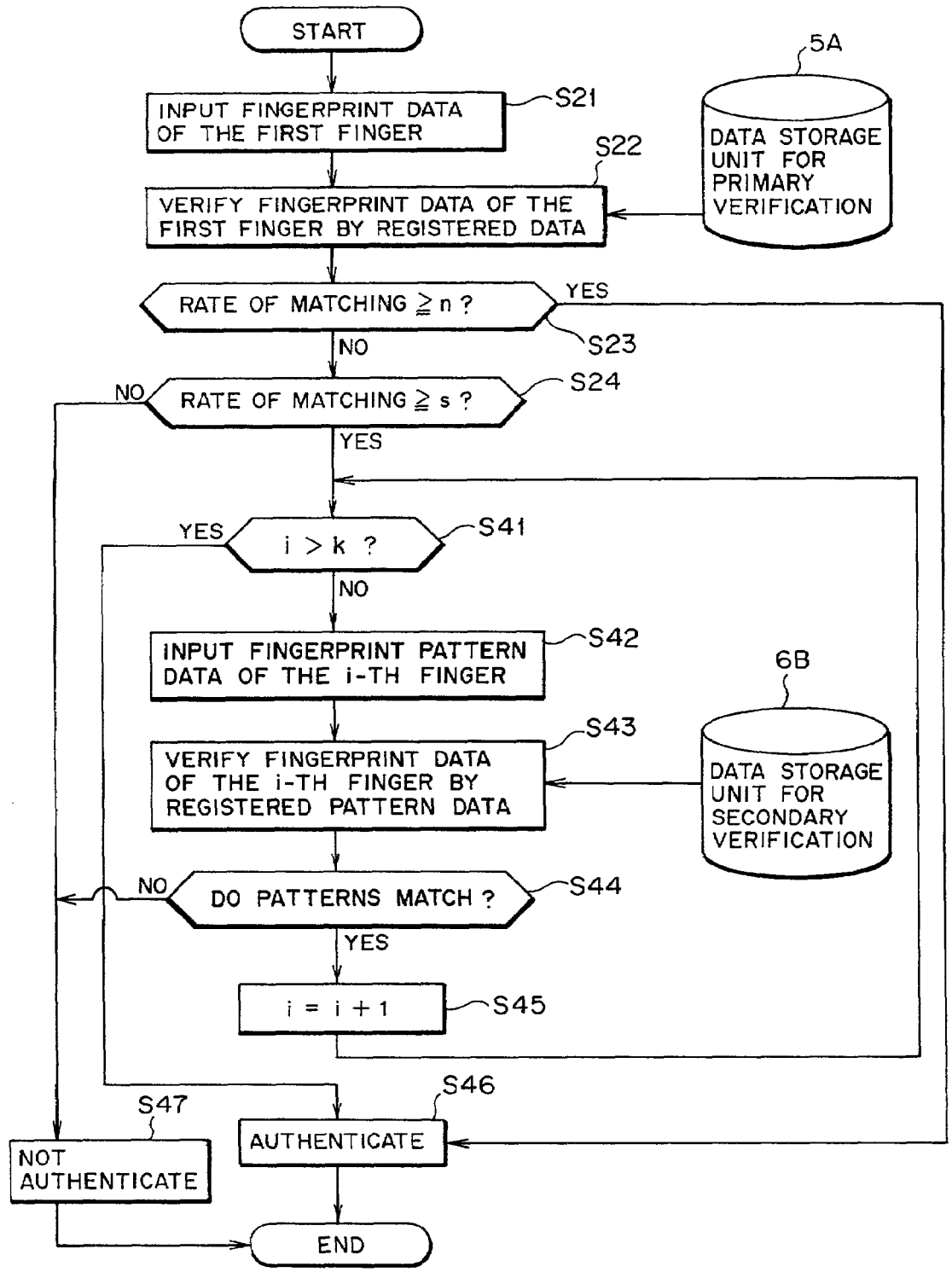
FIG. 10 is a flowchart for illustrating a procedure for authentication by the authenticating apparatus shown in FIG. 9.

FIGS. 9 through 11 depict a second example of the concrete structure of the authenticating apparatus according to this embodiment. FIG. 9 is a block diagram showing a structure of the authenticating apparatus 3B. FIG. 10 is a flowchart for illustrating a procedure for authentication by the authenticating apparatus 3B. FIGS. 11A through 11H are diagrams showing concrete examples of fingerprints in order to explain types of patterns of fingerprints. Incidentally, the same reference characters in FIG. 9 designate like or corresponding parts, detailed descriptions of which are thus omitted.

The authenticating apparatus 3B shown in FIG. 9 obtains fingerprint image data of equal to or more than one finger which is the same finger or a different finger from a finger from which registry biometrics characteristic data for primary verification has been extracted when personal authentication by a fingerprint results in failure in the personal authentication system 1 (when primary verification is failed), and carries out secondary verification using a fingerprint pattern (data to be authenticated extracted from the fingerprint image data. Whereby, the authenticating apparatus 3B accomplishes a measure for relief to authenticate a person even when a rate of matching decreases due to roughness or dryness of the finger tips in winter, etc., so long as patterns of fingerprints of all fingers match with registry data for secondary verification stored in the data storage unit for secondary verification 6B.

When the authenticating apparatus 3B is employed, the registering apparatus 2 of the personal authentication system 1 extracts biometrics characteristic data from fingerprint image data of a person (user)to be registered in the similar manner to the above-described, and registers it as registry biometrics characteristic data for primary verification in the data storage unit for primary verification 5A. The registering apparatus 2 also obtains by the information inputting unit 10 fingerprint image data of equal to or more than one finger (the number of fingers is described as k in this embodiment) which is the same finger or a different finger from the finger from which the registry biometrics characteristic data for primary verification has been obtained, extracts pattern data of the fingerprint from the fingerprint image data by the characteristic data extracting unit for secondary verification 14, and registers the pattern data as registry data for secondary verification in the data storage unit for secondary verification 6B. Procedures for data registration in the data storage unit for primary verification 5A and the data storage unit for secondary verification 6B by the registering apparatus 2 are as have been described above with reference to FIG. 3.

Patterns of fingerprints are shown in FIGS. 11A through 11H, for example. A pattern shown in FIG. 11A is a right central pocket loop type. A pattern shown in FIG. 11B is a left central pocket loop type. A pattern shown in FIG. 11C is a double loop type. A pattern shown in FIG. 11D is a plain arch type. A pattern shown in FIG. 11E is a plain whorl type. A pattern shown in FIG. 11F is a left loop type. A pattern shown in FIG. 11G is a right loop type. A pattern shown in FIG. 11H is a tented arch type. A type of such pattern is extracted from each finger as pattern data, and used as registry data for secondary verification. Note that FIGS. 11A through 11H shows merely one example of classification of patterns; a method for classifying patterns of fingerprints is not particularly defined in this embodiment.

The authenticating apparatus 3B comprises a verification determining unit 23B, a secondary verification shift determining unit 24B, a pattern data extracting unit 25B, a pattern data verifying unit 26B, and a final personal determining unit 27B along with the information inputting unit 20A, the biometrics characteristic data extracting unit 21A, and the biometrics characteristic data verifying unit 22A.

The verification determining unit (personal determining unit) 23B fulfils the similar function to the verification determining unit 23 shown in FIG. 4. When receiving a result of primary verification from the verifying unit 22A, the verification determining unit 23B determines whether a rate of matching in the primary verification is equal to or more than the primary verification acceptable threshold value n or not, and also determines coincidence of two sorts of pattern data on the basis of a result of secondary verification from the pattern data verifying unit 26B to be described later.

The secondary verification shift determining unit 24B corresponds to the secondary verification shift determining unit 24 shown in FIG. 4. When the verification determining unit 23B determines that the rate of primary verification is less than the primary verification acceptable threshold value n, the secondary verification shift determining unit 24B determines whether the rate of the primary verification is equal to or more than the secondary verification shift threshold value s (s<n) or not, and further determines on the basis of a result of the determination necessity for shift to secondary verification, that is, determines whether the procedure proceeds to secondary verification or not.

The pattern data extracting unit (fourth extracting unit) 25B corresponds to the characteristic data extracting unit for secondary verification 25 shown in FIG. 4. The pattern data extracting unit 25B recognizes pattern data of a fingerprint as data to be authenticated from fingerprint image data of a person (user) to be authenticated and extracts the same. The fingerprint image data is obtained by the information inputting unit 20A.

The pattern data verifying unit (secondary verifying unit) 26B corresponds to the secondary verifying unit 26 shown in FIG. 4. The pattern data verifying unit 26B compares and matches pattern data extracted by the pattern data extracting unit 25B with pattern data (registry data for secondary verification) of the person to be authenticated. The pattern data of the person is registered beforehand in the data storage unit 6B.

The final personal determining unit (personal determining unit) 27B corresponds to the final personal determining unit 27 shown in FIG. 4. In cooperation with the verification determining unit 23B described above, the final personal determining unit 27B functions as a personal determining unit which determines on the basis of results of verification by the biometrics characteristic data verifying unit 22A and the pattern data verifying unit 26B whether a person to be authenticated is the person himself/herself (registered person) or not. The final personal determining unit 27B determines and authenticates that the person to be authenticated is the person himself/herself when the verification determining unit 23B determines that a rate of matching in primary verification is equal to or more than the threshold value n, or that pattern data of all fingers coincide with registry data for secondary verification.

Next, a procedure for authentication by the authenticating apparatus 3B in the above structure will be described with reference to a flowchart (steps S21 to S24, and S41 to S47) shown in FIG. 10.

Steps S21 to S24 are similar to the primary verification process (steps S21 to S23) and the secondary verification shift determining process (step S24) performed in the authenticating process shown in FIG. 7, detailed descriptions of which are thus omitted. In the authenticating apparatus 3B, the secondary verification shift setting unit 28 and the personal information setting unit 29 are omitted, thus the process of determining secondary verification shift corresponding to step S25 in FIG. 7 is omitted.

When the verification determining unit 23B determines that a rate of matching in primary verification is equal to or more than the threshold value n (YES route at step S23), the final personal determining unit 27B determines and authenticates that a person to be authenticated is the person himself/herself (registered person) since a rate of matching sufficient to determine that the person to be authenticated is the person himself/herself (registered person) in the primary verification is obtained in the primary verification (step S46), and the process is terminated.

When the secondary verification shift determining unit 24B determines that the rate of matching in primary verification is equal to or more than the secondary verification shift threshold value s (YES route at step S24), the instruction unit 20a operates to prompt the person to be authenticated to input data for secondary verification through the information inputting unit 20A.

Responding to this, the person to be authenticated successively inputs fingerprint image data of k fingers as information for secondary verification from the information inputting unit 20A. The authenticating apparatus 3B extracts pattern data of the fingerprint from the image data of each of the fingerprints as data for secondary verification, and carries out secondary verification (relief verification) (steps S41 to S45).

Namely, a variable i whose initial value is 1 is beforehand defined in the authenticating apparatus 3B. First, it is determined whether the variable i is larger than the number of times relief verification data k is inputted (step S41). When the variable i is equal to or less than k (NO route at step S41), fingerprint image data of the i-th finger is inputted. The pattern data extracting unit 25B recognizes pattern data of the i-th finger from the fingerprint image data obtained by the information inputting unit 20A, and extracts the same (step S42).

The pattern data verifying unit 26B compares and matches the pattern data extracted by the pattern data extracting unit 25B with pattern data of the i-th finger of the person to be authenticated (step S43). The pattern data of the person registered beforehand in the data storage unit 6B. The verification determining unit 23B then determines whether the two sorts of pattern data coincide with each other or not (step S44).

When the verification determining unit 23B determines that a rate of matching in the secondary verification is equal to or more than the threshold value m (YES route at step S44), the variable i is incremented by only one (step S45), and the procedure goes back to step S41. Until the pattern data verification of the k-th finger is completed, the process at steps S41 to S45 is repetitively carried out.

When two sorts of pattern data of each of all k fingers coincide with each other (YES route at step S41), the final personal determining unit 27B determines and authenticates that the person to be authenticated is the person himself/herself or registered person (step S47), and the process is terminated.

On the other hand, when the verification determining unit 23B determines that the two sorts of pattern data of a certain finger do not coincide while verification of the two sorts of pattern data of the respective plural fingers is successively carried out (NO route at step S44), that is, when any one finger whose two sorts of pattern data do not coincide appears, the final personal determining unit 27B determines not to authenticate at that time (step S47), and the process is terminated.

When the secondary verification shift determining unit 24B determines that the rate of matching in the primary verification is less than the secondary verification shift threshold value s (NO route at step S24), the final personal determining unit 27B determines not to authenticate, as well (step S47), and the process is terminated.

When the authenticating apparatus 3B shifts to the relief authenticating process, the person to be authenticated inputs fingerprint biometrics information (pattern data of fingerprints, here) the number of times relief information is inputted k defined beforehand, which can be arbitrarily changed, and the authenticating apparatus 3 matches the information with pattern data of each finger set in advance. When all the patterns coincide, the authenticating apparatus 3B authenticates the person, and terminates a series of the authenticating process.

In FIG. 10, pattern data is matched each time fingerprint information for secondary verification is inputted, and determination of "not authenticate" is made when a finger whose patterns do not coincide appears during the verification. However, it is alternatively possible, on the assumption that a pattern cannot be recognized due to injury or the like, that the final personal determining unit 27B collectively determines, and authenticates the person when two sorts of pattern data of, for example, each of nine fingers out of ten fingers coincide.

According to the authenticating apparatus 3B, and the personal authentication system 1 with the authenticating apparatus 3B, it is possible to input data of a user necessary in primary verification and secondary verification from one information inputting unit 10 or 20A by using pattern data extracted from fingerprint image data of the same finger as or a different finger from a finger used in the primary verification as registry data for secondary verification. It is therefore possible to carry out both primary verification and secondary verification (relief verification) without adding any new apparatus.

Figure 13:
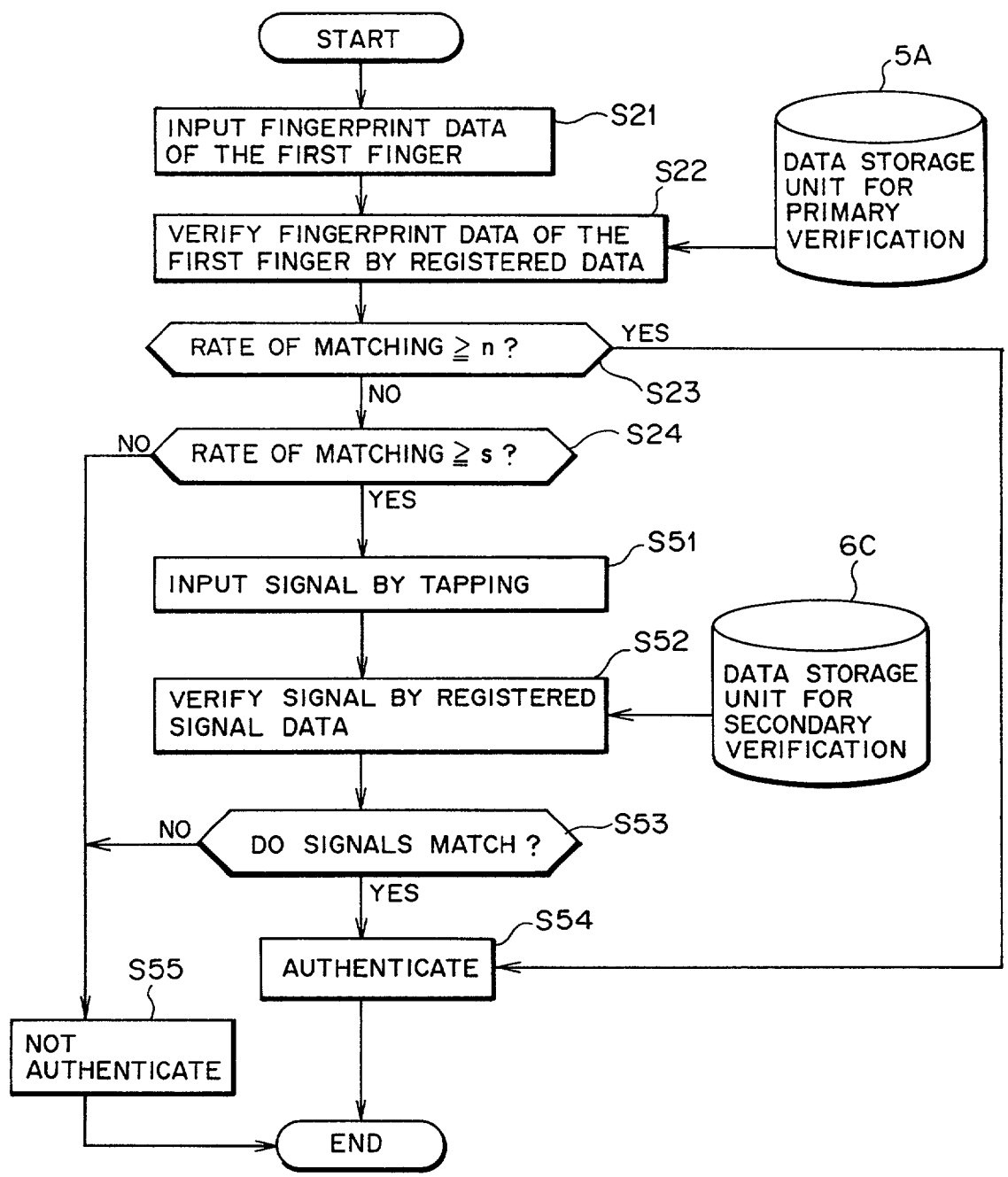
FIG. 13 is a flowchart for illustrating a procedure for authentication by the authenticating apparatus shown in FIG. 12.

FIGS. 12 and 13 depict a third example of the concrete structure of the authenticating apparatus according to this embodiment. FIG. 12 is a block diagram showing a structure of an authenticating apparatus 3C. FIG. 13 is a flowchart for illustrating a procedure for authentication by the authenticating apparatus 3C. Incidentally, the same reference characters in FIG. 12 designate like or corresponding parts, detailed descriptions of which are thus omitted.

The authenticating apparatus 3C shown in FIG. 12 accomplishes such a measure for relief that, when personal authentication using a fingerprint results in failure (when primary verification is failed) in the personal authentication system 1, the person to be authenticated taps a sensor (fingerprint input screen/image input screen of the information inputting unit 20A) to input time series data as non-biometrics characteristic data, and the person is authenticated when the time series data coincides with registry data for secondary verification registered beforehand.

When the authenticating apparatus 3C is employed, a person to be registered taps with his/her finger an image input screen of the information inputting unit 10 according to a unique pattern determined beforehand to input time series information (Morse code or the like) in the registering apparatus 2 of the personal authentication system 1, as described before. The extracting unit 14 extracts the time series data in a predetermined pattern as non-biometrics characteristic data from image data obtained in time series at that time, and stores the time series data as registry data for secondary verification in the data storage unit for secondary verification 6C. Incidentally, procedures for registering data in the data storage unit for primary verification 5A and the data storage unit for secondary verification 6C by the registering apparatus 2 are as have been described above with reference to FIG. 3.

The authenticating apparatus 3C comprises, as shown in FIG. 6, a verification determining unit 23C, a secondary verification shift determining unit 24C, a signal data extracting unit 25C, a signal data verifying unit 26C, and a final personal determining unit 26C along with the information inputting unit 20A, the biometrics characteristic data extracting unit 21A, and the biometrics characteristic data verifying unit 22A described above.

The verification determining unit (personal determining unit) 23C fulfils the similar function to the verification determining unit 23 shown in FIG. 4. When receiving a result of primary verification from the verifying unit 22A, the verification determining unit 23C determines whether a rate of matching is equal to or more than the primary verification acceptable threshold value n or not. The verification determining unit 23C also determines coincidence of two sorts of time series data (signal data) on the basis of a result of secondary verification from the signal data verifying unit 26C to be described later.

The secondary verification shift determining unit 24C corresponds to the secondary verification shift determining unit 24 shown in FIG. 4. When the verification determining unit 23C determines that the rate of matching in the primary verification is less than the primary verification acceptable threshold value n, the secondary verification shift determining unit 24C determines whether the rate of matching in the primary verification is equal to or more than the secondary verification shift threshold value s (s<n) or not, and further determines necessity for secondary verification, that is, whether the procedure proceeds to the secondary verification or not, on the basis of a result of the determination.

The signal data extracting unit (fourth extracting unit) 25C corresponds to the characteristic data extracting unit for secondary verification 25 shown in FIG. 4. The signal data extracting unit 25C recognizes time series data (signal data such as Morse code or the like) as authenticating object data from the time series information (image data obtained in time series) that is inputted by a person (user) to be authenticated by tapping with his/her finger an image input screen of the information inputting unit 20A according to a unique pattern determined beforehand, and extracts the same.

The signal data verifying unit (secondary verifying unit) 26C corresponds to the secondary verifying unit 26 shown in FIG. 4. The signal data verifying unit 26C compares and matches signal data extracted by the signal data extracting unit 25C with signal data (registry data for secondary verification) of the person to be authenticated. The signal data of the person is registered beforehand in the data storage unit 6C.

The final personal determining unit (personal determining unit) 27C corresponds to the final personal determining unit 27 shown in FIG. 4. In cooperation with the verification determining unit 23C shown in FIG. 4, the final personal determining unit 27C functions as a personal determining unit which determines whether the person to be authenticated is the person himself/herself (registered person) or not on the basis of results of verification by the biometrics characteristic data verifying unit 22A and the signal data verifying unit 26C. When the verification determining unit 23C determines that a rate of matching in primary verification is equal to or more than the threshold value n, or determines that signal data obtained from the person to be authenticated coincides with registry data for secondary verification, the final personal determining unit 27C determines and authenticates that the person to be authenticated is the person himself/herself (registered person).

A procedure for authentication by the authenticating apparatus 3C in the above structure will be next described with reference to a flowchart (steps S21 to S24, and S51 to S55) shown in FIG. 13.

Steps S21 to S24 are similar to the primary verification process (steps S21 to S23) and the process of determining to shift to secondary verification (step S24) performed in the authenticating procedure shown in FIG. 7, detailed descriptions of which are thus omitted. In the authenticating apparatus 3C, the secondary verification shift setting unit 28 and the personal information setting unit 29 are omitted. Therefore, a process of determining to shift to secondary verification corresponding to step S25 in FIG. 7 is omitted.

When the verification determining unit 23C determines that a rate of matching in primary verification is equal to or more than the threshold value n (YES route at step S23), the final personal determining unit 27C determines and authenticates that a person to be authenticated is the person himself/herself (registered person) since a rate of matching sufficient to determine that the person to be authenticated is the person himself/herself is obtained in primary verification (step S54), and the process is terminated.

When the secondary verification shift determining unit 24C determines that the rate of matching in the primary verification is equal to or more than the secondary verification shift threshold value s (YES route at step S24), the instruction unit 20a operates to prompt the person to be authenticated to input data for secondary verification from the information inputting unit 20A.

Responding to this, the person to be authenticated taps with his/her finger an image input screen of the information inputting unit 20A according to a unique pattern determined beforehand to input time series information. In the authenticating apparatus 3C, the signal data extracting unit 25C extracts time series data (signal data such as Morse code or the like) as data for secondary verification (non-biometrics characteristic data) from image data obtained in time series in the inputting operation by the person to be authenticated (step S51).

The signal data verifying unit 26C compares and matches signal data extracted by the signal data extracting unit 25C with signal data of the person to be authenticated (step S52). The signal data of the person is registered beforehand in the data storage unit 6C. The verification determining unit 23C determines whether the two sorts of signal data coincide with each other or not (step S53).

When the verification determining unit 23C determines that the two sorts of signal data coincide with each other (YES route at step S53), the final personal determining unit 27C determines and authenticates that the person to be authenticated is the person himself/herself or registered person (step S54), and the process is terminated.

When the verification determining unit 23C determines that the two sorts of signal data do not coincide with each other (NO route at step S54), the final personal determining unit 27C determines not to authenticate (step S55) and the process is terminated. When the secondary verification shift determining unit 24c determines that the rate of matching in the primary verification is less than the secondary verification shift threshold value s (NO route at step S24), the final personal determining unit 27C determines not to authenticate as well (step S55), and the process is terminated.

When the authenticating apparatus 3C shifts to the relief authenticating process, the person to be authenticated inputs time series information as signals by tapping via the same information inputting unit 20A as that used when biometrics information for primary verification has been inputted. As the signals, signal information that the system can originally analyze may be used. Alternatively, an existing signal analysis routine by Morse signals or the like may be employed. The inputted signals are compared and matched with signal information registered beforehand, the person is authenticated when the two sorts of data coincide, and the process is terminated.

According to the authenticating apparatus 3C and the personal authentication system 1 with the authenticating apparatus 3C, the user intentionally inputs time series information of an image using the information inputting unit 10 or 20a in secondary verification, and time series data extracted from the time series information is used as registry data for secondary verification. Accordingly, it is possible to input data of a user necessary in primary verification and secondary verification from one information inputting unit 10 or 20A.

Namely, the information inputting unit 10 or 20A may be used as a device for inputting biometrics characteristic data for primary verification and a device for input non-biometrics characteristic data (data having an intentional time series pattern).

Therefore, it is possible to input data of a user necessary in primary verification and secondary verification from one information inputting unit 10 or 20A, thus to carry out both primary verification and secondary verification (relief verification) without newly adding any apparatus.

Figure 14:
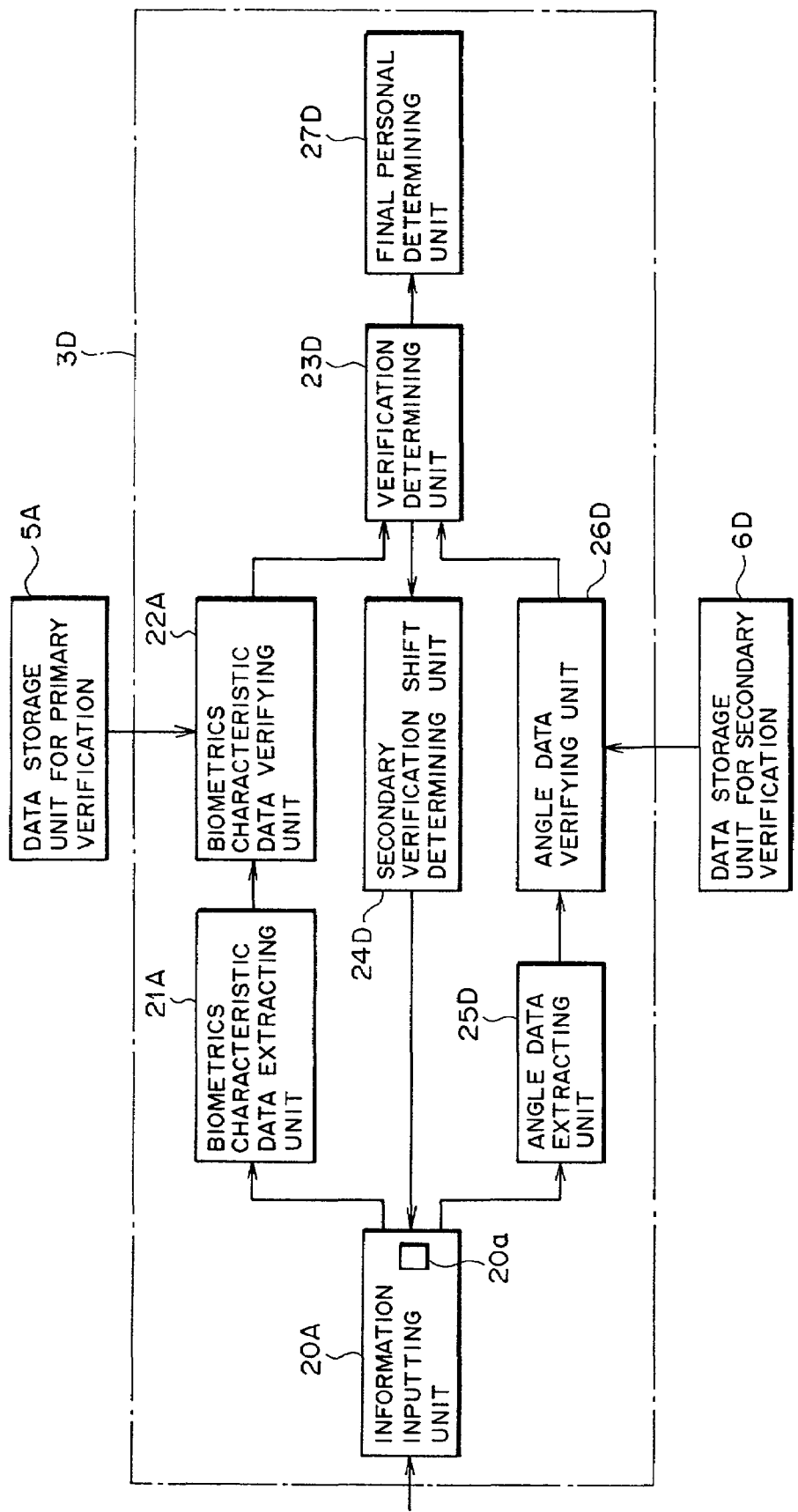
FIG. 14 is a block diagram showing a fourth example of the concrete structure of the authenticating apparatus according to the embodiment.
Figure 15:
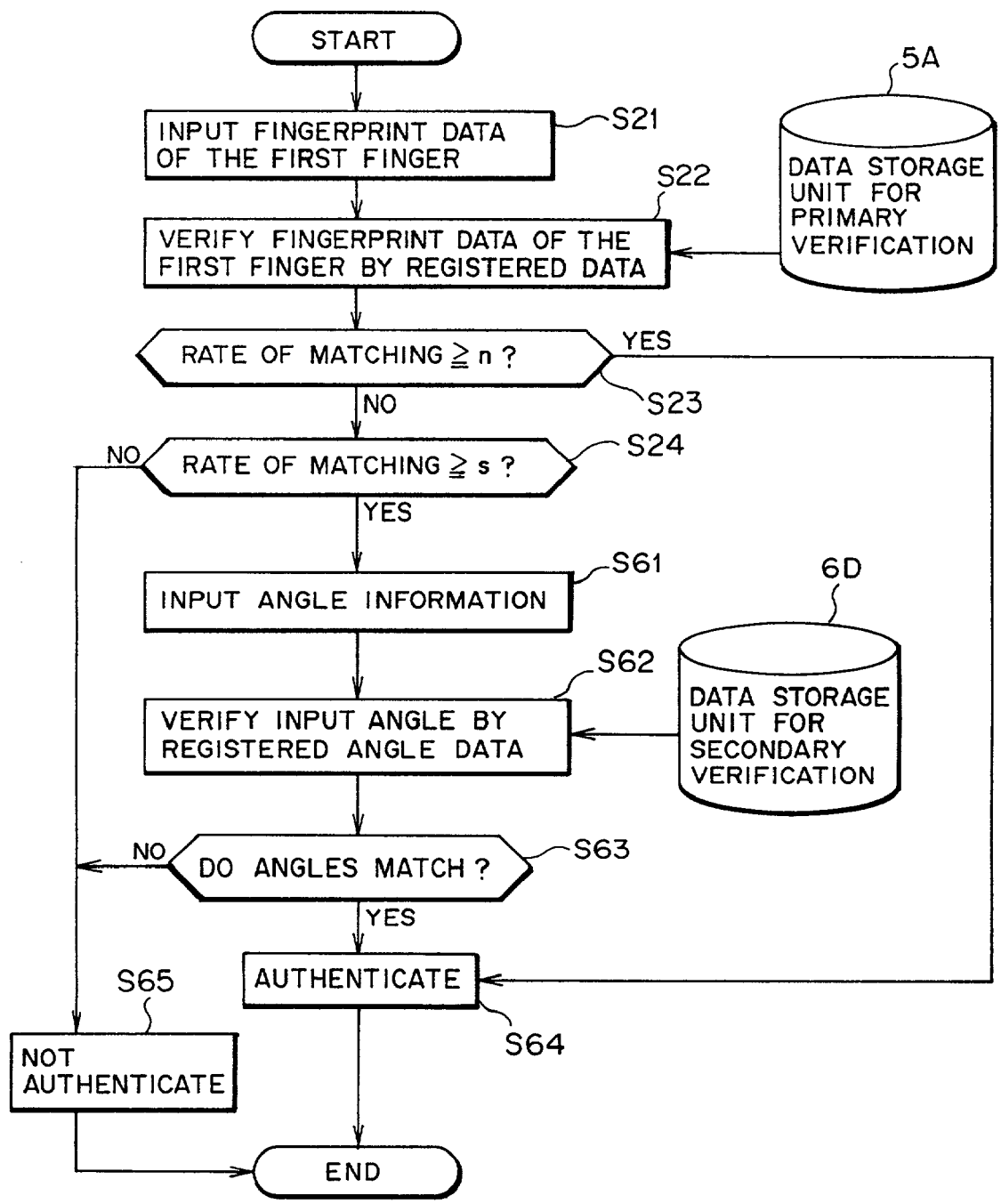
FIG. 15 is a flowchart for illustrating a procedure for authentication by the authenticating apparatus shown in FIG. 14.

FIGS. 14 and 15 depict a fourth example of the concrete structure of the authenticating apparatus according to this embodiment. FIG. 14 is a block diagram showing a structure of the authenticating apparatus 3D. FIG. 15 is a flowchart for illustrating a procedure for authentication by the authenticating apparatus 3D. Incidentally, the same reference characters as those having described above designate like or corresponding parts, detailed descriptions of which are thus omitted.

The authenticating apparatus 3D shown in FIG. 14 accomplishes a relief authentication using information intentionally inputted by a person to be authenticated with his/her body (here, a finger) from a fingerprint input screen/image input screen of the information inputting unit 20A when personal authentication with a fingerprint results in failure (when primary verification is failed) in the personal authentication system 1.

At this time, the information inputted from the information inputting unit 20A is not used for carrying out biometrics verification, but is non-biometrics information inputted to determine a personal identification according to a state of inputting. A type of the information is not limited so long as it is information whose input state can be extracted and discriminated. Here, the information is an input angle of a finger to a reference direction of a finger on the image input screen of the information inputting unit 20, for example.

When the authenticating apparatus 3D is employed, the person to be registered touches with his/her finger the image input screen and arranges the finger at a predetermined unique input angle on the image input screen of the information inputting unit 10 in the registering apparatus 2 of the personal authentication system 1, as stated above. The extracting unit 14 extracts the input angle to the reference direction as non-biometrics characteristic data from image data obtained in such state, and stores the input angle as registry data for secondary verification in the data storage unit for secondary verification 6D. Incidentally, the procedure for registering data in the data storage unit for primary verification 5A and the data storage unit for secondary unit by the registering apparatus 2 are as have been described above with reference to FIG. 3.

The authenticating apparatus 3D comprises, as shown in FIG. 14, a verification determining unit 23D, a secondary verification shift determining unit 24D, an angle data extracting unit 25D, an angle data verifying unit 26D, and a final personal determining unit 27D along with the information inputting unit 20A, the biometrics characteristic data extracting unit 21A, and the biometrics characteristic data verifying unit 22A.

The verification determining unit (personal determining unit) 23D fulfils the similar function to the verification determining unit 23 shown in FIG. 4. When receiving a result of primary verification from the verifying unit 22A, the verification determining unit 23D determines whether a rate of matching in the primary verification is equal to or more than the primary verification acceptable threshold value n or not. The verification determining unit 23D also determines coincidence of input angles (angle data) on the basis of a result of secondary verification from the angle data verifying unit 26D to be described later.

The secondary verification shift determining unit 24D corresponds to the secondary verification shift determining unit 24 shown in FIG. 4. When the verification determining unit 23D determines that the rate of matching in the primary verification is less than the primary verification acceptable threshold value n, the secondary verification shift determining unit 24D determines whether the rate of matching in the primary verification is equal to or more than the secondary verification shift threshold value s (s<n) or not, and further determines necessity for secondary verification, that is, whether the procedure proceeds to secondary verification or not, on the basis of a result of the determination.

The angle data extracting unit (fourth extracting unit) 25D corresponds to the characteristic data extracting unit for secondary verification 25 shown in FIG. 4. The angle data extracting unit 25D recognizes an input angle to the reference direction as data for secondary verification from image data of a finger of a person to be authenticated, the image data being obtained by touching with his/her finger the image input screen and arranging the finger at a predetermined unique input angle on the image input screen of the information inputting unit 20A, and extracts the same.

The angle data verifying unit (secondary verifying unit) 26D corresponds to the secondary verifying unit 26 shown in FIG. 4. The angle data verifying unit 26D compares and matches angle data extracted by the angle data extracting unit 25D with angle data (registry data for secondary verification) of the person to be authenticated. The angle data of the person is registered beforehand in the data storage unit 6D.

The final personal determining unit (personal determining unit) 27D corresponds to the final personal determining unit 27 shown in FIG. 4. In cooperation with the verification determining unit 23D described above, the final personal determining unit 27D functions as a personal determining unit which determines on the basis of results of determination by the biometrics characteristic data verifying unit 22A and the angle data verifying unit 26D whether the person to be authenticated is the person himself/herself or not. When the verification determining unit 23D determines that the rate of matching in the primary verification is equal to or more than the threshold value n, or that angle data obtained from the person to be authenticated coincides with registry data for secondary verification, the final personal determining unit 27D determines and authenticates that the person to be authenticated is the person himself/herself.

Next, a procedure for authentication by the authenticating apparatus 3D in the above structure will be described with reference to a flowchart (steps S21 to S24, and S61 to S65) shown in FIG. 15.

Steps S21 to S24 are similar to the primary verification process (steps S21 to S23) and the process of determining to shift to secondary verification performed in the authenticating procedure in FIG. 7, detailed descriptions of which are thus omitted. In the authenticating apparatus 3D, the secondary verification shift setting unit 28 and the personal information setting unit 29 are omitted, the process of determining to shift to secondary verification corresponding to step S25 in FIG. 7 is thus omitted.

When the verification determining unit 23D determines that a rate of matching in primary verification is equal to or more than the threshold value n (YES route at step S23), the final personal determining unit 27D determines and authenticates that a person to be authenticated is the person himself/herself (registered person) since a rate of matching sufficient to determine that the person to be authenticated is the person himself/herself is obtained in primary verification (step S64), and the process is terminated.

When the secondary verification shift determining unit 24D determines that the rate of matching in the primary verification is equal to or more than the secondary verification shift threshold value s (YES route at step S24), the instruction unit 20a operates to prompt the person to be authenticated to input data for secondary verification through the information inputting unit 20A.

Responding to this, the person to be authenticated touches with his/her finger the image input screen and arranges the finger at a predetermined unique input angle on the image input screen of the information inputting unit 20A. In the authenticating apparatus 3A, the angle data extracting unit 25D extracts the input angle to the reference direction as data for secondary verification (non-biometrics characteristic data) from image data obtained in a state where the person to be authenticated touches with his/her finger and arranges the finger as above (step S61).

The angle data verifying unit 26D compares and matches angle data extracted by the angle data extracting unit 25D with angle data of the person to be authenticated (step S62). The angle data of the person is registered beforehand in the data storage unit 6D. The verification determining unit 23D determines whether the two sorts of angle data coincide with each other or not (step S63).

When the verification determining unit 23D determines that the two sorts of angle data coincide with each other (YES route at step S63), the final personal determining unit 27D determines and authenticates that the person to be authenticated is the person himself/herself or registered person (step S64), and the process is terminated.

On the other hand, when the verification determining unit 23D determines that the two sorts of angle data do not coincide with each other (NO route at step S63), the final personal determining unit 27D determines not to authenticate (step S65), and the process is terminated. When the secondary verification shift determining unit 24D determines that the rate of matching in the primary verification is less than the secondary verification shift threshold value s (NO route at step S24), the final personal determining unit 27D determines not to authenticate as well (step S65), and the process is terminated.

When the authenticating apparatus 3D shifts to the relief authenticating process, the person to be authenticated inputs fingerprint information at an angle of impress (input angle) intentionally changed one or plural times from the same information inputting unit 20A as that has been used to input biometrics information for primary verification, as stated above. Angle data is then extracted from the inputted information (image data of the fingerprint), and compared and matched with angle data registered beforehand. When the two sorts of data coincide with each other, the person is authenticated, and a series of the authenticating process is terminated.

According to the authenticating apparatus 3D and the personal authentication system 1 with the authenticating apparatus 3D, the user intentionally changes an angle of impress (input angle) and inputs fingerprint to the information inputting unit 10 or 20A in secondary verification, angle data extracted from image data of the fingerprint is used as registry data for secondary verification. It is therefore possible to input data of the user necessary in primary verification and secondary verification from one information inputting unit 10 or 20A.

The information unit 10 or 20A can be used as a device for inputting biometrics characteristic data for primary verification and a device for inputting non-biometrics characteristic data (angle data intentionally changed).

Accordingly, it is possible to input data of a user necessary in primary verification and secondary verification from one information inputting unit 10 or 20A, and thus to carry out both primary verification and secondary verification (relief verification) without newly adding any apparatus.

In the above example, secondary verification is performed using an input angle of a finger as has been described. Namely, the relief verification is performed using a finger angle on the image input screen of the information inputting unit 20A intentionally inputted by a person to be authenticated when personal authentication using a fingerprint is failed (in primary verification) in the personal authentication system 1. Instead of a finger angle, it is possible to use a position at which the finger contacts with the image input screen of the information inputting unit 20A to perform the relief verification (secondary verification).

In which case, the registrant beforehand determines a unique position at which the finger contacts with the image input screen, similarly to the case of input angle. In registering, the registrant touches with his/her finger at a unique position the image input screen of the information inputting unit 10 in the registering apparatus 2. The information inputting unit 10 obtains image data of the finger in such state, and the extracting unit 14 extracts a contact position from the image data and stores the image data as registry data for secondary verification in the data storage unit 6A.

In the secondary verification in the authenticating apparatus 3D, the person to be authenticated touches with his/her finger at a unique position the image input screen of the information inputting unit 20D. The information inputting unit 20A obtains image data of the finger in such state, and the fourth extracting unit (data extracting unit 25D) extracts a contact position of the finger as authenticating object data from the image data.

As this, when a contact position of a finger is used as data for secondary verification, it is possible to achieve the same functions and effects as in the case where an input angle of a finger is used as data for secondary verification.

Figure 16:
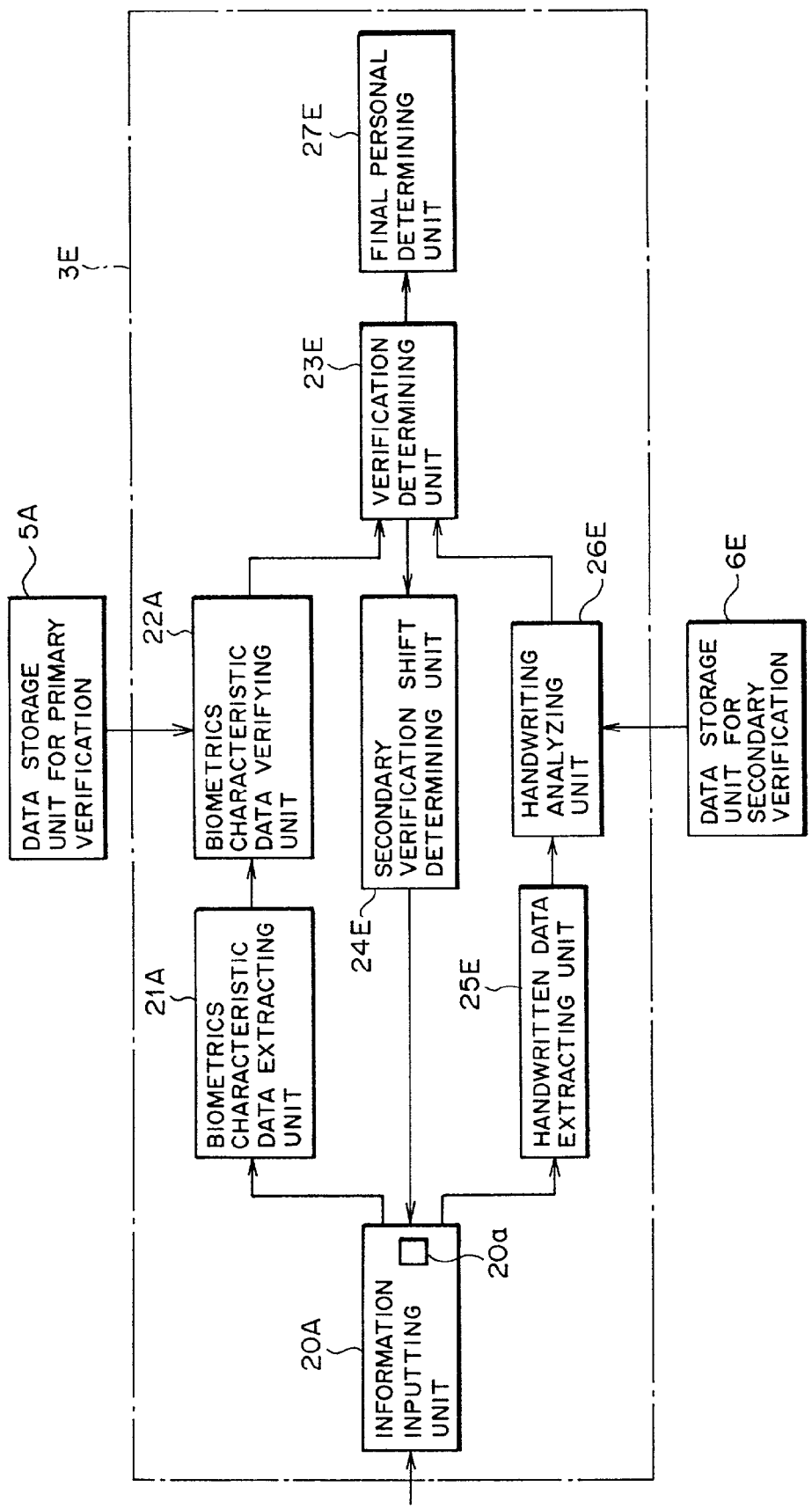
FIG. 16 is a block diagram showing a fifth example of the concrete structure of the authenticating apparatus according to the embodiment.
Figure 17:
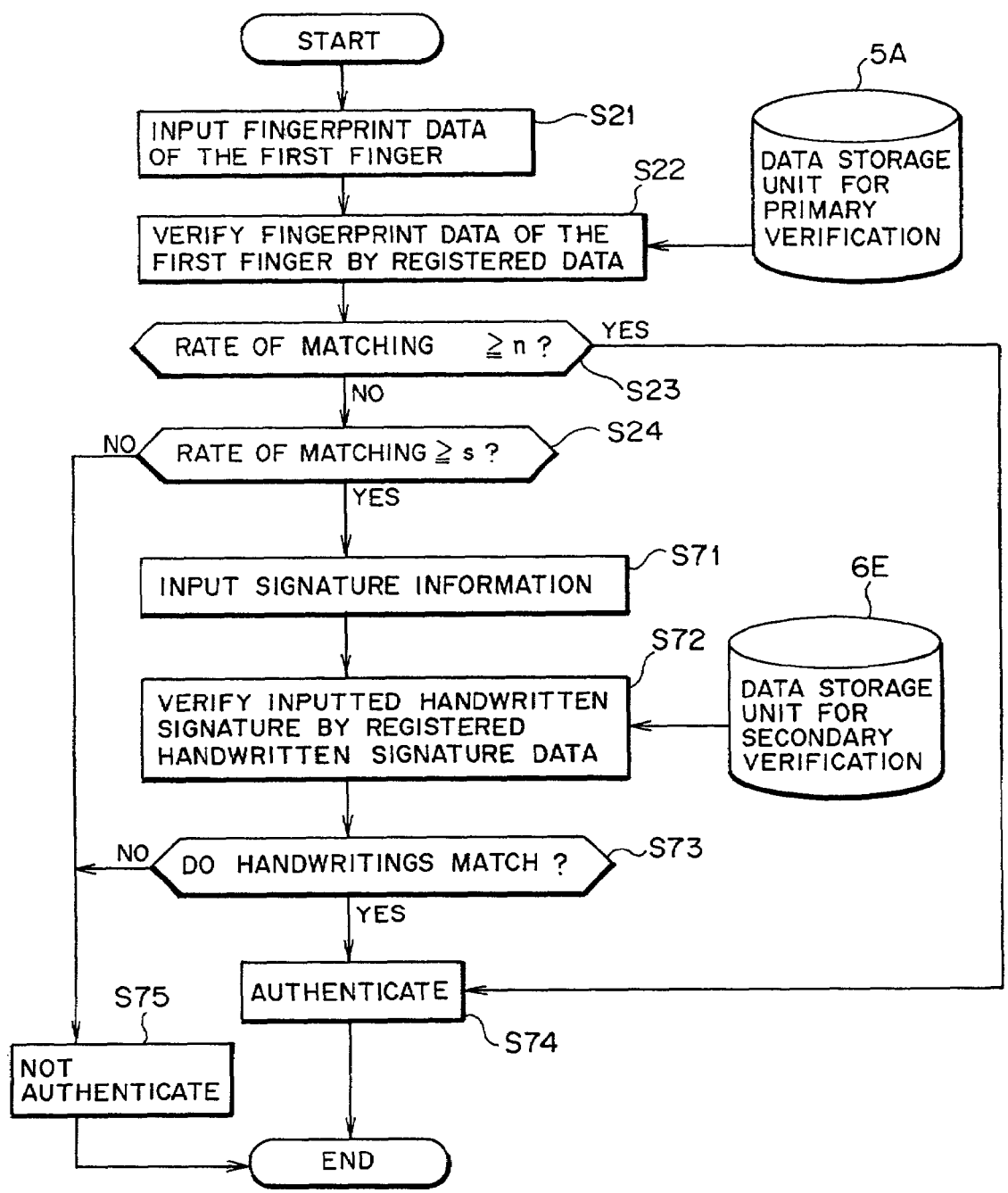
FIG. 17 is a flowchart for illustrating a procedure for authentication by the authenticating apparatus shown in FIG. 16.

FIGS. 16 and 17 depict a fifth example of the concrete structure of the authenticating apparatus according to this embodiment. FIG. 16 is a block diagram showing a structure of the authenticating apparatus 3E. FIG. 17 is a flowchart for illustrating a procedure for authentication by the authenticating apparatus 3E. Incidentally, the same reference characters in FIG. 16 as those having been described hereinbefore designate like or corresponding parts, detailed descriptions of which are thus omitted.

The authenticating apparatus 3E shown in FIG. 16 uses contact trace information (non-biometrics information) intentionally inputted by a person to be authenticated via the fingerprint input screen/image input screen of the information inputting unit 20A when personal authentication using a fingerprint results in failure (when primary verification is failed) in the personal authentication system 1, thereby accomplishing a relief authentication.

A type of the contact trace information is not specifically limited. Here, the contact trace information is a signature drawn on the image input screen with, for example, a felt-tipped pen, and the relief authentication (secondary verification) is carried out by analyzing the handwriting.

When the authenticating apparatus 3E is employed, the person to be registered draws a predetermined unique pattern (signature) on the image input screen of the information inputting unit 10 with his/her finger or a pen-like device (felt-tipped pen or the like) while making it contact with the image input screen in the registering apparatus 2 of the personal authentication system 1, as stated above. The extracting unit 14 extracts contact trace information as non-biometrics characteristic data from image data obtained at that time, and stores the contact trace information as registry data for secondary verification in the data storage unit for secondary verification 6E. Incidentally, procedures for registering data in the data storage unit for primary verification 5A and the data storage unit for secondary verification 6E by the registering apparatus 2 are as have been described above with reference to FIG. 3.

The authenticating apparatus 3E comprises, as shown in FIG. 16, a verification determining unit 23E, a secondary verification shift determining unit 24E, a handwritten data extracting unit 25E, a handwriting analysis unit 26E, and a final personal determining unit 27E, along with the information inputting unit 20A, the biometrics characteristic data extracting unit 21A, and the biometrics characteristic data verifying unit 22A.

The verification determining unit (personal determining unit) 23E fulfils the similar function to the verification determining unit 23 shown in FIG. 4. When receiving a result of primary verification from the verifying unit 22A, the verification determining unit 23E determines whether a rate of matching in the primary verification is equal to or more than the primary verification acceptable threshold value n or not. The verification determining unit 23E also determines coincidence of two pieces of contact trace information (handwritten data) on the basis of a result of analysis from the handwriting analysis unit 26E to be described later.

The secondary verification shift determining unit 24E corresponds to the secondary verification shift determining unit 24 shown in FIG. 4. When the verification determining unit 23E determines that the rate of matching in the primary verification is less than the secondary verification shift threshold value n, the secondary verification shift determining unit 24E determines whether the rate of matching in the primary verification is equal to or more than the secondary verification shift threshold value s (s<n) or not, and further determines secondary verification is necessary, that is, whether the procedure proceeds to secondary verification or not, on the basis of a result of the determination.

The handwritten data extracting unit (fourth extracting unit) 25E corresponds to the characteristic data extracting unit for secondary verification 25 shown in FIG. 4. The handwritten data extracting unit 25E recognizes contact trace information (handwritten data) from image data obtained when the person to be authenticated draws a predetermined unique pattern (signature) on the image input screen of the information inputting unit 20A, and extracts the same.

The handwriting analysis unit (secondary verifying unit) 26E corresponds to the secondary verifying unit 26 shown in FIG. 4. The handwriting analysis unit 26E compares and matches the contact trace information (handwritten data) extracted by the handwritten data extracting unit 25E with contact trace information (registry data for secondary verification) of the person to be authenticated, the contact trace information of the person being registered beforehand in the data storage unit 6E, and analyzes the handwriting.

The final personal determining unit (personal determining unit) 27E corresponds to the final personal determining unit 27 shown in FIG. 4. In cooperation with the verification determining unit 23E described above, the final personal determining unit 27E functions as a personal determining unit which determines whether the person to be authenticated is the person himself/herself or not on the basis of results of verification and analysis by the biometrics characteristic data verifying unit 22A and the handwriting analysis unit 26E. When the verification determining unit 23E determines that a rate of matching in primary verification is equal to or more than the threshold value n, or that the pattern (signature) drawn by the person to be authenticated coincides with registry data for secondary verification, the final personal determining unit 27E determines and authenticates that the person to be authenticated is the person himself/herself.

A procedure for authentication by the authenticating apparatus 3E in the above structure will be next described with reference to a flowchart (steps S21 to S24, and S71 to S75) shown in FIG. 17.

Steps S21 to S24 are similar to the primary verification process (steps S21 to S23) and the process of determining to shift to secondary verification (step S24) performed in the authenticating procedure shown in FIG. 7, detailed descriptions of which are thus omitted. Additionally, the secondary verification shift setting unit 28 and the personal information setting unit 29 are omitted in the authenticating apparatus 3E, the process of determining to shift to secondary verification corresponding to step S25 in FIG. 7 is thus omitted.

When the verification determining unit 23E determines that a rate of matching in primary verification is equal to or more than the threshold value n (YES route at step S23), the final personal determining unit 27E determines and authenticates that a person to be authenticated is the person himself/herself (registered person) since a rate of matching sufficient to determine that the person to be authenticated is the person himself/herself is obtained in the primary verification (step S74), and the process is terminated.

When the secondary verification shift determining unit 24E determines that the rate of matching in the primary verification is equal to or more than the secondary verification shift threshold value s (YES route at step S24), the instruction unit 20a operates to prompt the person to be authenticated to input data for secondary verification through the information inputting unit 20A.

Responding to this, the person to be authenticated draws a predetermined unique pattern (signature) on the image input screen of the information inputting unit 20A with his/her finger or a pen-like device (felt-tipped pen or the like) while making it contact with the image input screen. In the authenticating apparatus 3E, the handwritten data extracting unit 25E extracts contact trace information (handwritten data) as non-biometrics characteristic data from image data obtained when the person to be authenticated draws the pattern (step S71).

The handwriting analysis unit 26E compares and matches the handwritten data extracted by the handwritten data extracting unit 25E with handwritten data of the person to be authenticated, the handwritten data of the person being registered beforehand in the data storage unit 6E (step S72). The verification determining unit 23E determines whether two sorts of the handwritten data coincide with each other or not (step S73).

When the verification determining unit 23E determines that the two sorts of handwritten data coincide with each other (YES route at step S73), the final personal determining unit 27E determines and authenticates that the person to be authenticated is the person himself/herself (step S74), and the process is terminated.

When the verification determining unit 23E determines that the two sorts of handwritten data do not coincide with each other (NO route at step S73), the final personal determining unit 27E determines not to authenticate (Step S75), and the process is terminated. When the secondary verification shift determining unit 24E determines that the rate of matching in the primary verification is less than the secondary verification shift threshold value s (NO route at step S24), the final personal determining unit 27E determines as well not to authenticate (step S75), and the process is terminated.

When the authenticating apparatus 3E shifts to the relief authenticating process, the person to be authenticated intentionally draws and inputs his/her signature from the same information inputting unit 20A as that having been used when biometrics information for primary verification is inputted. Handwritten data is extracted from image data obtained when the signature is drawn, and compared and matched with handwritten data registered beforehand. When the two sorts of handwritten data coincide with each other, the person to be authenticated is authenticated as the person himself/herself (registered person). At this time, a technique of determining whether to match handwritings by simply comparing the handwritings, may be used, but a general handwriting analyzing technique in which pressures of handwritings are compared may be alternatively used to further improve the security.

According to the authenticating apparatus 3E and the personal authentication system 1 with the authenticating apparatus 3E, the user intentionally inputs a pattern such as a signature using the information inputting unit 10 or 20A, and handwritten data (contact trace information) is used as registry data for secondary verification. It is therefore possible to input data of the user necessary in primary verification and secondary verification from one information inputting unit 10 or 20A.

Namely, the information unit 10 or 20A may be used as a device for inputting biometrics characteristic data for primary verification and a device for inputting a signature.

Accordingly, it is possible to input data of the user necessary in primary verification and secondary verification from one information inputting unit 10 or 20A without adding any new apparatus for inputting a signature, thereby carrying out both primary verification and secondary verification (relief verification).

Figure 18:
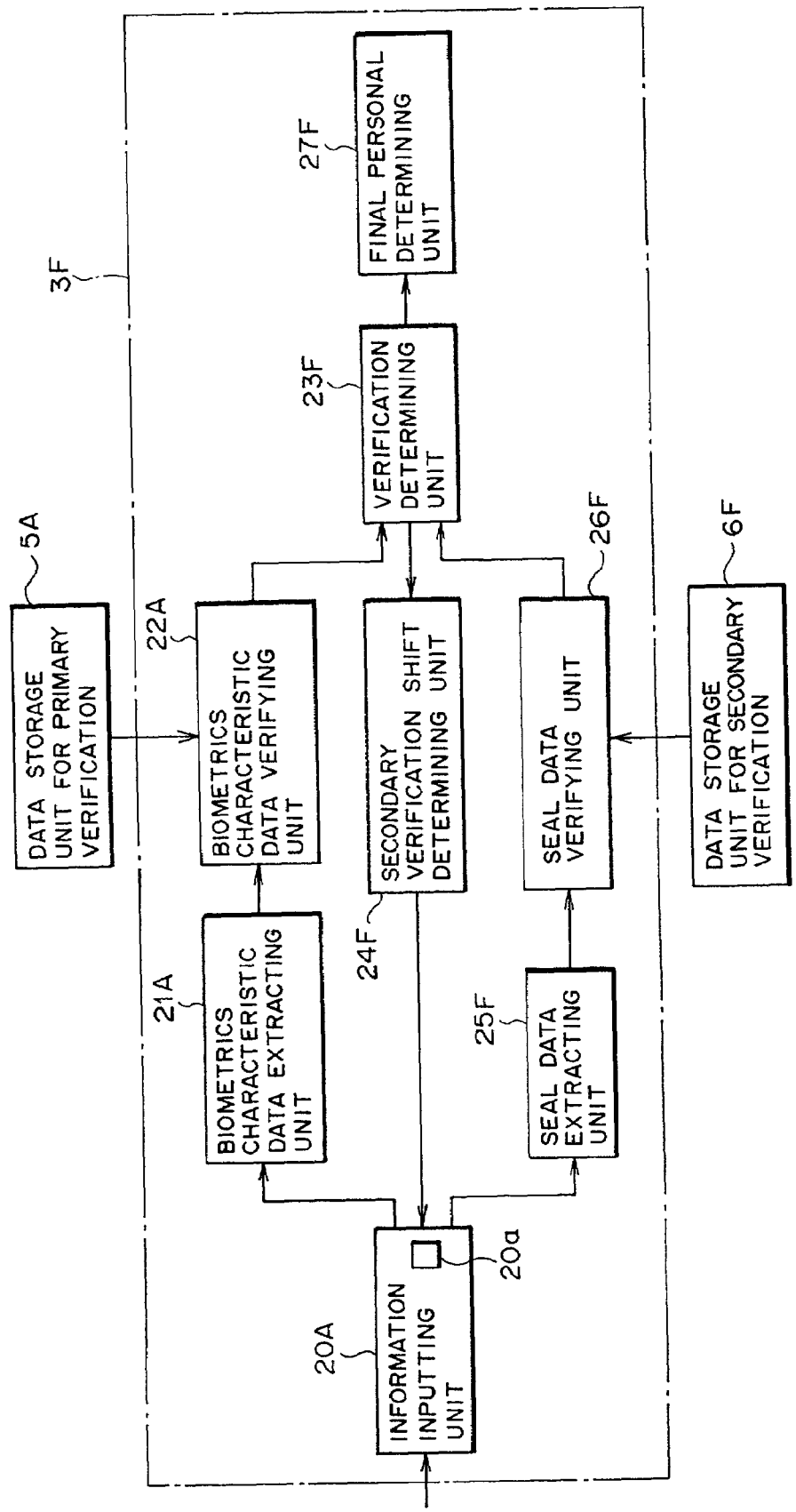
FIG. 18 is a block diagram showing a sixth example of the concrete structure of the authenticating apparatus according to the embodiment.
Figure 19:
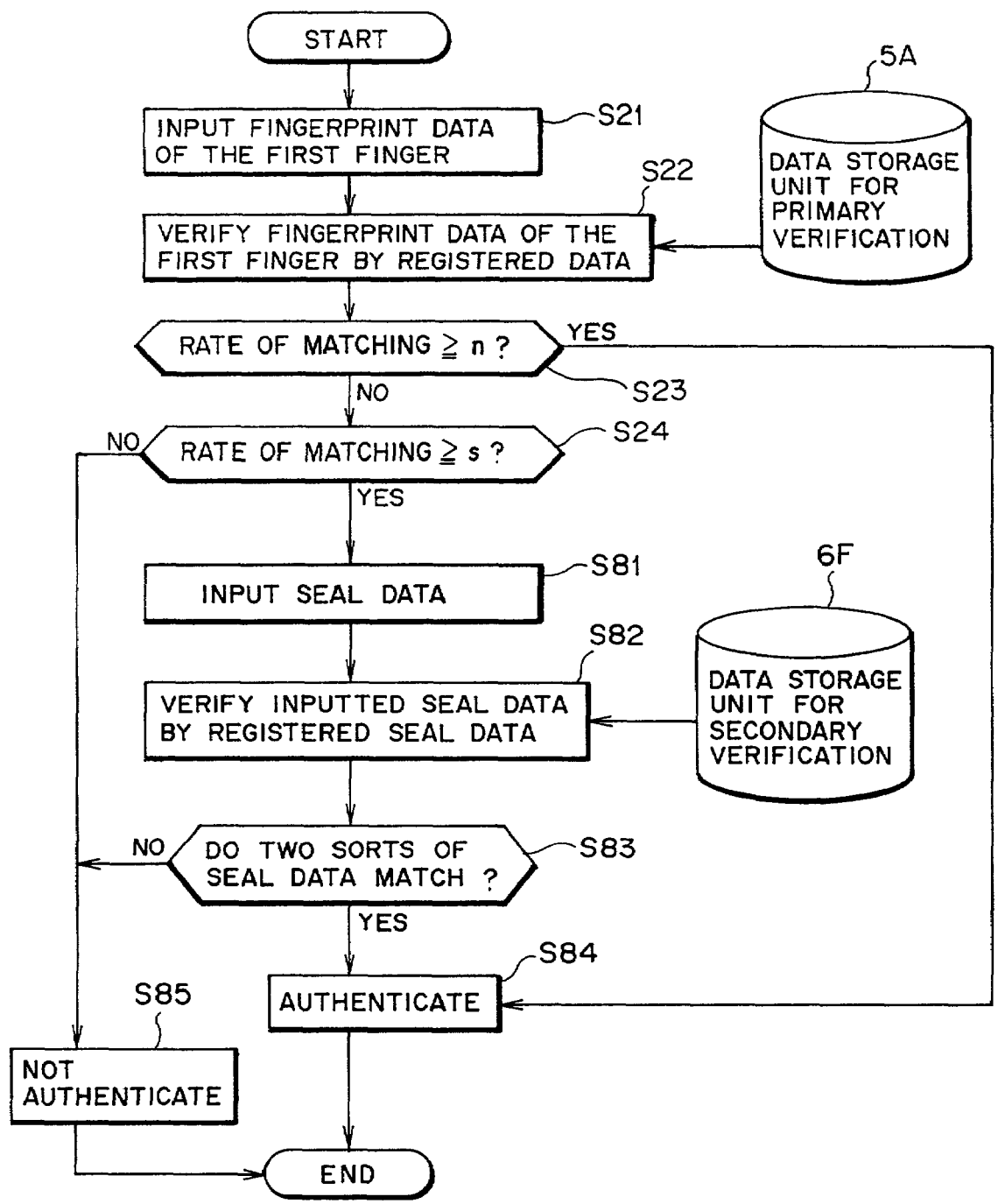
FIG. 19 is a flowchart for illustrating a procedure for authentication by the authenticating apparatus shown in FIG. 18.

FIGS. 18 and 19 depict a sixth example of the concrete structure of the authenticating apparatus 3F according to this embodiment. FIG. 18 is a block diagram showing a structure of the authenticating apparatus 3F. FIG. 19 is a flowchart for illustrating a procedure for authentication by the authenticating apparatus 3F. Incidentally, the same reference characters in FIG. 18 as those described hereinbefore designate like or corresponding parts, detailed descriptions of which are thus omitted.

The authenticating apparatus 3F shown in FIG. 18 uses contact pattern information (non-biometrics information) intentionally inputted from the fingerprint input screen/image input screen of the information inputting unit 20A by a person to be authenticated when personal authentication using a fingerprint results in failure (when primary verification is failed) in the personal authentication system 1, thereby accomplishing a relief authentication. A type of contact pattern to be inputted to the image input screen is not specifically defined. Here, an impression image of a seal is inputted as contact pattern information, and the image obtained by impressing the seal is matched and determined, thereby carrying out the relief authentication (secondary verification).

When the authenticating apparatus 3E is employed, a person to be registered makes a seal possessed by the person or user contact with the image input screen of the information inputting unit 10 in the registering apparatus 2 of the personal authentication system 1 to form an image of the seal as a contact pattern on the image input screen, as stated above. The extracting unit 14 extracts a contact pattern as non-biometrics characteristic data from the image data obtained in such state, and stores the contact pattern as registry pattern for secondary verification in the data storage unit for secondary verification 6F. Incidentally, procedures for registering data in the data storage unit for primary verification 5A and the data storage unit for secondary verification 6F by the registering apparatus 2 are as have been described above with reference to FIG. 3.

The authenticating apparatus 3F comprises, as shown in FIG. 18, a verification determining unit 23F, a secondary verification shift determining unit 24F, a seal data extracting unit 25F, a seal data verifying unit 26F, and a final personal determining unit 27F, along with the information inputting unit 20A, the biometrics characteristic data extracting unit 21A, and the biometrics characteristic data verifying unit 22A.

The verification determining unit (personal determining unit) 23F fulfils the similar function to the verification determining unit 23 shown in FIG. 4. When receiving a result of primary verification from the verifying unit 22A, the verification determining unit 23F determines whether a rate of matching in the primary verification is equal to or more than the primary verification acceptable threshold value n or not. The verification determining unit 23F also determines coincidence of contact patterns (seal data) on the basis of a result of secondary verification from the seal data verifying unit 26F to be described later.

The secondary verification shift determining unit 24F corresponds to the secondary verification shift determining unit 24 shown in FIG. 4. When the determining unit 23F determines that the rate of matching in the primary verification is less than the primary verification acceptable threshold value n, the secondary verification shift determining unit 24F determines whether the rate of matching in the primary verification is equal to or more than the secondary verification shift threshold value s (s<n) or not, and further determines necessity for secondary verification, that is, whether the procedure proceeds to secondary verification or not, on the basis of a result of the determination.

The seal data extracting unit (fourth extracting unit) 25F corresponds to the characteristic data extracting unit for secondary verification 25 shown in FIG. 4. The seal data extracting unit 25F recognizes a contact pattern (impression image of a seal, seal data) as data for secondary verification from image data obtained when a person (user) to be authenticated forms an original contact pattern by a seal possessed by the person (user) to be authenticated on the image input screen of the information inputting unit 20A, and extracts the same.

The seal data verifying unit (secondary verifying unit) 26F corresponds to the secondary verifying unit 26 shown in FIG. 4. The seal data verifying unit 26F compares and matches a contact pattern extracted by the seal data extracting unit 25F with a contact pattern (registry data for secondary verification) of the person to be authenticated. The contact pattern of the person is registered beforehand in the data storage unit 6F.

The final personal determining unit (personal determining unit) 27F corresponds to the final personal determining unit 27 shown in FIG. 4. In cooperation with the verification determining unit 23F described above, the final personal determining unit 27F functions as a personal determining unit which determines whether a person to be authenticated is the person himself/herself or not on the basis of results of verification by the biometrics characteristic data verifying unit 22A and the seal data verifying unit 26F. When the verification determining unit 23F determines that a rate of matching in primary verification is equal to or more than the threshold value n, or that a contact pattern (seal data) inputted by the person to be authenticated coincides with registry data for secondary verification, the final personal verifying unit 27F determines and authenticates that the person to be authenticated is the person himself/herself.

Next, a procedure for authentication by the authenticating apparatus 3F in the above structure will be described with reference to a flowchart (steps S21 to S24, and S81 to S85) shown in FIG. 19.

Steps S21 to S24 are similar to the primary verification process (steps S21 to S23) and the process of determining to shift to secondary verification (step S24) performed in the authenticating procedure shown in FIG. 7, detailed descriptions of which are thus omitted. Since the secondary verification shift setting unit 28 and the personal information setting unit 29 are omitted in the authenticating apparatus 3F, a procedure of determining to shift to secondary verification corresponding to step S25 in FIG. 7 is omitted.

When the verification determining unit 23F determines that a rate of matching in primary verification is equal to or more than the threshold value n (YES route at Step S23), the final personal determining unit 27F determines and authenticates that a person to be authenticated is the person himself/herself (registered person) since the rate of matching sufficient to determine that the person to be authenticated is the person himself/herself is obtained in the primary verification (step S84), and the process is terminated.

When the secondary verification shift determining unit 24F determines that the rate of matching in the primary verification is equal to or more than the secondary verification shift threshold value s (YES route at step S24), the instruction unit 20a operates to prompt the person to be authenticated to input data for secondary verification through the information inputting unit 20A.

Responding to this, the person to be authenticated forms an original contact pattern (impression image) with a seal possessed by the person to be authenticated on the image input screen of the information input screen 20A. In the authenticating apparatus 3F, the seal data extracting unit 25F extracts the contact pattern (seal data) as authenticating object data (non-biometrics characteristic data) from image data obtained by forming the contact pattern (step S81).

The seal data verifying unit 26F compares and matches the seal data extracted by the seal data extracting unit 25F with seal data of the person to be authenticated, the seal data of the person being registered beforehand in the data storage unit 6F (step S82). The verification determining unit 23F determines whether the two sorts of seal data coincide with each other or not (step S83).

When the verification determining unit 23F determines that the two sorts of seal data coincide with each other (YES route at step S83), the final personal determining unit 27F determines and authenticates that the person to be authenticated is the person himself/herself or registered person (step S84), and the process is terminated.

When the verification determining unit 23F determines that the two sorts of seal data do not coincide with each other (NO route at step S83), the final personal determining unit 27F determines not to authenticate (step S85), and the process is terminated. When the secondary verification shift determining unit 24F determines that the rate of matching in the primary verification is less than the secondary verification shift threshold value s (NO route at step S24), the final personal determining unit 27F determines not to authenticate as well (step S85), and the process is terminated.

When the authenticating apparatus 3F shifts to the relief authenticating process, a person to be authenticated intentionally inputs an impression image of a seal via the same information inputting unit 20A as that used when biometrics information for primary verification is inputted. At this time, the impression image of the seal is obtained as image data by the information inputting unit 20A, and seal data is extracted from the image data. The seal data is compared with seal data registered beforehand. When the two sorts of seal data coincide with each other, the person to be authenticated is authenticated as the person himself/herself (registered person), and a series of the authenticating process is terminated.

According to the authenticating apparatus 3F and the personal authentication system 1 with the authenticating apparatus 3F, the user inputs an original contact pattern using a seal or the like from the information inputting unit 10 or 20A in secondary verification, and the contact pattern (seal data) is used as registry data for secondary verification, whereby data of the user necessary in primary verification and secondary verification is inputted from one information inputting unit 10 or 20A.

Namely, the information inputting unit 10 or 20A can be used as a device for inputting biometrics characteristic data for primary verification and a device for inputting seal data as non-biometrics characteristic data.

It is therefore possible to input data of a user necessary in primary verification and secondary verification from one information inputting unit 10 or 20A, thus carry out both the primary verification and secondary verification (relief verification) without adding any new apparatus for inputting seal data.

In the above-described example, a normal seal is used to form a contact pattern on the image input screen of the information inputting unit 10 or 20A. Alternatively, an electronic seal (pattern information input medium) 30 or 30A as shown in, for example, 20 to 24 may be used.

The electronic seal 30 or 30A is possessed and carried by a user (registered person, a person to be authenticated), and is mounted on the information inputting unit 10 or 20A at the time of registry or secondary verification. When registry data for secondary verification is registered in the data storage unit 6F using the electronic seal 30 or 30A, the same electronic seal 30 or 30A is actually used in secondary verification, as a matter of course.

The electronic seal 30 is adapted to a case where the information inputting unit 10 or 20A is an optical fingerprint unit, a structure and an operation of which will be described later with reference to FIGS. 20 to 22. The electronic seal 30A is adapted to a case where the biometrics information inputting unit for registration (first biometrics information inputting unit) or the biometrics information inputting unit for authentication (second biometrics information inputting unit) is a capacitance fingerprint unit 20A', a structure and an operation of which will be described later with reference to FIGS. 23 and 24.

Figure 20:
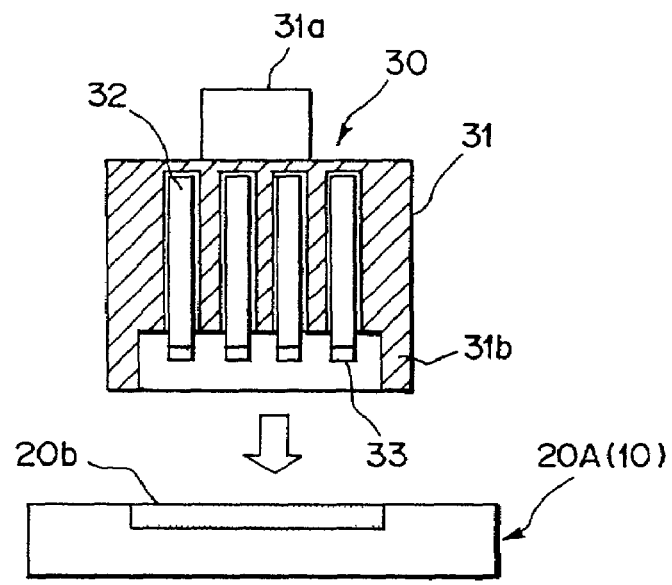
FIG. 20 is a vertical sectional view of a structure of an example of an electronic seal (pattern information input medium) used in the embodiment.
Figure 21A:
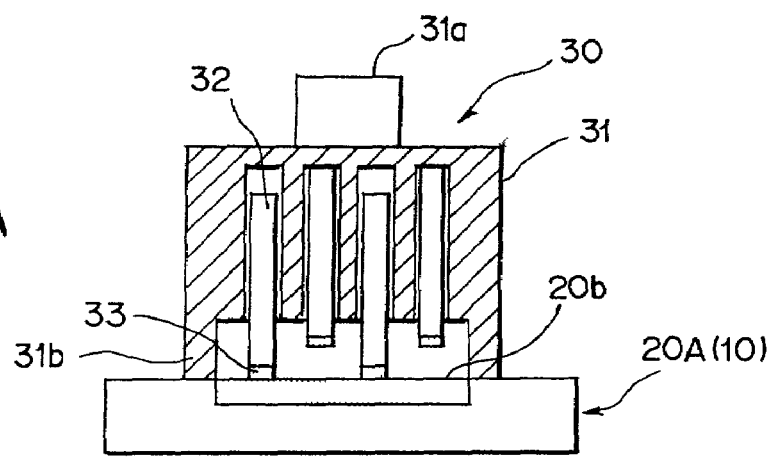
FIGS. 21A and 21B illustrate an operation of the electronic seal shown in FIG. 20.
Figure 21B:
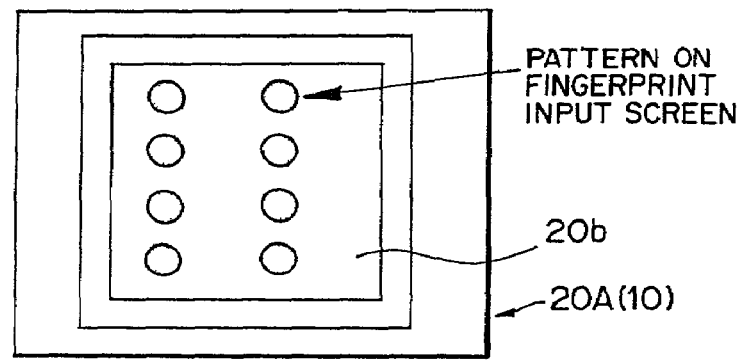

FIG. 20 is a vertical sectional view showing a structure of the electronic seal 30. FIGS. 21A, 21B, 22A, and 22B illustrate an operation of the electronic seal 30. FIGS. 21A and 22A are vertical sectional views illustrating operational states of the electronic seal 30. FIGS. 21B and 22B are plan views showing examples of contact patterns on the fingerprint input screen 20b.

As shown in FIG. 20, a grip 31a that is gripped by a user is such formed on an upper surface of a body 31 of the electronic seal 30 as to project therefrom. A frame 31b in the same shape (here, a rectangle) as the fingerprint input screen 20b is such formed on the lower surface of the body 31 of the electronic seal 30 as to project from the lower surface thereof. The frame 31b is such formed that a shape of an inner periphery of the frame 31b matches with a shape of an outer periphery of the fingerprint input screen 20b in a state where the electronic seal 30 is mounted on the information inputting unit 20A (10) as shown in FIG. 21A or 22A.

Inside the frame 31b, a plurality (here, 4×4=16) of pins 32 are provided projectably from and retractably into the body 31. These pins 32 are slidably driven by a drive mechanism (not shown) built in the body 31, so as to be projectably and retractably driven with respect to the body 31.

A rubber film (contact part) 33 is attached to a surface of a tip of each of the pins 32. When each of the pin 32 is driven to project in a state where the electronic seal 30 is mounted on the information inputting unit 20A (10) as shown in FIG. 21A or 22A, the rubber film 33 touches the fingerprint input screen 20b of the information inputting unit 20A (10) and contacts therewith to form a contact pattern unique to the possessor.

By using such the electronic seal 30 instead of a seal or a fingerprint as described above, it is possible to input data for secondary verification from the fingerprint input screen 20b of the information inputting unit 20A (10). Namely, instead of a fingerprint, the pin 32 is driven to project. When the rubber film 33 on the tip of the pin 32 contacts with the fingerprint input screen 20b, a pattern of the contacting portion is captured as image data by the registering apparatus 2 or the authenticating apparatus 3F.

Accordingly, it is possible to set a unique contact pattern (seal data) of each user by making pins 32 at arbitrary positions out of the 16 pins 32 contact with the fingerprint input screen 20b, as shown in FIG. 21B or 22B.

When the electronic seal 30 is not used (that is, when the electronic seal 30 is not mounted on the fingerprint input screen 20b), all the pins are stored inside the body 31. Only when the electronic seal 30 is used (that is, when the electronic seal 30 is mounted on the fingerprint input screen 20b), predetermined pins 32 corresponding to a contact pattern are driven to project from the body 31.

At this time, it is possible to change a contact pattern on the fingerprint input screen 20b formed by a plurality of pins 32 in time series, and use the contact pattern changing in time series as data for secondary verification (seal data).

In the examples shown in FIGS. 21B and 22B, a shape of the contact pattern formed on the fingerprint input screen 20b by the rubber film 33 on the tip of each of the pins 32 is a circle. However, the shape is not limited to the above examples, but other shape maybe used to form a contact pattern. The rubber film 33 attached to the tip of each of the pins 32 can bring a good contact with the fingerprint input screen 20b. If the pins 32 are made of a material that can bring a good contact with the fingerprint input screen 20b, it is unnecessary to attach the rubber film 33.

Figure 24A:
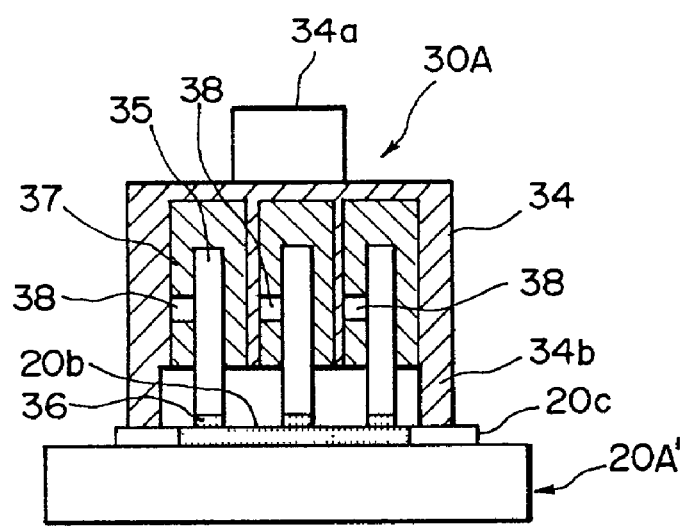
FIGS. 24A and 24B illustrate an operation of the electronic seal shown in FIG. 23.
Figure 24B:
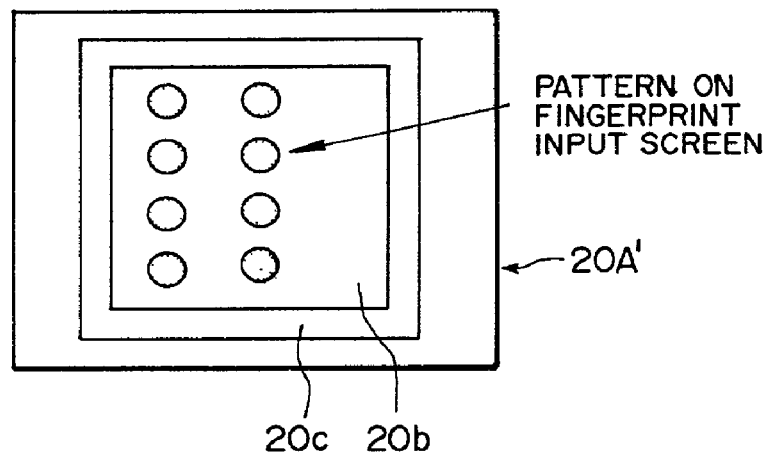

FIG. 23 is a vertical sectional view showing a structure of the electronic seal 30A. FIGS. 24A and 24B depict an operation of the electronic seal 30A. FIG. 24A is a vertical sectional view showing an operational state of the electronic seal 30A. FIG. 24B is a plan view showing an example of a contact pattern on the fingerprint input screen 20b.

As shown in FIG. 23, a conductive metal ring 20c connected to the ground is arranged on the outer periphery of the fingerprint input screen 20b in the capacitance fingerprint unit (information inputting unit) 20A'.

A grip 34a to be gripped by a user is such formed on a body made of conductor 34 of the electronic seal 30A as to project therefrom. A frame 34b in the same shape (rectangle, here) as the fingerprint input screen 20b is such formed on the lower surface of the body made of conductor 34 of the electronic seal 30A as to project therefrom. A shape of an inner periphery of the frame 34b matches with a shape of an outer periphery of the fingerprint input screen 20b, and the lower surface of the frame 34b contacts with the conductive metal ring 20c, with the electronic seal 30A being mounted on the information inputting unit 20A', as shown in FIG. 24A.

A plurality (here, 12=3×4) of conductive pins 35 are provided projectably from and rectractably into the body made of conductor 34 inside the frame 34b. An insulator 37 is disposed between each of the conductive pins 35 and the body made of conductor 34. Each of the conductive pins 35 and the body made of conductor 34 are switched to be electrically connected or insulated according to an ON/OFF operation of each of switches 38. The ON/OFF operation of each of the switches is controlled by a control circuit or the like not shown. The conductive pins 35 are together slidably operated by a drive mechanism (not shown) built in the body made of conductor 34, so as to be together driven to project from and retract into the body made of conductor 34.

A conductive polymer film (contact unit) 36 is attached to a surface of a tip of each of the conductive pins 35. As shown in FIG. 24A, the conductive pins 35 are driven to project, with the electronic seal 30A being mounted on the information inputting unit 20A'. When the switch 38 is then turned ON to electrically connect the body made of conductor 34 to the conductive pins 35, with the conductive polymer file 36 touching and contacting with the fingerprint input screen 20b of the information inputting unit 20A', a contact pattern of the conductive pins 35 (conductive polymer film 36) is formed on the fingerprint input screen 20B as shown in FIG. 24B.

By using such the electronic seal 30A instead of a seal or fingerprint as described above, it is possible to input data for secondary verification from the fingerprint input screen 20B of the information inputting unit 20A' (10). At this time, it is possible to set a unique contact pattern (seal data) for each user by electrically connecting the conductive pins 35 at arbitrary positions out of the 12 conductive pins 35 to the body made of conductor 34 by the switches 38, as shown in FIG. 24B. The contact pattern is captured as image data in the registering apparatus 2 or the authenticating apparatus 3F.

When the electronic seal 30A is not used (that is, when the electronic seal 30a is not mounted on the fingerprint input screen 20b), the conductive pins 35 are all stored inside the body made of conductor 34. Only when the electronic seal 30A is used (that is, when the electronic seal 30A is mounted on the fingerprint input screen 20b), the conductive pins 35 are driven to project from the body made of conductor 34.

At this time, it is possible to change in time series a contact pattern on the fingerprint input screen 20B by controlling in time series the ON/OFF operation of the plural switches 38, and to use a contact pattern changing in time series as data for secondary verification (seal data).

In the example shown in FIG. 24B, a shape of a contact pattern formed on the fingerprint input screen 20b by the conducting polymer film 36 on the tip of the conductive pin 35 is a circle. However, the shape is not limited to be above example, but another shape may be used to form the contact pattern.

Why the conductive pin 35 does not directly contact with the fingerprint input screen 20b but the conductive polymer film 36 is interposed between each of the conductive pins 35 and the fingerprint input screen 20b is to avoid electrostatic discharge of the capacitance fingerprint unit 20A', and to make the conductive pins 35 softly contact with the fingerprint input screen 20b. When the conductive pins 35 have the similar characteristic to the conducting polymer film 36, it is unnecessary to attach the conducting polymer film 36 thereto.

The electronic seal 30A adapted to the capacitance fingerprint unit 20A' can be used for the optical fingerprint unit 20A like the electronic seal 30 described above.

When the electronic seal 30 or 30A described above is used, procedures for registering data in the data storage unit for primary verification 5A and the data storage unit for secondary verification 6F by the registering apparatus 2 are as have been described above with reference to FIG. 3, and a procedure for authentication by the authenticating apparatus 3F is as has been described above with reference to FIG. 19.

By using the above electronic seal 30 or 30A, it is possible to readily change the contact pattern, and surely form a contact pattern unique to each user (possessor) on the fingerprint input screen 20b of the information inputting unit 10, 20A or 20A' at any occasion under constant conditions. Namely, the electronic seal 30 or 30A fulfils the similar function to the general seal in association with the information inputting unit 10, 20A or 20A'.

If a contact pattern unique to a possessor is beforehand registered as registry data for secondary verification, the person to be authenticated can input data for secondary verification into the personal authentication system 1 in secondary verification by mounting the electronic seal 30 or 30A on the fingerprint input screen 20b in the similar manner to when impressing a general seal on a paper. Therefore, the personal authentication system 1 can realize the measure for relief in personal authentication by using only existing structural apparatuses in the personal authentication system 1, without causing complexity or an increase in cost.

Figure 25:
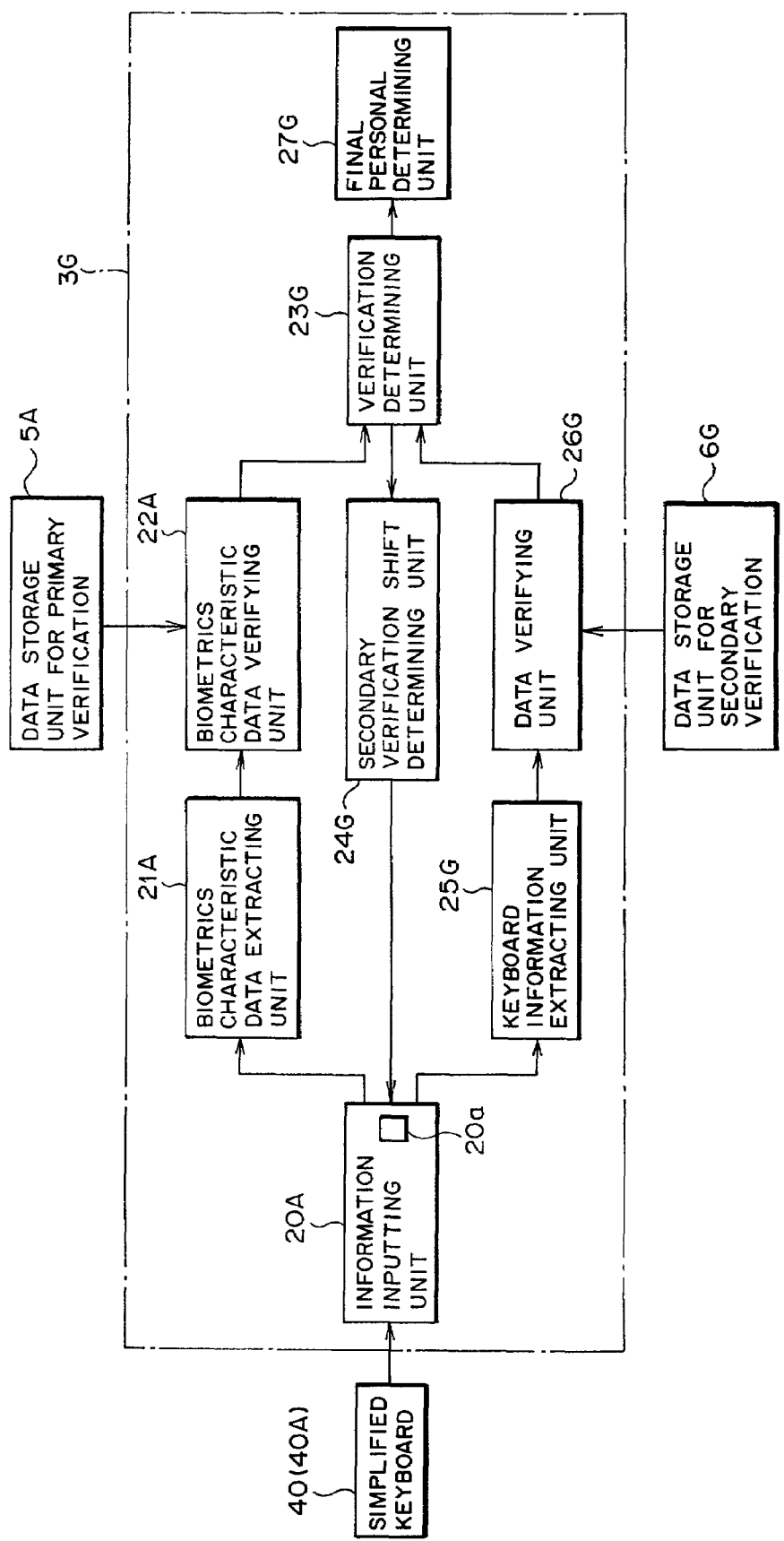
FIG. 25 is a block diagram showing a seventh example of the concrete structure of the authenticating apparatus according to the embodiment.
Figure 26:
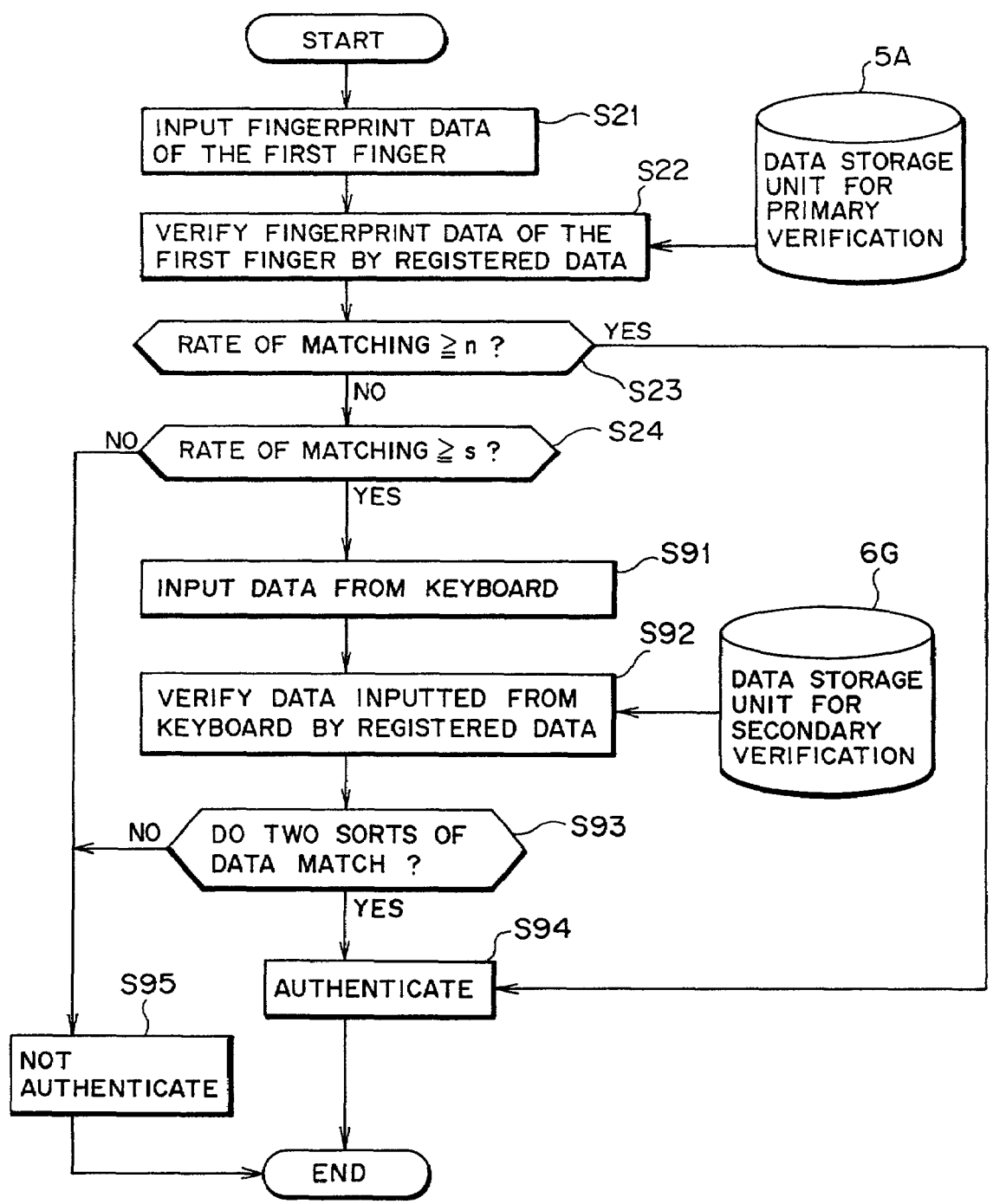
FIG. 26 is a flowchart for illustrating a procedure for authentication by the authenticating apparatus shown in FIG. 25.

FIGS. 25 and 26 depict a seventh example of the concrete structure of the authenticating apparatus according to this embodiment. FIG. 25 is a block diagram showing a structure of the authenticating apparatus 3G. FIG. 26 is a flowchart for illustrating a procedure for authentication by the authenticating apparatus 3G. Incidentally, the same reference characters in FIG. 25 as those described hereinbefore designate like or corresponding parts, detailed descriptions of which are thus omitted.

Here, character data corresponding to each of plural different contact patterns or each position of plural different contact points on the image input screen of the information inputting unit 10 or 20A is beforehand set, and character data corresponding to a contact pattern or a position of a contact point detected as image data by the information inputting unit 10 or 20A is used as non-biometrics character data.

For example, the user (person to be registered, registered person, person to be authenticated) forms one or more contact patterns corresponding to unique character data or a unique character data string equivalent to a personal identification number, a password or the like, or forms one or more contact points at one or more positions corresponding to the character data or the character data string on the image input screen of the information inputting unit 10 or 20A.

Hereinafter, description will be made of a case where a simplified keyboard (keyboard unit) 40 as shown in FIGS. 27A to 29B is used to form the contact points at the positions corresponding to the character data or the character data string to input the character data string unique to the user.

Figure 27A:
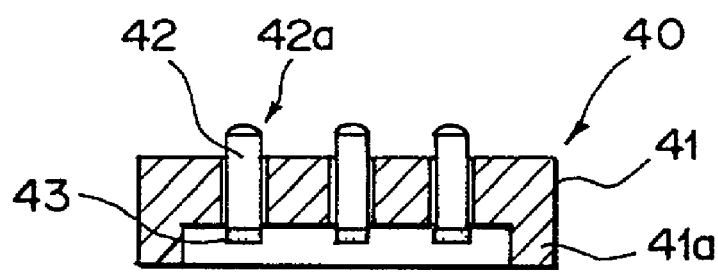
FIGS. 27A and 27B show a structure of an example of a simplified keyboard used in the embodiment.
Figure 27B:
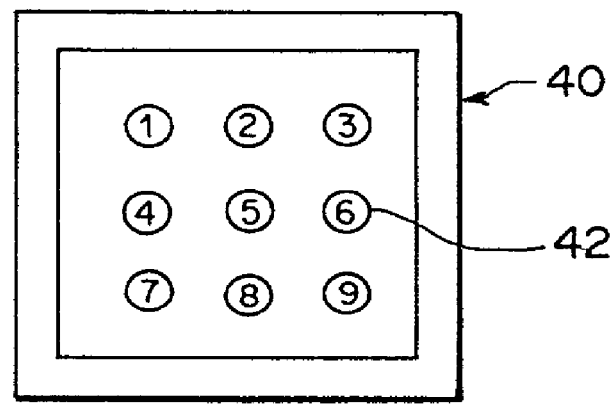
Figure 28A:
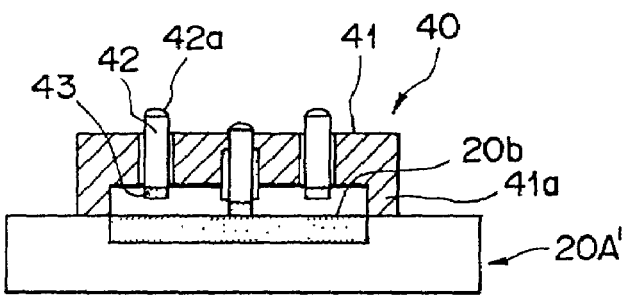
FIGS. 28A and 28B illustrate an operation of the simplified keyboard shown in FIGS. 27A and 27B.
Figure 28B:
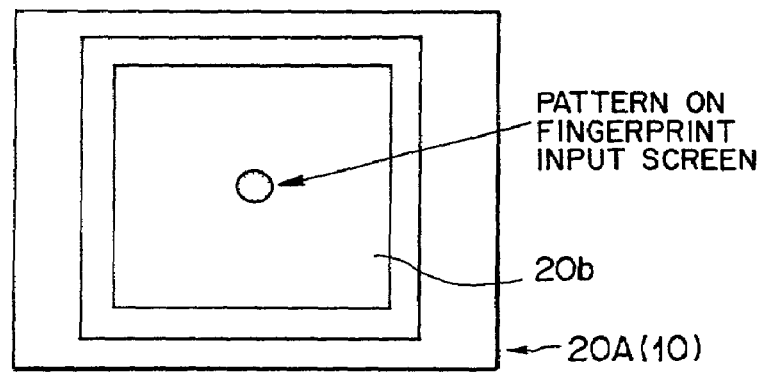

FIGS. 27A through 28B depict an example of a structure and an operation of the simplified keyboard 40 used in this embodiment. FIG. 27A is a vertical sectional view of the simplified keyboard 40. FIG. 27B is a plan view of the simplified keyboard 40. FIG. 28A is a vertical sectional view showing an operational state of the simplified keyboard 40. FIG. 28B is a plan view showing an example of an input pattern on the fingerprint input screen 20b formed by the simplified keyboard 40.

The simplified keyboard 40 adapted to a case where the information inputting unit 10 or 20A is an optical fingerprint unit, which is attachable to and detachable from the information inputting unit 10 or 20A. As shown in FIGS. 27A and 27B, a frame 41a in the same shape as the fingerprint input screen 20b (here, a rectangle) is such formed on the lower surface of a body 41 of the simplified keyboard 40 as to project therefrom. The frame 41a is such formed as that a shape of an inner periphery of the frame 41a matches with a shape of an outer periphery of the fingerprint input screen 20b, with the simplified keyboard 40 being mounted on the information inputting unit 20A (10), as shown in FIG. 28A.

A plurality (here, 3×3=9) of keys 42 are provided to the body 41, which can slide in the upward and downward directions, with the keys 42 penetrating the body 41 inside the frame 41a. Each of the keys 42 is forced upward by a spring or the like not shown. When the user presses an upper surface (key top 42a) of each key 42 downward against a force of the spring, each key 45 moves downward.

A rubber film 43 is attached to a surface of a tip (lower surface) of each of the keys 42. When each of the keys 42 is pressed downward with the simplified keyboard 40 being mounted on the information inputting unit 20A (10), the rubber film 43 touches the fingerprint input screen 20b of the information inputting unit 20A (10) and contacts therewith.

Numbers from "1" to "9" are subscribed on the respective key tops 42a of the nine keys 42, for example. A correspondence between a contact point formed on the fingerprint input screen 2Db by the keys 42 and each of the numbers from "1" to "9" is beforehand held as a conversion table or the like in the extracting unit 14 of the registering apparatus 2 or a keyboard information extracting unit 25G of the authenticating apparatus 3G.

As shown in FIGS. 28A and 28B, when a key 42 subscribed, for example, "5" is pressed downward and the rubber film 43 on the surface of the tip of the key 42 thus contacts with the fingerprint input screen 20b, a contact point (contact pattern) thereof is read out as image data by the information inputting unit 20A (10). The extracting unit 14 of the registering apparatus 2 or the keyboard information extracting unit 25G of the authenticating apparatus 3G extracts a position of the contact point from the image data, thereby being able to recognize and specify from the conversion table or the like that a number "5" corresponding to the position is inputted.

By using the simplified keyboard 40, the extracting unit 14, and the keyboard information extracting unit 25G, it is possible to input unique character data or a unique character data string equivalent to a personal identification number, a password, or the like as data for secondary verification from the fingerprint input screen 20a of the information inputting unit 20A (10). Namely, instead of a fingerprint, pressing down the key 42 of the simplified keyboard 40 enables the information inputting unit 20A (10) to function similarly to a keyboard, whereby unique character data of the user is captured in the registering apparatus 2 or the authenticating apparatus 3G.

In the example shown in FIG. 28B, a shape of the contact pattern formed on the fingerprint input screen by the rubber film 43 at the tip of the key 42 is a circle. However, the shape is not limited to this example, but may be another. Why the rubber film 43 is attached to the tip of the key 42 is to give a good contact with the fingerprint input screen 20b. If the keys 42 are made from a material that can give a good contact with the fingerprint input screen 20b, it is unnecessary to attach the rubber film 43 thereto.

Further, the rubber film 43 itself may be in a shape of a character pattern. Whereby, not a position of the contact point but a contacting character pattern (contact pattern) may be discriminated by the extracting unit 14 or the keyboard information extracting unit 25G, and the inputted character data may be directly read out.

A correspondence between a key arrangement and characters of the keys 42 is not necessarily uniform in the simplified keyboard 40. It may be set differently from user to user. Further, it is alternatively possible to input data using a contact pattern formed by pressing a plurality of the keys 42 in combination, not by pressing only one key 42 at a time, when data is inputted from the simplified keyboard 40.

The authenticating apparatus 3G shown in FIG. 25 accomplishes a relief authentication by using a character data string (non-biometrics information) intentionally inputted by a person to be authenticated from the fingerprint input screen 20B of the information inputting unit 20A using the simplified keyboard 40 described above when personal authentication using a fingerprint results in failure (when primary verification is failed) in the personal authentication system 1.

When the authenticating apparatus 3G is employed, a person to be registered inputs a unique character data string equivalent to a personal identification number, a password or the like from the image input screen of the information inputting unit 10 using the simplified keyboard 40 in the registering apparatus 2 of the personal authentication system 1, as stated above. The information inputting unit 10 reads a contact point (contact pattern) formed on the image input screen in the key operation as image data. The extracting unit 14 obtains a position of the contact point from the image data, and converts the position into corresponding character data. The character data string (keyboard pattern data, keyboard information) obtained as above is stored as registry data for secondary verification in the data storage unit for secondary verification 6G. Incidentally, procedures for registering data in the data storage unit for primary verification 5A and the data storage unit for secondary verification 6G are as have been described above with reference to FIG. 3.

The authenticating apparatus 3G comprises, as shown in FIG. 25, a verification determining unit 23G, a secondary verification shift determining unit 24G, the keyboard information extracting unit 25G, a data verifying unit 26G, and a final personal determining unit 27G along with the information inputting unit 20A, the biometrics characteristic data extracting unit 21A, and the biometrics characteristic data verifying unit 22A.

The verification determining unit (personal determining unit) 23G fulfils the similar function to the verification determining unit 23 shown in FIG. 4. When receiving a result of primary verification from the verifying unit 22A, the verification determining unit 23G determines whether a rate of matching in the primary verification is equal to or more than the primary verification acceptable threshold value n or not. The verification determining unit 23G also determines coincidence of contact patterns (seal data) on the basis of a result of secondary verification from the data verifying unit 26G to be described later.

The secondary verification shift determining unit 24G corresponds to the secondary verification shift determining unit 24 shown in FIG. 4. When the determination verifying unit 23G determines that the rate of matching in the primary verification is less than the primary verification acceptable threshold value n, the secondary verification shift determining unit 24G determines whether the rate of matching in the primary verification is equal to or more than the secondary verification shift threshold value s (s<n) or not, and further determines on the basis of a result of the determination secondary verification is necessary, that is, whether the procedure proceeds to secondary verification or not.

The keyboard information extracting unit (fourth extracting unit) 25G corresponds to characteristic data extracting unit for secondary verification 25 shown in FIG. 4. The keyboard information extracting unit 25G converts a contact pattern (position of contact point) obtained from image data of the contact pattern inputted by a person (user) to be authenticated using the simplified keyboard 40 from the image input screen of the information inputting unit 20A into character data with reference to the above-described conversion table or the like.

The data verifying unit (secondary verifying unit) 26G corresponds to the secondary verifying unit 26 shown in FIG. 4. The data verifying unit 26G compares and matches the character data (keyboard pattern data) extracted by the keyboard information extracting unit 25G with keyboard pattern data (registry data for secondary verification) of the person to be authenticated. The keyboard pattern data of the person is registered beforehand in the data storage unit 6G.

The final personal determining unit (personal determining unit) 27G corresponds to the final personal determining unit 27 shown in FIG. 4. In cooperation with the verification determining unit 23G described above, the final personal determining unit 27G functions as a personal determining unit which determines whether the person to be authenticated is the person himself/herself (registered person) or not on the basis of results of verification by the biometrics character data verifying unit 22A and the data verifying unit 26G. When the verification determining unit 23G determines that the rate of matching in the primary verification is equal to or more than a threshold value n, or that the keyboard pattern data inputted by the person to be authenticated coincides with registry data for secondary verification, the final personal determining unit 27G determines and authenticates that the person to be authenticated is the person himself/herself.

A procedure for authentication by the authenticating apparatus 3G in the above-described structure will be next described with reference to a flowchart (steps S21 to S24, and S91 to S95) shown in FIG. 26.

Steps S21 to S24 are similar to the primary verification process (steps S21 to S23) and the process of determining to shift to secondary verification performed in the authenticating procedure shown in FIG. 7, detailed descriptions of which are thus omitted. The secondary verification shift setting unit 28 and the personal information setting unit 29 are omitted in the authenticating apparatus 3G, a process of determining to shift to secondary verification corresponding to step S25 in FIG. 7 is thus omitted.

When the verification determining unit 23G determines that a rate of matching in primary verification is equal to or more than the threshold value n (YES route at step S23), the final personal determining unit 27G determines and authenticates that a person to be authenticated is the person himself/herself since a rate of matching sufficient to determine that the person to be authenticated is the person himself/herself is obtained in the primary verification (step S94), and the process is terminated.

When the secondary verification shift determining unit 24G determines that the rate of matching in the primary verification is equal to or more than the secondary verification shift threshold value s (YES route at step S24), the instruction unit 20a operates to prompt the person to be authenticated to input data for secondary verification from the information inputting unit 20A.

Responding to this, the person to be authenticated operates the simplified keyboard 40 to form contact points corresponding to unique character data on the image input screen of the information inputting unit 20A. The information inputting unit 20A obtains the contact point as image data in the authenticating apparatus 3G. The keyboard information extracting unit 25G converts the contact points of the image data into character data, whereby keyboard pattern data inputted from the simplified keyboard 40 is extracted as non-biometrics characteristic data (step S91).

The data verifying unit 26G compares and matches the keyboard pattern data extracted by the keyboard information extracting unit 25G with keyboard pattern data of the person to be authenticated, the keyboard pattern data being registered beforehand in the data storage unit 6G (step S92). The verification determining unit 23G determines whether the keyboard patterns coincide with each other or not (step S93).

When the verification determining unit 23G determines that the two sorts of keyboard pattern data coincide with each other (YES route at step S93), the final personal determining unit 27G determines and authenticates that the person to be authenticated is the person himself/herself or registered person (step S94), and the process is terminated.

When the verification determining unit 23G determines that the two sorts of keyboard pattern data do not coincide (NO route at step S93), the final personal determining unit 27G determines not to authenticate (step S95), and the process is terminated. When the secondary verification shift determining unit 24G determines that the rate of matching in the primary verification is less than the secondary verification shift threshold value s (NO route at step S24), the final personal determining unit 27G determines not to authenticate as well (step S95), and the process is terminated.

When the authenticating apparatus 3G shifts to the relief authenticating process, a person to be authenticated intentionally inputs character data or a character data string from the same information inputting unit 20A as that used when inputting biometrics information for primary verification. At this time, the character data is obtained as image data by the information inputting unit 20A by using simplified keyboard 40, keyboard pattern data is extracted from the image data, and the keyboard pattern data is compared and matched with keyboard pattern data registered beforehand. When the two sorts of keyboard pattern data coincide with each other, the person to be authenticated is authenticated as the person himself/herself (registered person), and a series of the authenticating process is terminated.

According to the authenticating apparatus 3G, and the personal authentication system 1 with the authenticating apparatus 3G, the user inputs a unique character pattern or a unique character pattern string by using the simplified keyboard 40 through the information inputting unit 10 or 20A in secondary verification, and the character pattern (keyboard pattern data) is used as registry data for secondary verification. It is thereby possible to input data of the user necessary in primary verification and secondary verification from one information inputting unit 10 or 20A.

According to this embodiment, the simplified keyboard 40 attachable to and detachable from the information inputting unit 10 or 20A is used, and an input from the simplified keyboard 40 is converted into character data by the extracting unit 14 or 25G, whereby the information inputting unit 10 or 20A may function as a keyboard or a ten key pad. The user can readily input character data or a character data string from the information inputting unit 10 or 20a using the simplified keyboard 40 without a keyboard or a ten key pad. Here, a function of the extracting unit 14 or 25G is realized as software, thus what should be added as hardware is only the simplified keyboard 40 to be mounted on the image input screen.

So long as character data or a character data string equivalent to a personal identification number, a password or the like is registered beforehand, an authenticating object person can input character data or a character data string for secondary verification from the image input screen into the personal authentication system 1 in secondary verification in the similar manner to when inputting a personal identification number or a password from a keyboard or a ten key pad. The personal authentication system 1 can accomplish a measure for relief in personal authentication using the existing apparatuses without causing complexity or an increase in cost.

Next, a structure and operation of the simplified keyboard (keyboard unit) 40A adapted to the capacitance fingerprint unit 20A' will be described with reference to FIGS. 29A through 30B.

Figure 29A:
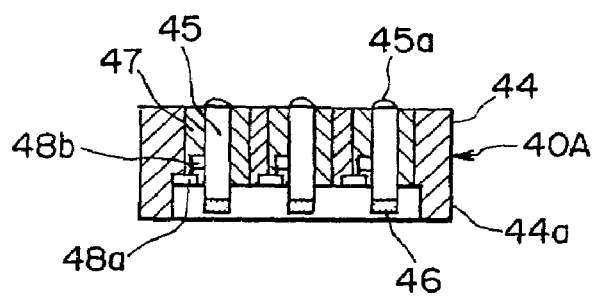
FIGS. 29A and 29B show a structure of another example of the simplified keyboard used in the embodiment.
Figure 29B:
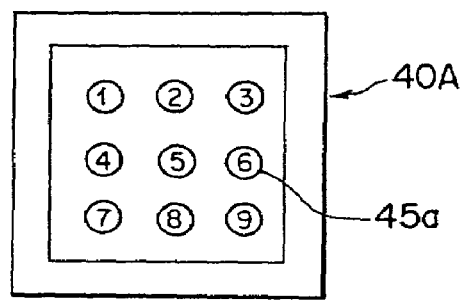
Figure 30A:
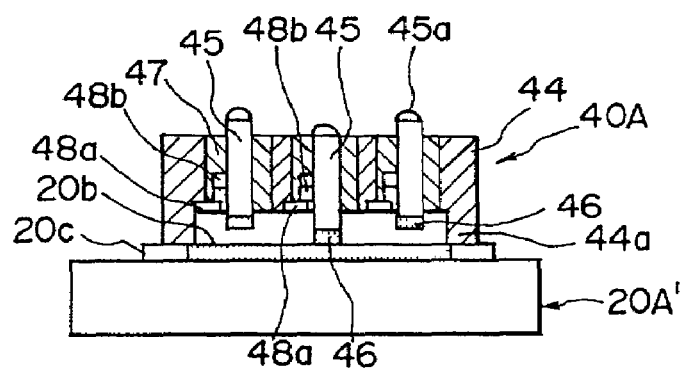
FIGS. 30A and 30B illustrate an operation of the simplified keyboard shown in FIGS. 29A and 29B.
Figure 30B:
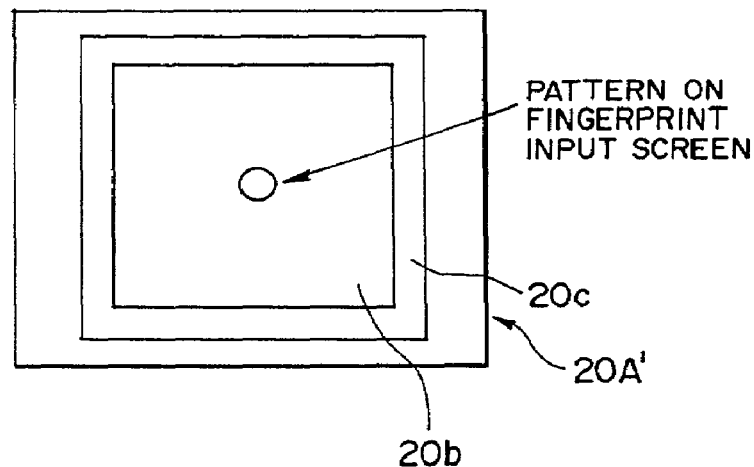

FIGS. 29A to 30B show a structure of the simplified keyboard 40 used in this embodiment. FIG. 29A is a vertical sectional view of the simplified keyboard 40A. FIG. 29B is a plan view of the simplified keyboard 40. FIG. 30A is a vertical sectional view showing an operational state of the simplified keyboard 40A. FIG. 30B is a plan view showing an example of an input pattern on the fingerprint input screen 20b formed by the simplified keyboard 40A.

The simplified keyboard 40A is adapted to a case where the information inputting unit is the capacitance fingerprint unit 20A', provided attachably to and detachably from the unit (information inputting unit) 20A'. As shown in FIGS. 29A and 30A, a frame 44a in the same shape (here, a rectangle) as the fingerprint input screen 20b is such formed on the lower surface of a body made of conductor 44 of the simplified keyboard 40A as to project therefrom. A shape of an inner periphery of the frame 44a matches with a shape of an outer periphery of the fingerprint input screen 20b, and the lower surface of the frame 44a contacts with a conductive metal ring 20c, with the simplified keyboard 40A being mounted on the information inputting unit 20A', as shown in FIG. 30A.

A plurality (here, 3×3=9) of conductive keys 45 are such provided inside the frame 44a of the body made of conductor 44 as to be able to slide upward and downward. An insulator 47 is interposed between each of the conductive keys 45 and the body made of conductor 44. Each of the conductive keys 45 is forced upward and by a spring or the like not shown. When a user presses an upper surface (key top 45a) of each of the conductive keys 45 against a force by the spring, each of the conductive keys 45 moves downward.

Switch pieces 48a and 48b are such provided to the body made of conductor 44 and each of the conductive keys 45 as to project therefrom. While each of the conductive keys 45 shifts upward by a force of the spring, the body made of conductor 44 and each of the conductive keys 45 are insulated with these pieces of switch 40a and 40b being separated from each other, as shown in FIG. 29A. To the contrary, when the user presses the conductive key 45 so that the conductive key 45 shifts downward, these switch pieces 48a and 48b are brought into contact with each other (ON state), whereby the body made of conductor 44 and the conductive key 45 are electrically connected.

A conductive polymer film 46 is attached to a surface of a tip of each of the conductive keys 45. When the user presses down a conductive key 45 with the simplified keyboard 40A being mounted on the information inputting unit 20A' as shown in FIG. 30A, the conductive polymer film 46 touches the fingerprint input screen 20b of the information inputting unit 20A' and contact therewith. The switch pieces 48a and 48b touch each other, which allows the body made of conductor 44 and the conductive key 45 to be electrically connected. As shown in FIG. 30B, a contact pattern of the conductive key 45 (conductive polymer film 46) is thus formed on the fingerprint input screen 20b.

In the simplified keyboard 40A, numbers from "1" to "9", for example, are written on the respective key tops 45a of the nine conductive key 45. The simplified keyboard 40A functions similarly to the simplified keyboard 40 described above.

When the user presses down a conductive key 45 on which "5", for example, is written to make the conductive polymer film 46 on the surface at the tip thereof touch the fingerprint input screen 20 as shown in FIGS. 30A and 30B, a contact point (contact pattern) formed on the fingerprint input screen 20b is read as image data by the information inputting unit 20A (10). The extracting unit 14 of the registering apparatus 2 or the keyboard information extracting unit 25G of the authenticating apparatus 3G can extract a position of the contact point from the image data, and recognize and specify that a number "5" corresponding to that position is inputted with reference to the conversion table or the like described above.

Use of such the simplified keyboard 40A allows similar functions and effects to the simplified keyboard 40 even when the information inputting unit is the capacitance fingerprint unit 20A'.

In the example shown in FIG. 30B, a shape of the contact pattern formed on the fingerprint input screen 20b by the conductive polymer film 46 on the tip of the conductive key 45 is circular. However, the shape is not limited to the above example, but may be another.

Why the conductive polymer film 46 is interposed between each of the conductive keys 45 and the fingerprint input screen 46 to avoid direct contact of the conductive key 45 with the fingerprint input face 20b as well as the electronic seal 30A is to avoid electrostatic discharge of the capacitance fingerprint unit 20A', and to make each of the conductive keys 45 softly touch the fingerprint input screen 20b. When the conductive keys 45 have similar characteristics to the conductive polymer film 46, it is unnecessary to attach the conductive polymer film 46.

The simplified keyboard 40A adapted to the capacitance fingerprint unit 20A' can be used for the optical fingerprint unit 20A as well as the simplified keyboard 40 described above.

Note that the present invention is not limited to the above examples, but may be modified in various ways without departing from the scope of the invention.

What is claimed is:

1. A personal authentication system using biometrics information comprising:
   a registering apparatus including a first biometrics information inputting unit for obtaining biometrics information of a person to be registered, said registering apparatus obtaining data for verification from information inputted using said first biometrics information inputting unit and registering the same; and
   an authenticating apparatus for determining whether a person, to be authenticated is a person registered by said registering apparatus, based on said data for verification registered by said registering apparatus;
   said registering apparatus further including,
      a first extracting unit for extracting biometrics characteristic data from said biometrics information obtained by said first biometrics information inputting unit, and registering said biometrics characteristic data as registry biometrics characteristic data, for primary verification; and
      a second extracting unit for extracting data, which is different from said registry biometrics characteristic data for primary verification, from information inputted using said first biometrics information inputting unit, and registering said data as registry data for secondary verification,
   said authenticating apparatus further comprising:
      a primary authenticator verifying whether a person to be authenticated is a person registered by said registering apparatus, based on said data for primary verification registered by said first extracting unit of said registering apparatus, and
      a secondary authenticator, when the secondary verification is required to be carried out according to a result of the primary verification in said authenticating apparatus, verifying whether a person to be authenticated is a person registered by said registering apparatus, based on the data for secondary verification registered by said second extracting unit of said registering apparatus.

2. The personal authentication system using biometrics information according to claim 1, wherein said registering apparatus comprises a state determining unit for determining a state of said registry biometrics characteristic data for primary verification extracted by said first extracting unit; and
   said second extracting unit carries out extraction and registration according to a result of determination by said state determining unit.

3. The personal authentication system using biometrics information according to claim 2, wherein said registry data for secondary verification is biometrics characteristic data extracted from biometrics information, the biometrics information being of the same type as biometrics information in primary verification and being obtained from a part which is different from a part from which the biometrics information has been obtained in said primary verification.

4. The personal authentication system using biometrics information according to claim 3, wherein said biometrics information is fingerprint image data, and said registry data for secondary verification is biometrics characteristic data extracted from fingerprint image data of one or more fingers which are different from a finger from which said registry characteristic data for primary data has been obtained.

5. The personal authentication system using biometrics information according to claim 2, wherein said registry data for secondary verification is biometrics characteristic data of a different type from—biometrics characteristic data in primary verification extracted from biometrics information, the biometrics information being of the same type as biometrics information in primary verification and being obtained from the same part or a different part.

6. The personal authentication system using biometrics information according to claim 5, wherein said biometrics information is fingerprint image data, and said registry data for secondary verification is biometrics characteristic data of a different type from biometrics characteristic data in said primary verification, extracted from fingerprint image data of the same finger as a registered finger from which said registry biometrics characteristic data for primary verification has been obtained, or, one or more fingers which are different from said registered finger.

7. The personal authentication system using biometrics information according to claim 1, wherein said registry data for secondary verification is biometrics characteristic data extracted from biometrics information, the biometrics information being of the same type as biometrics information in 7 primary verification and being obtained from a part which is different from a part from which the biometrics information has been obtained in said primary verification.

8. The personal authentication system using biometrics information according to claim 7, wherein said biometrics information is fingerprint image data, and said registry data for secondary verification is biometrics characteristic data extracted from fingerprint image data of one or more fingers which are different from a finger from which said registry characteristic data for primary data has been obtained.

9. The personal authentication system using biometrics information according to claim 1, wherein said registry data for secondary verification is biometrics characteristic data of a different type from biometrics characteristic data in primary verification extracted from biometrics information, the biometrics information being of the same type as biometrics information in primary verification and being obtained from the same part or a different part.

10. The personal authentication system using biometrics information according to claim 9, wherein said biometrics information is fingerprint image data, and said registry data for secondary verification is biometrics characteristic data of a different type from biometrics characteristic data in said primary verification, extracted from fingerprint image data of the same finger as a registered finger from which said registry biometrics characteristic data for primary verification has been obtained, or, one or more fingers which are different from said registered finger.

11. A personal authentication system using biometrics information comprising:
a registering apparatus including a first biometrics information inputting unit for obtaining biometrics information of a person to be registered, said registering apparatus obtaining data for verification from information inputted using said first biometrics information inputting unit and registering the same; and
an authenticating apparatus for determining whether a person, to be authenticated is a person registered by said registering apparatus, on the basis of said data for verification registered by said registering apparatus;
said registering apparatus further including,
a first extracting unit for extracting biometrics characteristic data from said biometrics information obtained by said first biometrics information inputting unit, and registering said biometrics characteristic data as registry biometrics characteristic data, for primary verification; and
a second extracting unit for extracting data, which is different from said registry biometrics characteristic data for primary verification, from information inputted using said first biometrics information inputting unit, and registering said data as registry data for secondary verification to be carried out according to a result of said primary verification in said authenticating apparatus,
wherein said authenticating apparatus comprises:
a second biometrics information inputting unit for obtaining biometrics information of a person to be authenticated;
a third extracting unit for extracting biometrics characteristic data from biometrics information obtained by said second biometrics information inputting unit;
a primary verifying unit for verifying whether said biometrics characteristic data extracted by said third extracting unit matches said registry biometrics characteristic data for primary verification registered by said registering apparatus;
a secondary verification shift determining unit for determining whether to carry out secondary verification, on the basis of a result of verification by said primary verifying unit;
a fourth extracting unit for extracting data for secondary verification from information inputted using said second biometrics information inputting unit, when said secondary verification shift determining unit determines that said secondary verification is required to be carried out;
a secondary verifying unit for verifying whether said data extracted by said fourth extracting unit matches said registry data for secondary verification registered by said registering apparatus; and
a personal determining unit for determining whether said person to be authenticated is a person registered by said registering apparatus on the basis of a result of verification by said primary verifying unit or said secondary verifying unit.

12. The personal authentication system using biometrics information according to claim 11, wherein said authenticating apparatus comprises an instruction unit for prompting said person to be authenticated to input data for secondary verification by using said second biometrics information inputting unit, when said secondary verification shift determining unit determines that secondary verification is required to be carried out.

13. The personal authentication system using biometrics information according to claim 12, wherein said authenticating apparatus comprises a secondary verification shift setting unit for arbitrarily setting whether to carry out verification by said secondary verifying unit.

14. The personal authentication system using biometrics information according to claim 12, wherein said authenticating apparatus comprises a personal information setting unit for setting in advance information on whether to carry out verification by said secondary verifying unit as personal information for each registered person.

15. The personal authentication system using biometrics information according to claim 11, wherein said authenticating apparatus comprises a secondary verification shift setting unit for arbitrarily setting whether to carry out verification by said secondary verifying unit.

16. The personal authentication system using biometrics information according to claim 11, wherein said authenticating apparatus comprises a personal information setting unit for setting in advance information on whether to carry out verification by said secondary verifying unit as personal information for each registered person.

17. The personal authentication system using biometrics information according to claim 11, wherein said registry data for secondary verification is biometrics characteristic data extracted from biometrics information, the biometrics information being of the same type as biometrics information in primary verification and being obtained from a part which is different from a part from which the biometrics information has been obtained in said primary verification.

18. The personal authentication system using biometrics information according to claim 17, wherein said biometrics information is fingerprint image data, and said registry data for secondary verification is biometrics characteristic data extracted from fingerprint image data of one or more fingers which are different from a finger from which said registry characteristic data for primary data has been obtained.

19. The personal authentication system using biometrics information according to claim 11, wherein said registry data for secondary verification is biometrics characteristic data of a different type from biometrics characteristic data in primary verification extracted from biometrics information, the biometrics information being of the same type as biometrics information in primary verification and being obtained from the same part or a different part.

20. The personal authentication system using biometrics information according to claim 19, wherein said-biometrics information is fingerprint image data, and said registry data for secondary verification is biometrics characteristic data of a different type from biometrics characteristic data in said primary verification, extracted from fingerprint image data of the same finger as a registered finger from which said registry biometrics characteristic data for primary verification has been obtained, or, one or more fingers which are different from said registered finger.

21. The personal authentication system using biometrics information according to claim 11, wherein said registry data for secondary verification is non-biometrics characteristic data intentionally inputted by said person to be registered using said first biometrics information inputting unit.

22. The personal authentication system using biometrics information according to claim 21, wherein said non-biometrics characteristic data is time series data having a pattern determined by said person to be registered.

23. The personal authentication system using biometrics information according to claim 21, wherein said biometrics information is image data of a predetermined part of a body, and said non-biometrics characteristic data is an input angle of said predetermined part of the body on an image input screen of said first biometrics information inputting unit, said input angle being detected as image data by said first biometrics information inputting unit.

24. The personal authentication system using biometrics information according to claim 21, wherein said biometrics information is image data of a predetermined part of a body, and said non-biometrics characteristic data is a contact position of said predetermined part of the body on an image input screen of said biometrics information inputting unit, said contact position being detected as image data by said first biometrics information inputting unit.

25. The personal authentication system using biometrics information according to claim 21, wherein said biometrics information is image data of a predetermined part of a body, and said non-biometrics characteristic data is contact trace information on an image input screen of said first biometrics information inputting unit, said contact trace information being detected as image data by said first biometrics information inputting unit.

26. The personal authentication system using biometrics information according to claim 21, wherein said biometrics information is image data of a predetermined part of a body, and said non-biometrics characteristic data is a contact pattern on an image input screen of said first biometrics information inputting unit, said contact pattern being detected as image data by said first biometrics information inputting unit.

27. The personal authentication system using biometrics information according to claim 26, wherein said contact pattern is formed by a pattern information input medium being able to be possessed and carried by said person to be registered or a registered person; and said pattern information input medium comprises one or more contact parts contacting with said image input screen of said first biometrics information inputting unit to form said contact pattern.

28. The personal authentication system using biometrics information according to claim 27, wherein said pattern information input medium forms a pattern changing in time series as said contact pattern by said one or more contact parts.

29. The personal authentication system using biometrics information according to claim 21, wherein:

said biometrics information is image data of a predetermined part of a body;

character, data corresponding each of a plurality of different contact patterns or a plurality of different contact points on an image input screen of said first biometrics information inputting unit is set in advance; and said non-biometrics characteristic data is character data corresponding to said contact pattern or said contact point detected as image data by said first biometrics information inputting unit.

30. The personal authentication system using biometrics information according to claim 29, wherein said non-biometrics characteristic data is a character data string successively inputted in time series.

31. The personal authentication system using biometrics information according to claim 30, wherein said registering apparatus and said authenticating apparatus comprise:

a keyboard unit attachably and detachably disposed to said biometrics information inputting unit to be able to form said contact pattern or said contact point by contacting with said image input screen of said biometrics information inputting unit according to a key operation; and a keyboard information extracting unit for converting said contact pattern or said contact point formed according to the key operation of said keyboard unit into corresponding character data, and outputting the same.

32. The personal authentication system using biometrics information according to claim 29, wherein said registering apparatus and said authenticating apparatus comprise:

a keyboard unit attachably and detachably disposed to said biometrics information inputting unit to be able to form said contact pattern or said contact point by contacting with said image input screen of said biometrics information inputting unit according to a key operation; and a keyboard information extracting unit for converting said contact pattern or said contact point formed according to the key operation of said keyboard unit into corresponding character data, and outputting the same.

33. A personal authentication system using biometrics information comprising:
- a registering apparatus including a first biometrics information inputting unit for obtaining biometrics information of a person to be registered, said registering apparatus obtaining data for verification from information inputted using said first biometrics information inputting unit and registering the same; and
- an authenticating apparatus for determining whether a person, to be authenticated is a person registered by said registering apparatus, on the basis of said data for verification registered by said registering apparatus;

said registering apparatus further including,
- a first extracting unit for extracting biometrics characteristic data from said biometrics information obtained by said first biometrics information inputting unit, and registering said biometrics characteristic data as registry biometrics characteristic data, for primary verification,
- a second extracting unit for extracting data, which is different from said registry biometrics characteristic data for primary verification, from information inputted using said first biometrics information inputting unit, and registering said data as registry data for secondary verification to be carried out according to a result of said primary verification in said authenticating apparatus, and
- a state determining unit for determining a state of said registry biometrics characteristic data for primary verification extracted by said first extracting unit, and said second extracting unit carries out extraction and registration according to a result of determination by said state determining unit, wherein said authenticating apparatus comprises:
- a second biometrics information inputting unit for obtaining biometrics information of said person to be authenticated;
- a third extracting unit for extracting biometrics characteristic data from biometrics information obtained by said second biometrics information inputting unit;
- a primary verifying unit for verifying whether said biometrics characteristic data extracted by said third extracting unit matches said registry biometrics characteristic data for primary verification registered by said registering apparatus;
- a secondary verification shift determining unit for determining whether to carry out secondary verification, on the basis of a result of verification by said primary verifying unit;
- a fourth extracting unit for extracting data for secondary verification from information inputted using said second biometrics information inputting unit, when said secondary verification shift determining unit determines that said secondary verification is required to be carried out;
- a secondary verifying unit for verifying whether said data extracted by said fourth extracting unit matches said registry data for secondary verification registered by said registering apparatus; and
- a personal determining unit for determining whether said person to be authenticated is a person registered by said registering apparatus, on the basis of a result of verification by said primary verifying unit or said secondary verifying unit.

34. The personal authentication system using biometrics information according to claim 33, wherein said authenticating apparatus comprises an instruction unit for prompting said person to be authenticated to input data corresponding to said registry data for secondary verification using said second biometrics information inputting unit, when said secondary verification shift determining unit determines that secondary verification is required to be carried out.

35. The personal authentication system using biometrics information according to claim 34, wherein said-authenticating apparatus comprises a secondary verification shift setting unit for arbitrarily setting whether to carry out verification by said secondary verifying unit.

36. The personal authentication system using biometrics information according to claim 34, wherein said authenticating apparatus comprises a personal information setting unit for setting in advance information on whether to carry out verification by said secondary verifying unit as personal information for each registered person.

37. The personal authentication system using biometrics information according to claim 33, wherein said authenticating apparatus comprises a secondary verification shift setting unit for arbitrarily setting whether to carry out verification by said secondary verifying unit.

38. The personal authentication system using biometrics information according to claim 33, wherein said authenticating apparatus comprises a personal information setting unit for setting in advance information on whether to carry out verification by said secondary verifying unit as personal information for each registered person.

39. The personal authentication system using biometrics information according to claim 33, wherein said registry data for secondary verification is biometrics characteristic data extracted from biometrics information, the biometrics information being of the same type as biometrics information in primary verification and being obtained from a part which is different from a part from which the biometrics information has been obtained in said primary verification.

40. The personal authentication system using biometrics information according to claim 39, wherein said biometrics information is fingerprint image data, and said registry data for secondary verification is biometrics characteristic data extracted from fingerprint image data of one or more fingers which are different from a finger from which said registry characteristic data for primary data has been obtained.

41. The personal authentication system using biometrics information according to claim 33, wherein said registry data for secondary verification is biometrics characteristic data of a different type from biometrics characteristic data in primary verification extracted from biometrics information, the biometrics information being of the same type as biometrics information in primary verification and being obtained from the same part or a different part.

42. The personal authentication system using biometrics information according to claim 41, wherein said biometrics information is fingerprint image data, and said registry data for secondary verification is biometrics characteristic data of a different type from biometrics characteristic data in said primary verification, extracted from fingerprint image data of the same finger as a registered finger from which said registry biometrics characteristic data for primary verification has been obtained, or, one or more fingers which are different from said registered finger.

43. The personal authentication system using biometrics information according to claim 33, wherein said registry data for secondary verification is non-biometrics characteristic data intentionally inputted by said person to be registered using said first biometrics information inputting unit.

44. The personal authentication system using biometrics information according to claim 43, wherein said non-biometrics characteristic data is time series data having a pattern determined by said person to be registered.

45. The personal authentication system using biometrics information according to claim 43, wherein said biometrics information is image data of a predetermined part of a body, and said non-biometrics characteristic data is an input angle of said predetermined part of the body on an image input screen of said first biometrics information inputting unit, said input angle being detected as image data by said first biometrics information inputting unit.

46. The personal authentication system using biometrics information according to claim 43, wherein said biometrics information is image data of predetermined part of a body, and said non-biometrics characteristic data is a contact position of said predetermined part of the body on an image input screen of said biometrics information inputting unit, said contact position being detected as image data by said first biometrics information inputting unit.

47. The personal authentication system using biometrics information according to claim 43, wherein said biometrics information is image data of a predetermined part of a body, and said non-biometrics characteristic data is contact trace information on an image input screen of said first biometrics information inputting unit, said contact trace information detected as image data by said first biometrics information inputting unit.

48. The personal authentication system using biometrics information according to claim 43, wherein said biometrics information is image data of a predetermined part of a body, and said non-biometrics characteristic data is a contact pattern on an image input screen of said first biometrics information inputting unit, said contact pattern being detected as image data by said first biometrics information inputting unit.

49. The personal authentication system using biometrics information according to claim 48, wherein said contact pattern is formed by a pattern information input medium being able to be possessed and carried by said person to be registered or a registered person; and said pattern information input medium comprises one or more contact parts contacting with said image input screen of said first biometrics information inputting unit to form said contact pattern.

50. The personal authentication system using biometrics information according to claim 49, wherein said-pattern information input medium forms a pattern changing in time series as said contact pattern by said one or more contact parts.

51. The personal authentication system using biometrics information according to claim 43, wherein:

said biometrics information is image data of a predetermined part of a body;

character data corresponding each of a plurality of different contact patterns or a plurality of different contact points on an image input screen of said first biometrics information inputting unit is set in advance; and said non-biometrics characteristic data is character data corresponding to said contact pattern or said contact point detected as image data by said first biometrics information inputting unit.

52. The personal authentication system using biometrics information according to claim 51, wherein said non-biometrics characteristic data is a character data string successively inputted in time series.

53. The personal authentication system using biometrics information according to claim 52, wherein said registering apparatus and said authenticating apparatus comprise:

a keyboard unit attachably and detachably disposed to said biometrics information inputting unit to be able to form said contact pattern or said contact point by contacting with said image input screen of said biometrics information inputting unit according to a key operation; and a keyboard information extracting unit for converting said contact pattern or said contact point formed according to the key operation of said keyboard unit into corresponding character data, and outputting the same.

54. The personal authentication system using biometrics information according to claim 51, wherein said registering apparatus and said authenticating apparatus comprise:

a keyboard unit attachably and detachably disposed to said biometrics information inputting unit to be able to form said contact pattern or said contact point by contacting with said image input screen of said biometrics information inputting unit according to a key operation; and a keyboard information extracting unit for converting said contact pattern or said contact point formed according to the key operation of said keyboard unit into corresponding character data, and outputting the same.

55. A personal authentication method using biometrics information comprising:

obtaining first biometrics information of a person to be registered using a first biometrics information inputting unit;

extracting biometrics characteristic data from said first biometrics information as registry biometrics characteristic data for primary verification, and registering the same;

inputting registry data for secondary verification, which is different from said registry biometrics characteristic data for primary verification, using said first biometrics information inputting unit;

primarily verifying whether a person to be authenticated is a person registered, based on said registry biometrics characteristic data for primary verification;

determining whether secondary verification is required to be carried out according to a result of the primarily verifying; and when said secondary verification is determined to be carried out, secondarily verifying whether a person to be authenticated is a person registered, based on said registry data for secondary verification.

56. The personal authentication method using biometrics information according to claim 55, wherein at said authenticating, second biometrics information of said person to be authenticated is obtained by a second biometrics information inputting unit, it is verified whether biometrics characteristic data extracted from said second biometrics information matches said registry biometrics characteristic data for primary verification registered in advance, whether to carry out secondary verification is determined based upon a result of the verification, data corresponding to said registry data for secondary verification is inputted by said person to be authenticated using said second biometrics information inputting unit when said secondary verification is required to be carried out, it is verified whether said data inputted by said second biometrics information inputting unit matches said registry data for secondary verification registered in advance, and whether said person to be authenticated is a person registered is determined based upon a result of the verification.

57. A registering apparatus for a personal authentication system using biometrics information, said registering apparatus, in a system authenticating a person using biometrics information, having a first biometrics information inputting unit for obtaining biometrics information of a person to be registered to obtain data for verification from information inputted using said first biometrics information inputting unit, and registering the same, said registering apparatus comprising:

a first extracting unit for extracting biometrics characteristic data from said biometrics information obtained by said first biometrics information inputting unit, and registering said biometrics characteristic data as registry biometrics characteristic data for primary verification, said registry biometrics characteristic data for primary verification being used in an authenticating apparatus for primary verification as to whether a person to be authenticated is a person registered; and a second extracting unit for extracting data, which is different from said registry biometrics characteristic data for primary verification, from information inputted using said first biometrics information inputting unit, and registering said data as registry data for secondary verification, said registry data for secondary verification being used in the authenticating apparatus, when secondary verification is required to be carried out according to a result of the primarily verification, for the secondary verification as to whether a person to be authenticated is a person registered.

58. The registering apparatus for a personal authentication system using biometrics information according to claim 57 further comprising a state determining unit for determining a state of said registry biometrics characteristic data for primary verification extracted by said first extracting unit;

wherein said second extracting unit performs extraction and registration according to a result of determination by said state determining unit.

59. An authenticating apparatus for a personal authentication system using biometrics information, said authenticating apparatus, in a system authenticating a person using biometrics information, determining whether a person to be authenticated is a registered person, on the basis of data for verification registered in advance, said authenticating apparatus comprising:

a biometrics information inputting unit for obtaining biometrics information of said person to be authenticated;

a first extracting unit for extracting biometrics characteristics data from biometrics information obtained by said biometrics information inputting unit;

a primary verifying unit for verifying whether said biometrics characteristic data extracted by said first extracting unit matches registry biometrics characteristic data for primary verification registered in advance;

a secondary verification shift determining unit for determining whether to carry out secondary verification, on the basis of a result of verification by said primary verifying unit;

a second extracting unit for extracting data for secondary verification registered in advance from information inputted using said biometrics information inputting unit, when said secondary verification shift determining unit determines that said secondary verification is required to be carried out;

a secondary verifying unit for verifying whether said data extracted by said second extracting unit matches said registry data for secondary verification; and a personal determining unit for determining whether said person to be authenticated is a registered person on the basis of a result of verification by said primary verifying unit or said secondary verifying unit.

60. The authenticating apparatus for a personal authentication system using biometrics information according to claim 59 further comprising an instruction unit for prompting said person to be authenticated to input data corresponding to said registry data for secondary verification using said second biometrics information inputting unit, when said secondary verification shift determining unit determines that said secondary verification is required to be carried out.

* * * * *

UNITED STATES PATENT AND TRADEMARK OFFICE
CERTIFICATE OF CORRECTION

PATENT NO. : 6,983,061 B2
APPLICATION NO. : 09/791790
DATED : January 3, 2006
INVENTOR(S) : Jun Ikegami et al.

Page 1 of 1

It is certified that error appears in the above-identified patent and that said Letters Patent is hereby corrected as shown below:

<u>Column 57,</u>
Line 1, delete "from-biometrics" and insert -- from biometrics --.
Line 21, delete "7" before "primary".

<u>Column 59,</u>
Line 27, delete "said-biometrics" and insert -- said biometrics --.

<u>Column 60,</u>
Line 30, after "character" delete ",".

<u>Column 62,</u>
Lines 7-8, delete "said-authenticating" and insert -- said authenticating --.

<u>Column 63,</u>
Line 45, delete "said-pattern" and insert -- said pattern --.

Signed and Sealed this

Twentieth Day of June, 2006

JON W. DUDAS
*Director of the United States Patent and Trademark Office*